United States Patent [19]

Lynch et al.

[11] Patent Number: 5,896,133
[45] Date of Patent: Apr. 20, 1999

[54] GRAPHICAL USER INTERFACE FOR NAVIGATING BETWEEN STREET, HALLWAY, ROOM, AND FUNCTION METAPHORS

[75] Inventors: Kevin M. Lynch, San Francisco; Andrew J. Hertzfeld, Palo Alto; William D. Atkinson, Portola Valley, all of Calif.

[73] Assignee: General Magic, Mountain View, Calif.

[21] Appl. No.: 08/958,637

[22] Filed: Oct. 27, 1997

Related U.S. Application Data

[63] Continuation of application No. 08/235,603, Apr. 29, 1994, Pat. No. 5,689,669.

[51] Int. Cl.⁶ .................................................. G06F 3/00
[52] U.S. Cl. ...................... 345/357; 345/355; 345/350; 345/341; 345/351
[58] Field of Search ............................ 345/326–358

[56] References Cited

U.S. PATENT DOCUMENTS

| | | | |
|---|---|---|---|
| 5,072,412 | 12/1991 | Henderson, Jr. et al. | 395/159 |
| 5,295,244 | 3/1994 | Dev et al. | 395/160 X |
| 5,297,253 | 3/1994 | Meisel | 395/160 |
| 5,310,349 | 5/1994 | Daniels et al. | 434/118 X |
| 5,347,628 | 9/1994 | Brewer et al. | 395/159 |
| 5,393,070 | 2/1995 | Best | 463/32 |
| 5,414,801 | 5/1995 | Smith et al. | 395/119 |
| 5,448,696 | 9/1995 | Shimada et al. | 395/161 |
| 5,481,665 | 1/1996 | Okada et al. | 395/155 |
| 5,512,920 | 4/1996 | Gibson | 395/157 X |
| 5,524,195 | 6/1996 | Clanton, III et al. | 395/155 |
| 5,528,735 | 6/1996 | Strasnick et al. | 395/160 X |
| 5,555,354 | 9/1996 | Strasnick et al. | 395/160 X |

OTHER PUBLICATIONS

Microsoft Windows User's Guide, Microsoft Corp., pp. 357, 370–371, 1990.
Macintosh Human Interface Guidelines, Apple Computer, Inc., pp. 152–153, 158–159, 1992.

*Primary Examiner*—John E. Breene
*Attorney, Agent, or Firm*—Skjerven, Morrill, MacPherson, Franklin & Friel, LLP; Stephen A. Terrile

[57] ABSTRACT

A graphical navigation user interface for enabling user control of a computer system may incorporate navigation levels. Each navigation level is based on a physical real-word metaphor. The navigation system includes a three four levels: a individual object level, a room level, a building level, a town level. An individual object level is the lowest navigation level and corresponds to specific function. The room level provides a user with options of specific functions. The building level includes a hallway metaphor where the user has options of choosing room objects through a doorway. The town level provides the user with options of choosing various building objects connect by a street metaphor.

14 Claims, 47 Drawing Sheets

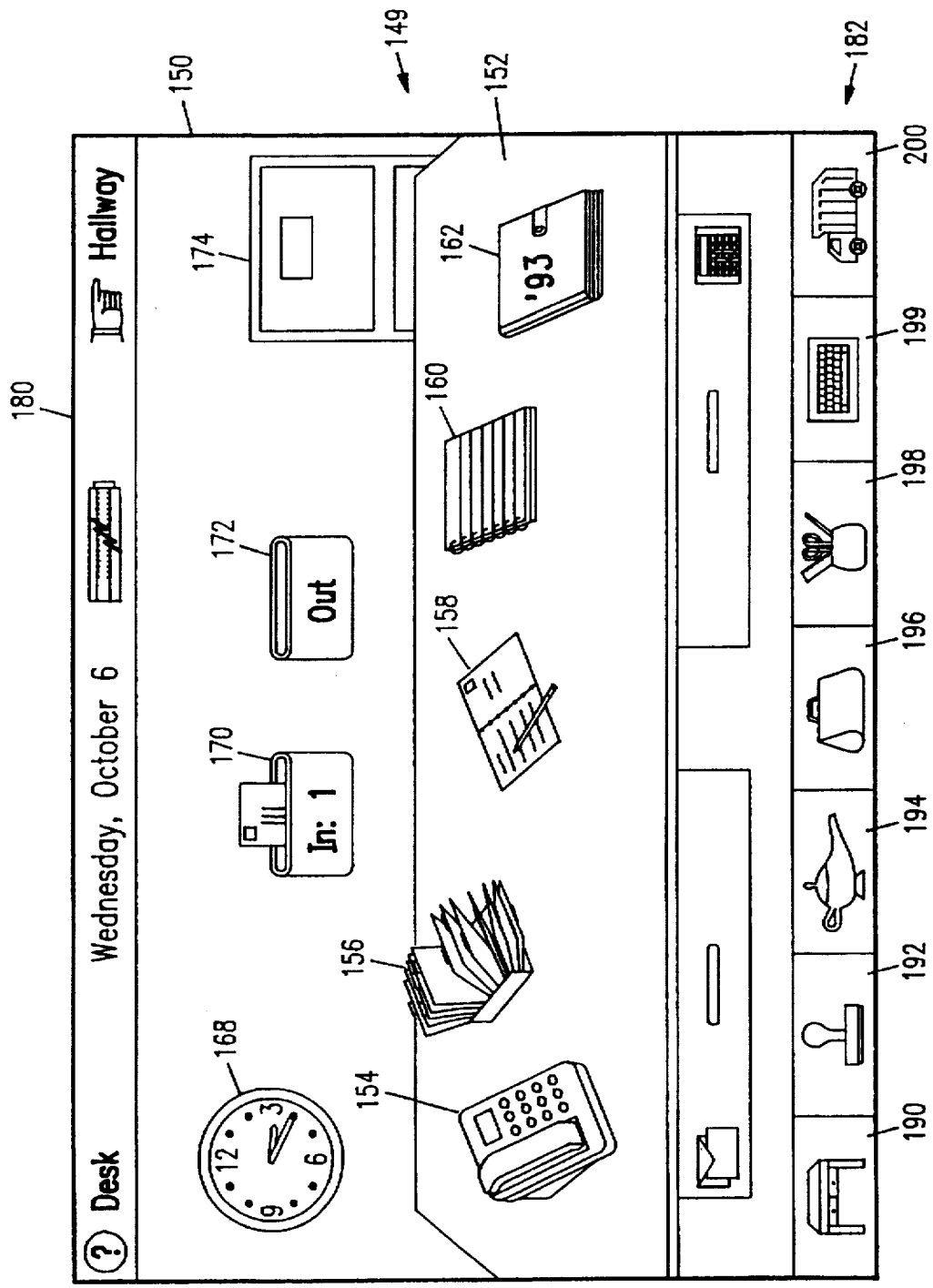

GRAPHICAL USER INTERFACE FOR NAVIGATING BETWEEN STREET, HALLWAY, ROOM, AND FUNCTION METAPHORS

This application is a continuation of application Ser. No. 08/235,603, filed Apr. 29, 1994 now U.S. Pat. No. 5,689,669.

RELATED APPLICATION

This application is related to a copending application by Andrew Hertzfeld, William Atkinson and Susan Kare, entitled "Graphical use Interface for Changing Characteristics of Graphical Objects", filed on even date herewith (attorney docket no. M-2637 US, hereinafter called "the Coupon Application"). The Coupon Application is hereby incorporated by reference in its entirety, including any appendices and references thereto.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

The present invention relates to systems for navigating within a computer system and more particularly to graphical user interface navigation systems for intuitively navigating within a personal computer system.

Personal computers, originally developed in the 1970's, gave a large population access to computers The original personal computers were controlled by operating systems such as the CP/M operating system supplied by Digital Research and similar to the Disc Operating System (DOS) supplied by Microsoft. A user interacted with these computers by typing purely verbal predetermined commands into the computer. A user accessed information within the computer system (i.e., navigated through the system) by typing commands which instructed the computer run software programs, to change directories and to view directories.

In response to these systems and in,an attempt to make computer use more intuitive, graphical user interfaces (GUI) operating systems which included personal computer navigation systems were developed. These GUI systems are exemplified by the System 7 operating system which runs on Apple Macintosh computers and by the Microsoft Windows operating environment which runs on IBM compatible personal computers. These GUI systems use navigation systems which include iconic representations of files and programs. These programs also include representations of virtual file systems to metaphorically represent files which are stored in the computer. For example, the Apple Macintosh system uses files inside of folders inside of other folders or disks to represent applications and documents; a user navigates between these folders by clicking on these folders with a cursor positioning device such as a mouse.

Handheld personal computer systems such as the Sony Palmtop system, available from Sony Corporation, having an office located in Tokyo, Japan or the Go PenPoint system, available from Go Corporation having an office located in Foster City, Calif., have evolved as the next generation of personal computers. In these handheld personal computer systems, operating systems allow a user to navigate within the system by providing a metaphor of a notebook having pages which are separated by dividers. The dividers are used to section off parts of the notebook from other parts of the notebook. A user navigates through such a system by touching the area of the screen that has the representation of the divider that the user wants to access.

Other programs which run on personal computers use physical representations of objects to allow a user to navigate among the objects. For example, these programs use a metaphor of doors to allow a user to enter a room containing objects. Once within a room, the objects may be viewed more closely by focusing attention on the object, e.g., by clicking on the object using a cursor manipulation device. In these programs, the physical representations represent the logical movement of the user within the program. These programs tend to fall into two categories: the adventure game category and the educational category.

For example, in the adventure game category, a user maneuvers through a representation of a physical space which might include buildings, hallways and rooms. The physical space representation represents the arena in which the game is being played. When maneuvering through this space, a user enters a room by performing some action on the doorway representing the entrance to the room. When the user enters the room, objects which are used in playing the game may be present in the room as set forth by the program.

In the educational category, a user maneuvers through a physical space that is a representation of an actual physical space. For example, a user might navigate through a museum. As the user moves through the hallways of the museum, the user may enter a room by performing an action on the door to the room. Once in the room, the user may view more information about an object within the room by performing an action on the object.

These programs are generally non-extensible as a user cannot add more objects or rooms to the program. Additionally, while these programs graphically represent objects within the program, they are not, a comprehensive representation of objects that are stored within the computer or accessible by the computer. Additionally, because these are programs that run on a computer, and not a high level navigation system which is part of the system software of the computer system, a user must still navigate through the computer system to access the program which includes the physical representations of objects.

SUMMARY OF THE INVENTION

It has been discovered that providing a navigation system based on multiple levels, each grounded in physical metaphors, a computer can enable users to navigate successfully among functions within an extensible range of functionality. It has also been discovered that by providing a navigation system that includes a hallway metaphor to represent functionality contained within the computer itself and a street metaphor to represent functionality provided by networks, other computers and other systems external to the computer, a computer can enable users to intuitively navigate and control operation of the computer and external systems. It has also been discovered that by providing a navigation system using techniques which emulate hallways, streets and comparably extensible real world architectural objects, it becomes possible for new items representing new kinds of functionality to be incorporated into the computer system while maintaining consistency of the navigation system and, thereby, the intuitive character of the navigation system.

BRIEF DESCRIPTION OF THE DRAWINGS

FIG. 3 is a plan view of a desk top room screen presentation of a graphical user interface in accordance with the present invention.

DETAILED DESCRIPTION

The following sets forth a detailed description of the best contemplated mode for carrying out the invention. The description is intended to be illustrative of the invention and should not be taken to be limiting.

Figure 1:
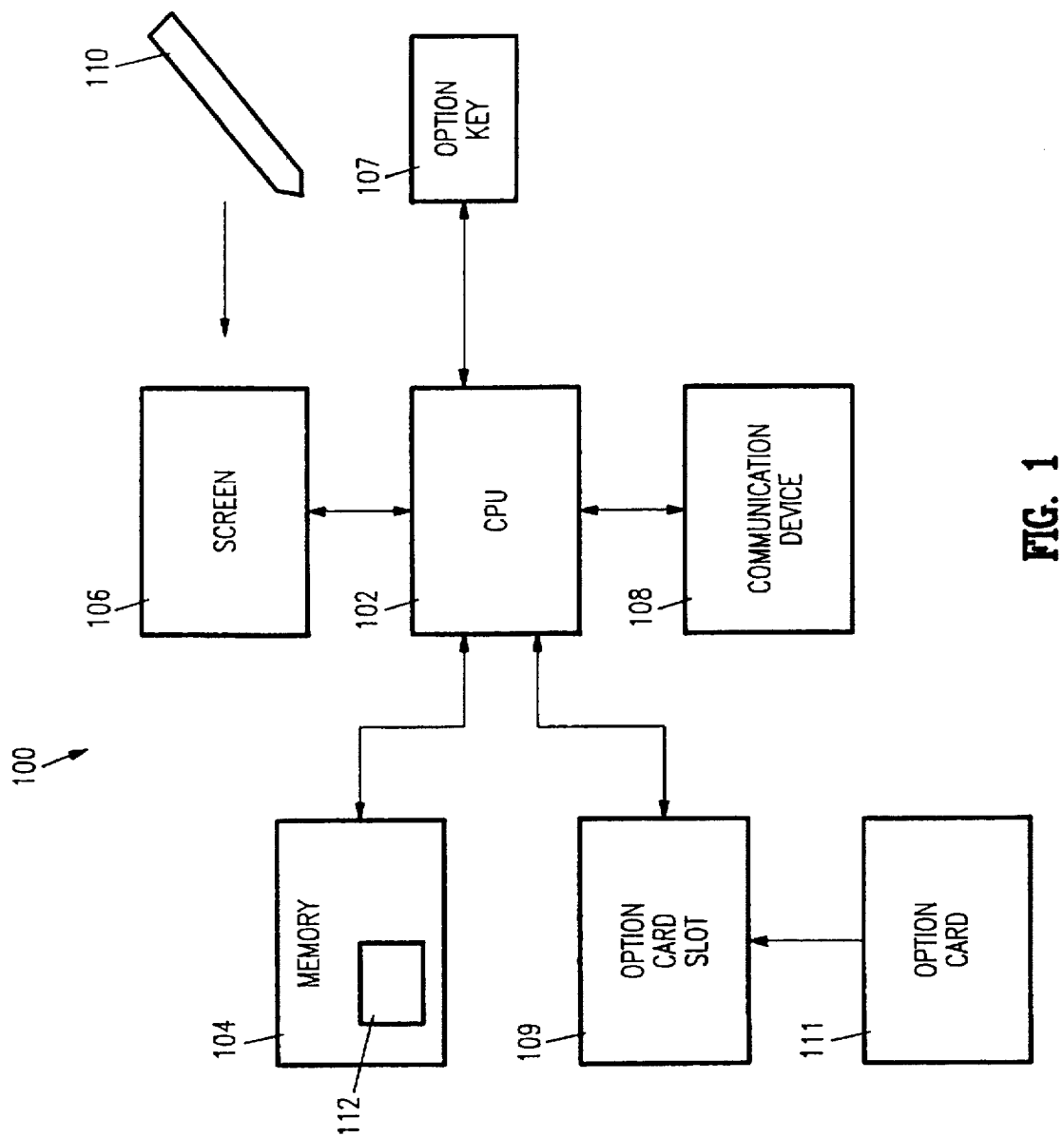
FIG. 1 is a block diagram of a hand held personal computer which includes a navigation system in accordance with the present invention.

Referring to FIG. 1, personal computer system 100, which functions as a handheld personal communicator, includes central processing unit (CPU) 102 which is coupled to memory 104, display device 106, option key 107, communication device 108 and option card slot 109. Memory 104 includes random access memory. Memory 104 also includes non-volatile memory such as read only memory or magnetic discs.

Display device 106 is, for example, a liquid crystal display (LCD) having 480 columns by 320 rows of pixels, each pixel being capable of displaying one of four levels of grey. Display device 106 is a touch sensitive display device which provides signals to CPU 100 when display device 106 is touched by a touching device such as stylus 110 or a user's finger. The signals include signals indicating the coordinate location of display device 106 where the touch occurred. Accordingly, in addition to functioning as a display device, touch sensitive display device 106 functions as a position locator.

Other position locators which may be used with the present invention include mouse devices, trackball devices, thumbwheels, tablets, scanline sensitive styluses, joysticks and radio-frequency digitizing devices. The term position locator refers include any device which indicates a position on the display screen. Often the position corresponds to the location of a cursor which is displayed on the display screen, however, with touch sensitive devices, the position corresponds to the location that is touched. Often position locators include means for actuating a position on the display device. For example, with touch sensitive devices, the nature of the touch may cause the position to be actuated or for example, mouse devices often include a mouse button, which when pressed, actuates the position which corresponds to the location of the cursor on the display device.

Option key 107 provides signals to CPU 102 indicating when option key 107 is activated. Generally, option key 107 is activated in combination with actuation of a location on display device 106. Option card slot 109 is configured to receive an option card such as memory card 111.

Memory 104 stores Magic Cap™ system software 112 which controls the operation of system 100. System software 112 includes groups of instructions which are organized as objects. During operation of system 100, CPU 102 retrieves the objects from memory 104 and executes the objects 104 to perform tasks. Computer system software 112 includes objects which provide a graphical user interface to display device 106. The graphical user interface includes a navigation system which allows a user to navigate within computer system software 112 using metaphors of physical objects. The graphical user interface allows a user to access and control system 100 via visual presentations that are provided by display device 106.

Figure 2:
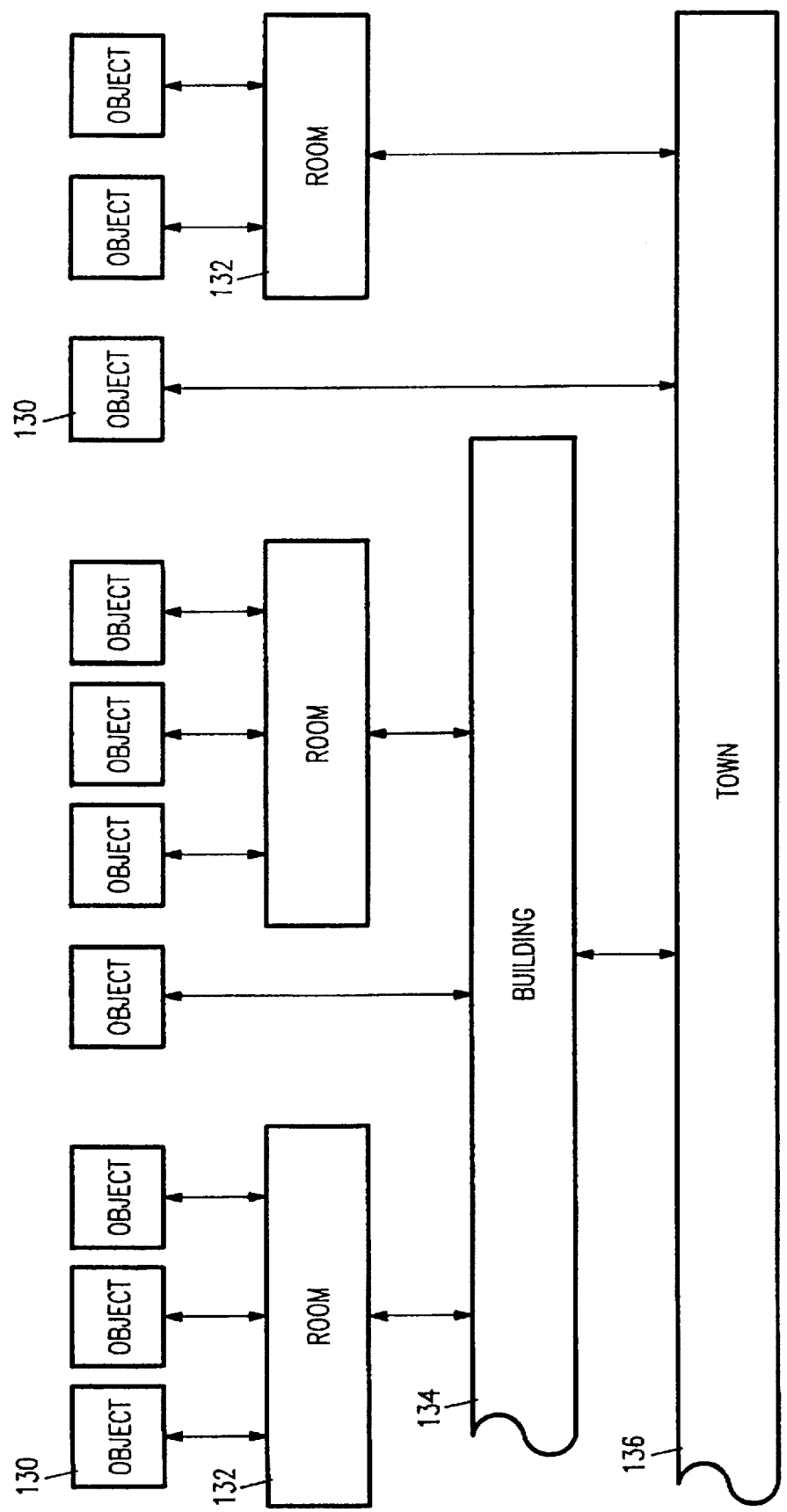
FIG. 2 is a block diagram of a navigation system of a graphical user interface in accordance with the present invention.

Referring to FIG. 2, computer system software 112 includes navigation system 120. Navigation system 120 allows a user to access the objects of computer system software 112 (i.e., to navigate within computer system software 112). Navigation system 120 includes four metaphoric levels of navigation, a first level, individual object level 130, a second level, room level 132, a third level, building level 134 and a fourth level, town level 136. A user moves between and among these levels to navigate within computer system software 112. Moving between and among these levels provides the user with a context switching navigation environment.

Individual object level 130 is the lowest navigation level and is a function specific level. Individual object level 130 includes metaphors of familiar objects which correspond to the specific functions.

Room level 132 is the navigation level which provides a user with options of choosing function specific objects which are included as part of the room. Room level 132 provides access to various function specific objects using a room metaphor with each function specific object being represented as a physical metaphor for the object. Most rooms within navigation system 120 are designated for a particular activity or group of activities. Room level 132 provides a representation of a commonly understood volume of physical space.

Building level 134 is the navigation level which provides a user with options of choosing various room objects which are part of the building. Building level 134 connects the various room level objects via a hallway metaphor having doorway metaphors to represent access to the various rooms. All of the objects which are included within computer system software 112 are included within a building having a metaphor for a home. All of these objects are accessed via the home building hallway and rooms that are connected to the home building hallway. Building level 134 provides a representation of a commonly understood way of traveling between locations.

Town level 136 is the navigation level which provides a user with options for choosing various building objects which are part of the town. Town level 136 connects the various building objects via a street metaphor. The building objects represent services and information which are remote to system 100; these services are accessible through communication device 108. Town level 136 provides a representation of a commonly understood way of traveling between locations.

A user navigates among the objects of computer system software 112 of computer system 100 by stepping into lower navigation levels and stepping back to higher navigation levels. For example, a user steps back from room level 132 to get to street level 134 or a user steps into object level 130 by stepping into (i.e., actuating) an object that is displayed in room level 132.

Levels 130-136 are interconnected in descending object levels, i.e., a number of individual objects are coupled to a single room object, a number of room objects are coupled to a single building object, and a number of building objects are coupled to a single town object. Building objects may include only a single room, in which case room object 132 is coupled directly to street object 136. Additionally, individual objects 130 may be directly accessed from either a building object or a town object, in which case an individual object 132 is coupled directly to the building object 134 or the town object 136 via which the individual object is accessed. Additionally, hallway level 134 may be coupled to a room level object which itself functions as a hallway like object accessing other room level objects; with this type of room object, the room level object provides a way of traveling between locations in the room.

User Aspects of Navigation System

Navigation system 120 is based on a conceptual model that includes metaphoric representations of a physical environment and physical objects within the physical environment to provide an intuitive means for a user to navigate within computer system software 112. In this model, visual presentations of physical locations (i.e., scenes) are displayed on display device 106 to provide a metaphor to a user as if the user were navigating or moving within a physical environment. As a user navigates within computer system software 112, different scenes are presented on display device 106 which include physical metaphors to indicate a present location within the computer system software 112 to a user.

Referring to FIG. 3, desk room screen presentation 149 is shown. Desk room screen presentation 149 includes desk room scene 150 which is the default navigation location of computer navigation system 120. I.e., when computer system 100 is first powered on, desk room scene 150 is the scene which is presented on display device 106. Desk room scene 150 represents a desk room object which is a room level object.

Desk room scene 150 presents a representation of a room containing desktop 152. On desk 152 are physical metaphors of different objects which are accessible from desk room scene 150. For example, on desktop 152 are physical representations for telephone 154, name card rack 156, postcard 158, notebook 160 and datebook 162. Desk room 150 also includes physical representations for other objects which are accessible from desk room scene 150 such as clock 168, in box 170, out box 172 and file cabinet 174. Each of these physical representations represent the function that the corresponding object performs. E.g., when telephone object 154 is actuated, a telephone function is accessed. Desk room 150 also includes stationery drawer 164 and overflow drawer 166 which are presented as part of the desk metaphor. When actuated, drawers 164, 166 provide access to more specialized objects.

In addition to the desk room scene, every screen presentation, including desk room screen 149, includes title bar 180 displayed across the top of display device 106 and button strip 182 displayed across the bottom of display device 106. Title bar 180 and button strip 182 are displayed at each level of navigation system 120.

Title bar 180 provides user information as well as navigation control. On the left side of title bar 180 is a scene description request icon as well as a title of the present location within navigation system, e.g., "desk". Activating the scene description request icon causes CPU 102 to provide information about the present scene onto display device 106. On the right side of title bar 180 is a step back description indicating a scene to where a user steps back from the present location, e.g., "hallway"; by actuating this description, a user steps back to the described scene. Accordingly, the step back description on title bar 180 provides step back control which is external to the particular scene, i.e., the area of screen 106 where the metaphor is realized.

Button strip 182 provides access to commonly used functions of computer system 100. Touching a button activates the touched button. Button strip 182 includes desk button 190, stamper button 192, magic lamp button 194, tote bag button 196, tool holder button 198, keyboard button 199 and trash button 200. Desk button 190 is activated from any navigation location to return to desk room scene 150. Stamper button 192 is activated to present a catalog of stamps in a window on display device 106. Magic lamp button 194 is activated to access general purpose commands; the actual command options may differ depending upon the scene that is presented when magic lamp button 194 is actuated. Tote bag button 196 is activated to store items and move items from place to place. Tool holder button 198 is activated to access writing and drawing tools. Trash button 200 is activated to manipulate, on display device 106, an item that is to be removed from system 100.

Referring to FIGS. 4A–4E, hallway screen presentation 219 includes hallway scene 220. Hallway scene 220 is the scene to which a user steps back from desk room scene 150. Hallway scene 220 represents a hallway navigation level object. A hallway level object is accessible from room objects 132 by stepping back from the room level object. Additionally, a plurality of room level objects may be accessed from hallway scene 200. Each room level object is accessed via an entrance which is represented with a metaphor of a doorway. For example, desk room scene 150 is accessed via desk doorway 230, which sets forth a graphical representation of a desk 232 along with the textual representation of a desk 234, i.e., the word "desk".

Other rooms within navigation system 120 which are accessed via the hallway object represented by hallway scene 220 include a library which is accessed via library doorway 240, a storeroom which is accessed via storeroom doorway 242, a control room, which is accessed via control panel 244 and a game room, which is accessed via game room doorway 245. As with desk doorway 230, each of these doorways includes a graphical representation of the respective room along with a textual representation of that room.

Each scene of hallway 220 includes directory 250. When actuated, directory 250 displays directory list 252 of the different accessible rooms (see FIG. 4D). In addition to accessing a room object by actuating the doorway of the room object, it may be accessed by actuating the name of the room from directory list 252.

Hallway scene 220 includes right arrow 256 and left arrow 258. Arrows 256 and 258 allow a user to navigate throughout hallway 221 by simulating movement along the hallway. More specifically, when right arrow 256 is actuated, a user moves down hallway 221 to the right. When left arrow 258 is actuated, a user moves down hallway 221 to the left. When a user reaches one end of hallway then only one arrow is displayed and no further movement in the direction opposite the direction indicated by the single arrow is permitted.

Hallway scene 220 also includes graphical images 260, 262. These images provide a user with a varied pattern of objects when moving from doorway to doorway. This interrupted sight path prevents a user's attention from drifting from display device 106, as may happen when viewing a continuous uninterrupted sight path. These images also provide a means for orienting the user in the hallway based upon the displayed images.

Hallway scene 220 also includes table 264, which allows a user to store and access individual objects from the building level. For example, by actuating the drawer of table 264, a user may access locks which are used to lock particular entrances. Table 264 exemplifies the existence of individual usable objects that are accessed via hallway level 134.

Figure 4A:
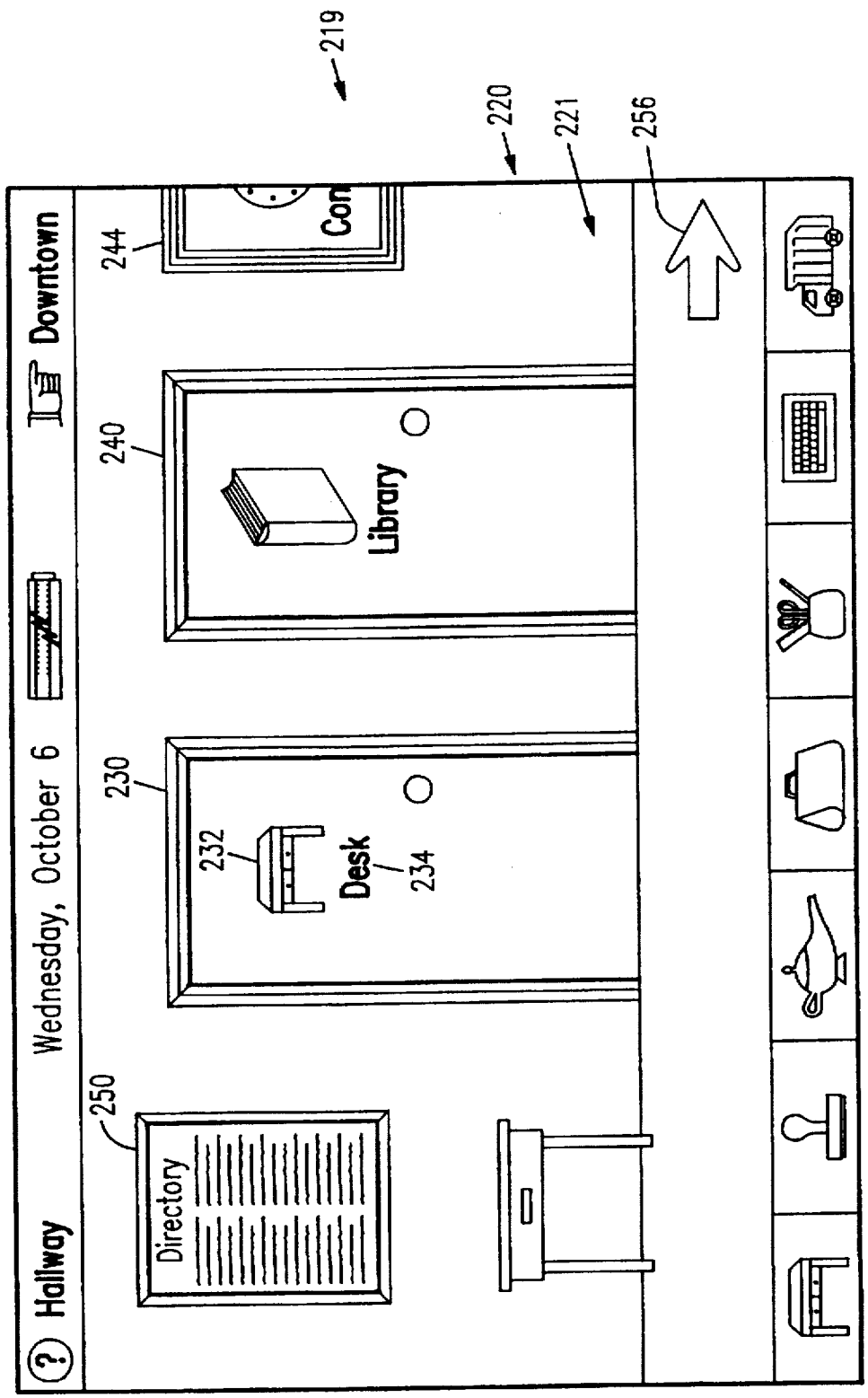
FIGS. 4A–4E are plan views of various hallway screen presentations of a graphical user interface in accordance with the present invention.
Figure 4B:
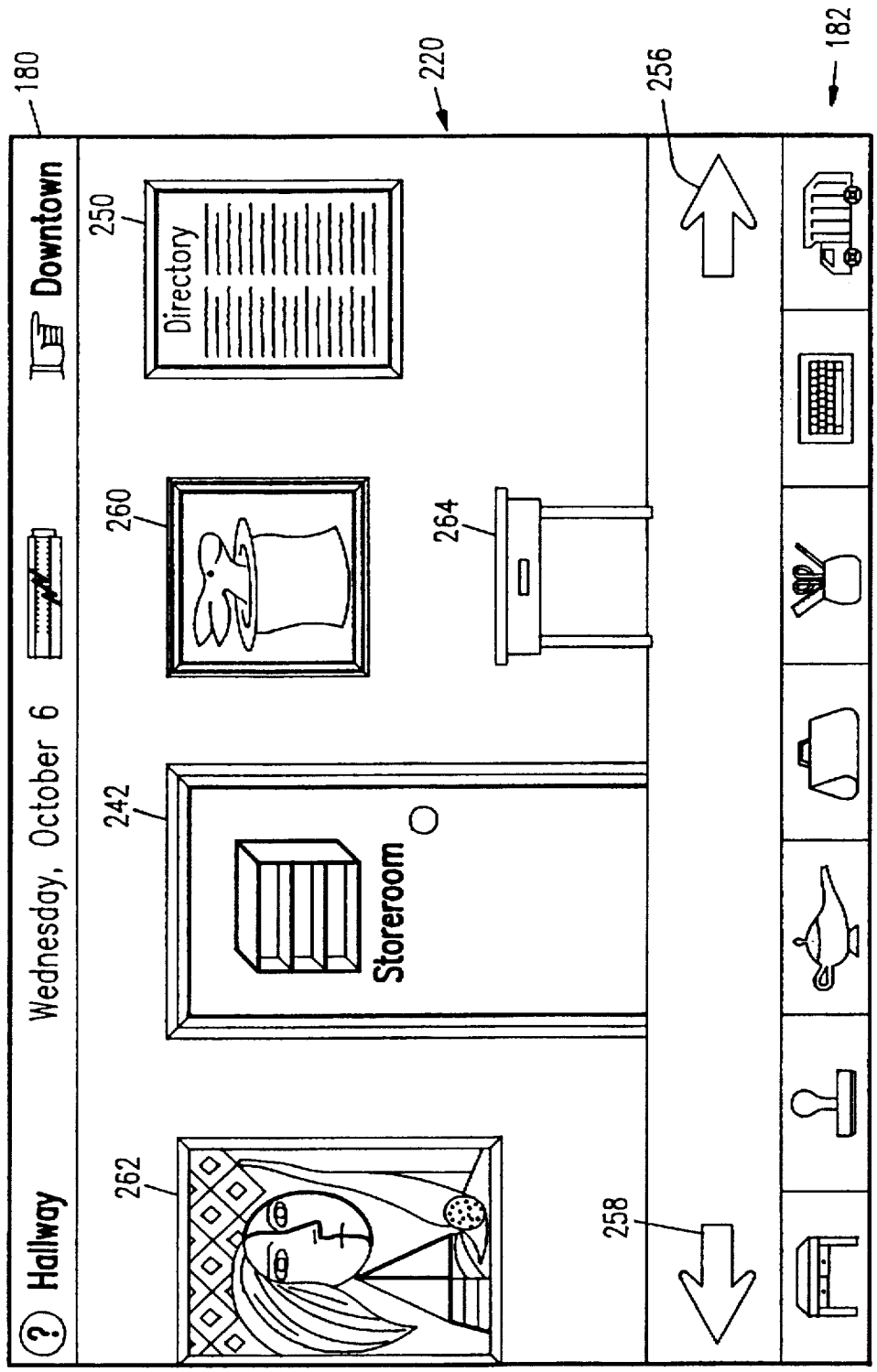
Figure 4C:
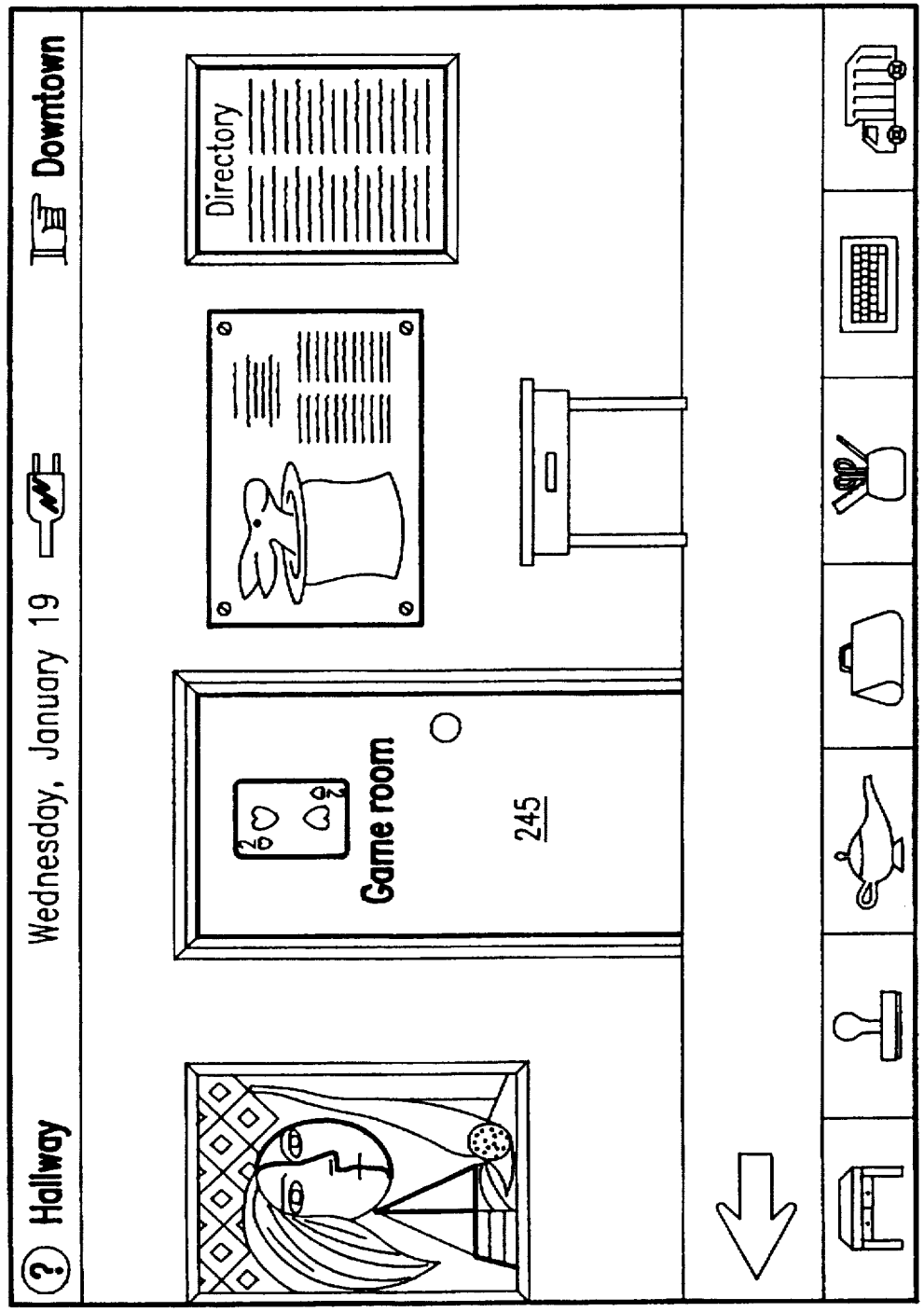
Figure 4D:
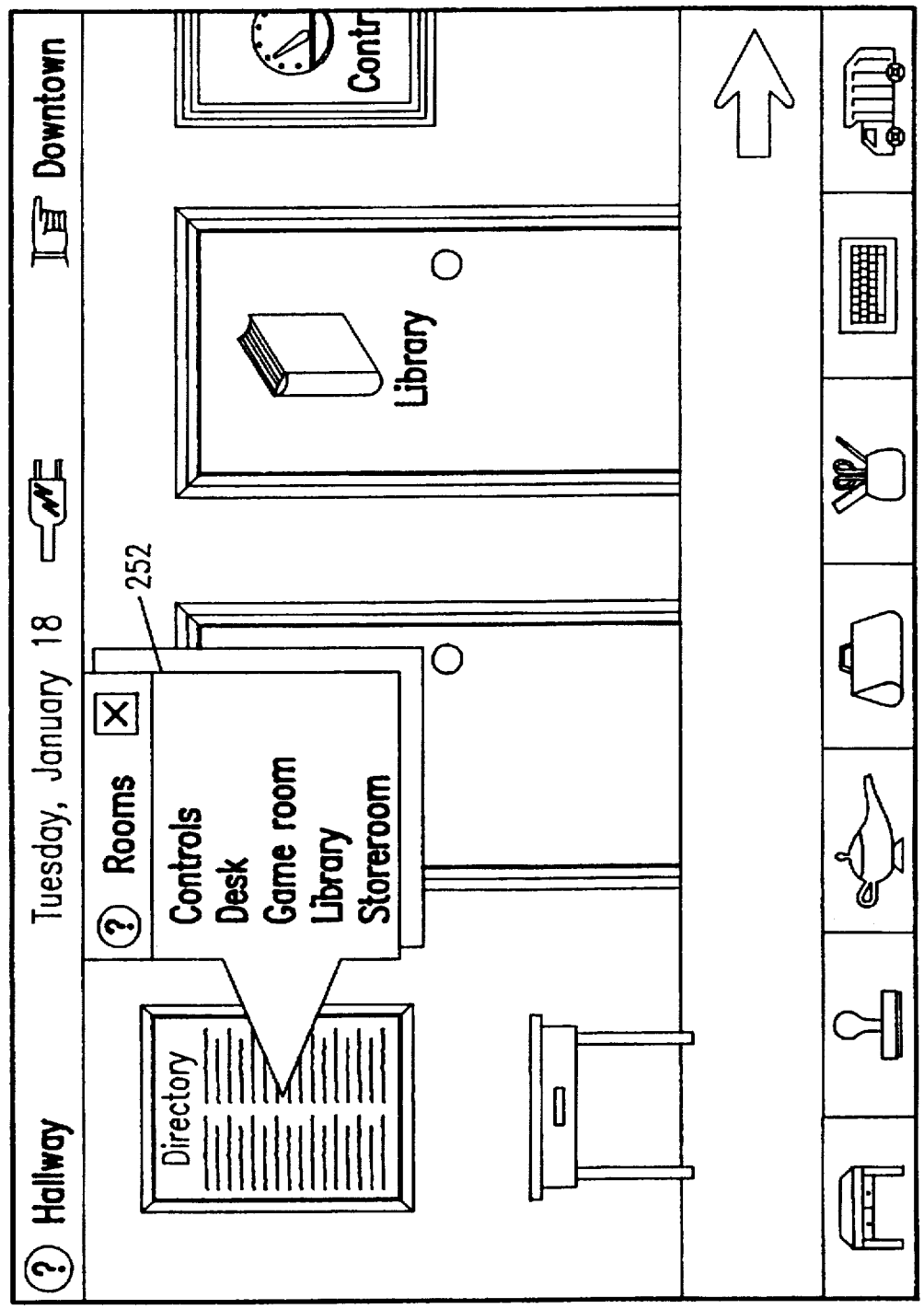
Figure 4E:
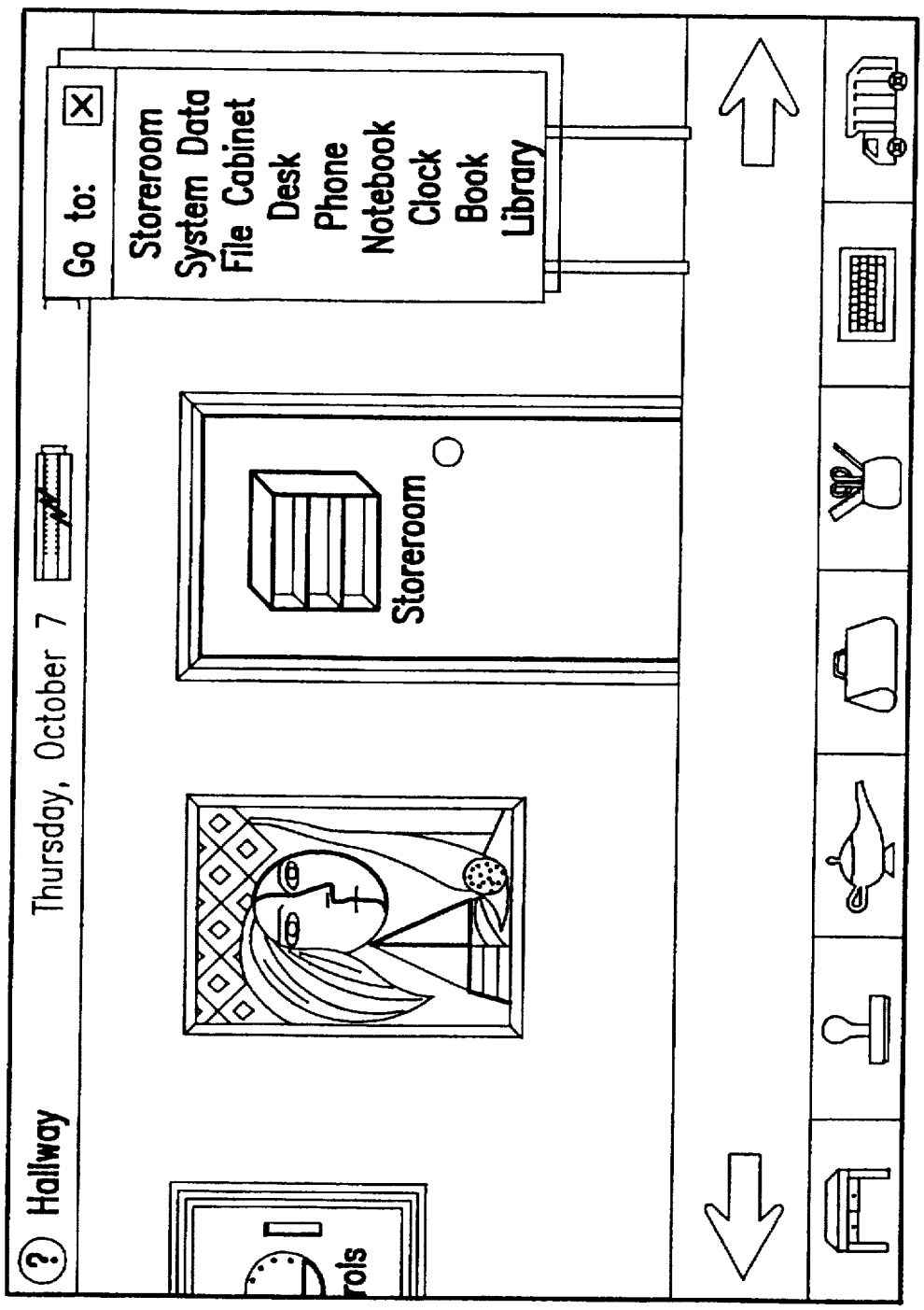

Hallway scene 220 may also present a go to: menu window showing the names of individual objects that may be accessed by actuating the name of the individual objects (See FIG. 4E). This go to menu is accessed by holding down option key 107 while actuating the step back description. This window is an example of warp navigation, i.e., directly accessing a navigation level that is not coupled to the present navigation level.

Hallway navigation level 134 may include a plurality of hallway scenes, hallway scene 220 represents the home hallway scene. The home hallway scene provides a user with access to every object which is accessible within memory 104 of computer system 100.

As with desk top scene 150, hallway screen presentation 219 includes button strip 182 and title bar 180. Title bar shows in text that hallway 220 is the present navigation level and also shows in text that downtown is the navigation level to which a user can step back.

Figure 5A:
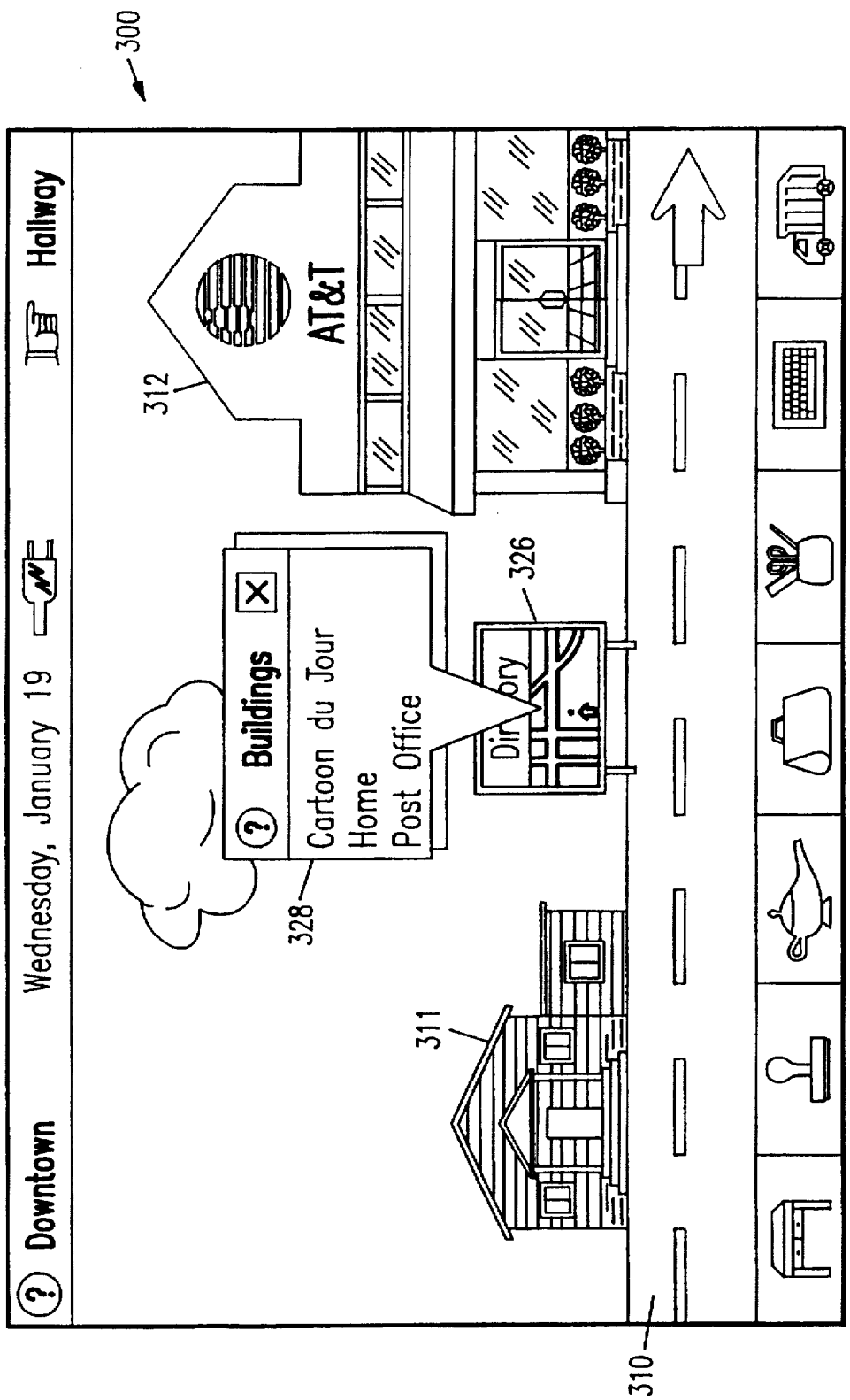
FIGS. 5A–5B are plan views of various street screen presentations of a graphical user interface in accordance with the present invention.
Figure 5B:
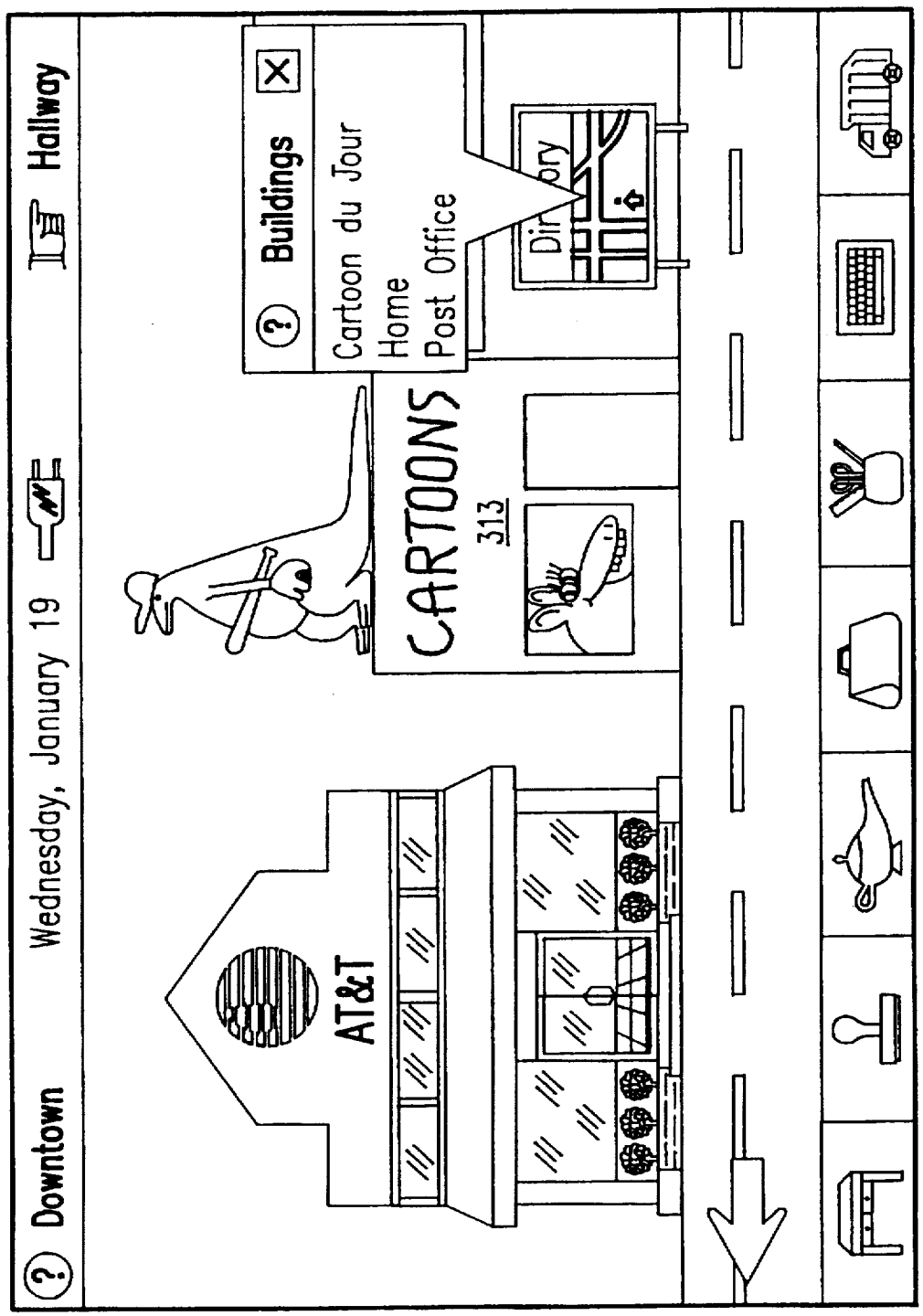

Referring to FIGS. 5A–5B, downtown screen presentation 299 includes downtown scene 300. Downtown scene 300 is the scene to which a user steps back from hallway scene 220. Downtown scene 300 represents the town navigation level which provides a user with access to services and information which are remote to system 100. Downtown scene 300 includes a plurality of buildings which are interconnected via street 310. Each building represents a service which is accessible via system 100. The buildings include house 310, which is a metaphoric representation for a default home location, as well as post office 312 and cartoon building 313. The buildings function as entrances to respective services, as the doorways do in hallway scene 220.

Each view of downtown scene 300 also includes directory sign 326. When actuated, directory sign 326 displays directory list 328 which provides the names of the different accessible building level objects (see FIG. 4A). A building level object may be selected by actuating the name of the building object from directory list 328.

As with hallway scene 220, downtown scene 300 breaks up the monotony of parallel entrance after entrance or building after building. Downtown scene 300 uses graphical image 320 and similar images interspersed among buildings 314, 316, and so on. The present invention involves fixing a navigational geography in a user's mind. Unique, interrupted series of images are more memorable and therefore more successful than uninterrupted series of images.

Figure 6:
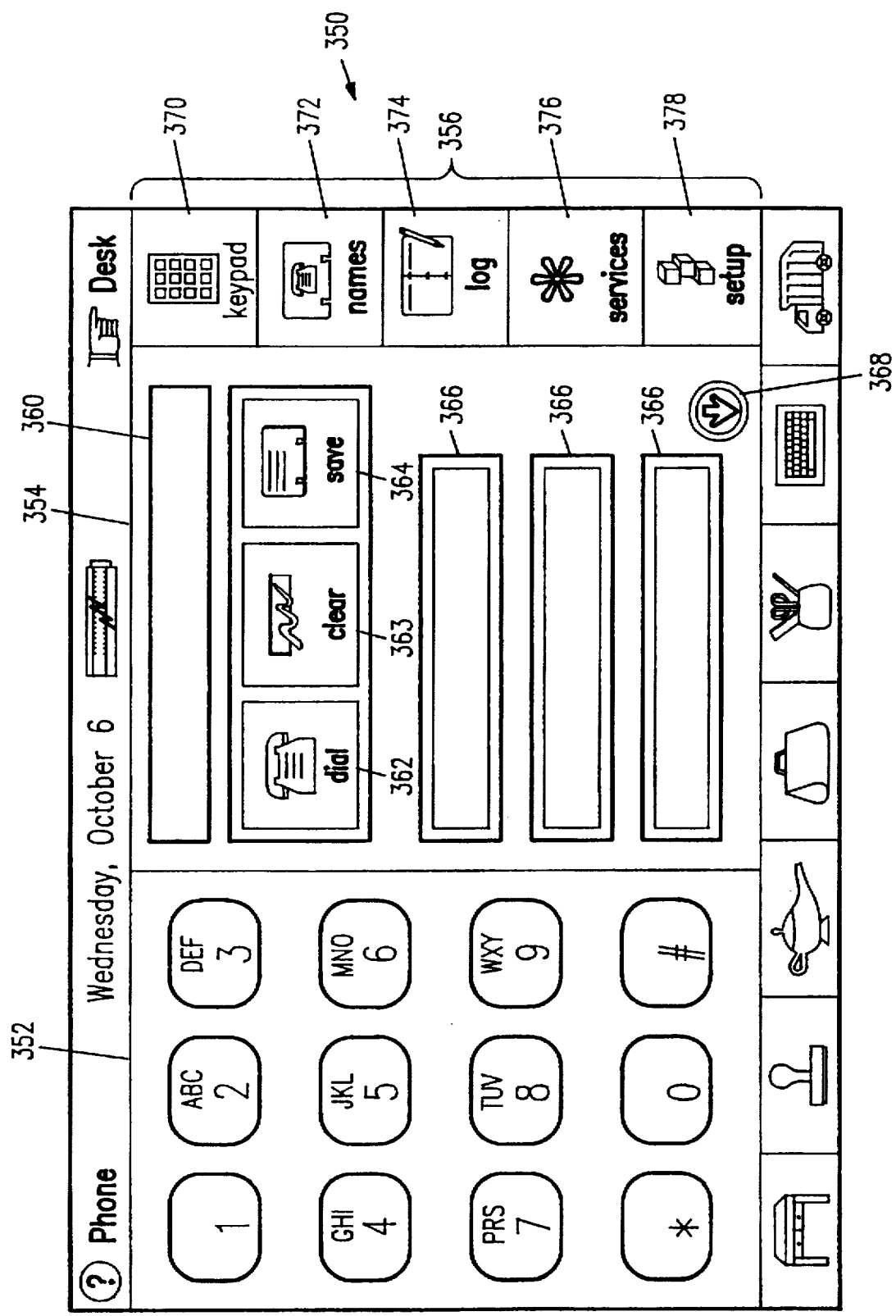
FIG. 6 is a plan view of a phone screen presentation of a graphical user interface in accordance with the present invention.

Referring to FIG. 6, when telephone object 154 is actuated from desk top scene 150, then telephone scene 350 is displayed on display device 106. Telephone scene 350 includes keypad portion 352, telephone number portion 354 and telephone control button portion 356. Keypad portion 352 includes a metaphor for the number layout of a typical telephone keypad. Telephone number portion 354 includes a telephone number display 360, telephone number control buttons 362, 363, 364 and speed dial buttons 366 as well as additional speed button arrow 368. Control button portion includes keypad button 370, names button 372, log button 374, services button 376 and setup button 378.

If computer system 100 includes a headset or similar telephone device as part of communication device 108, then telephone object 154 is used to dial telephone numbers and place telephone calls. More specifically, a telephone number may be dialed manually using keypad portion 352. As the telephone number is entered, it is displayed on telephone number display 360. After the telephone number has been keyed in using keypad portion 352, then this number may be dialed by actuating dial button 362. This keyed in telephone number may be cleared using clear button 353.

If communication device 108 does not include a telephone headset, then telephone object 154 may still be used to provide telephone numbers and to keep a log of telephone calls made.

Figure 7:
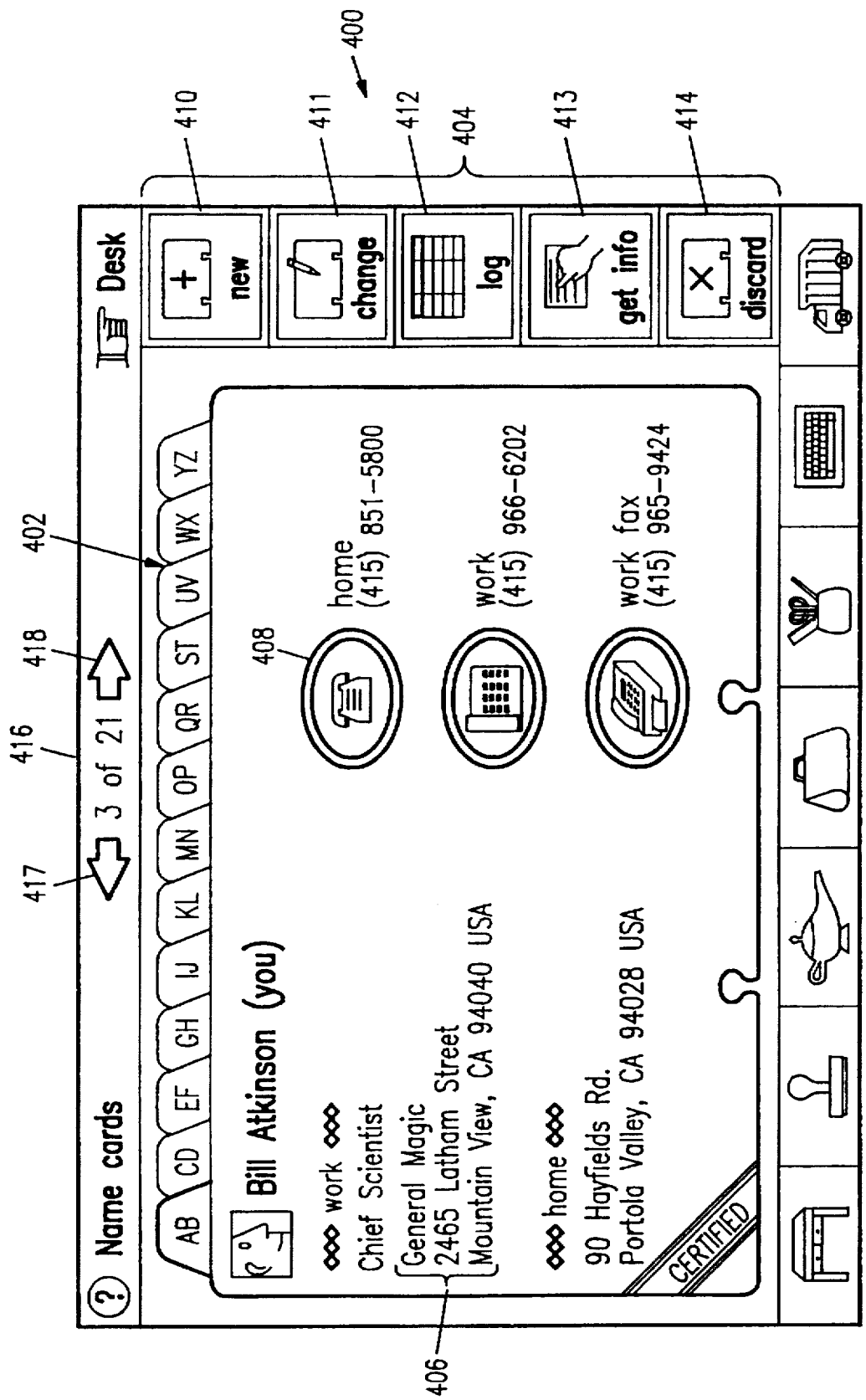
FIG. 7 is a plan view of a name card screen presentation of a graphical user interface in accordance with the present invention.

Referring to FIG. 7, when name card object 156 is actuated from desk top scene 150, then name card scene 400 is displayed on display device 106. Name card scene 400 includes name card portion 402 and name card control button portion 404. Name card portion 402 includes a metaphor of a physical set of paper name cards which are separated by alphabetical tabs; this name card metaphor functions similar to a file of paper address cards. Each name card includes text fields such as address text field 406 as well as graphical fields such as a home telephone graphical representation 408. Name card control button portion 404 includes new button 410, change button 411, log button 412, get information button 413 and discard button 414. Name card scene 400 also includes name card position indicator 416, which includes left arrow 417 and right arrow 418.

Name card position indicator 416 is used to navigate between and among cards within the name card collection. Name card indicator 416 displays which card is presently presented on display device 106 as well as how many cards there are in the name card collection. Arrows 417 and 418 are then used to move from one card to another card. When left arrow 417 is actuated, a user moves to a less significant card (i.e., the user moves in a reverse alphabetical direction) is displayed and when right arrow 418 is actuated, a more significant card is displayed.

When actuated, new button 410 allows a user to add a new card to the name card collection. When actuated, change button 411 allows a user to change a card in the name card collection. When actuated, log button 412 allows a user to display messages that have been sent or received as well as telephone calls that have been made. When actuated, get information button 413 allows a user to request directory information. When actuated, discard button 414 allows a user to remove a card from the name card collection.

Figure 8:
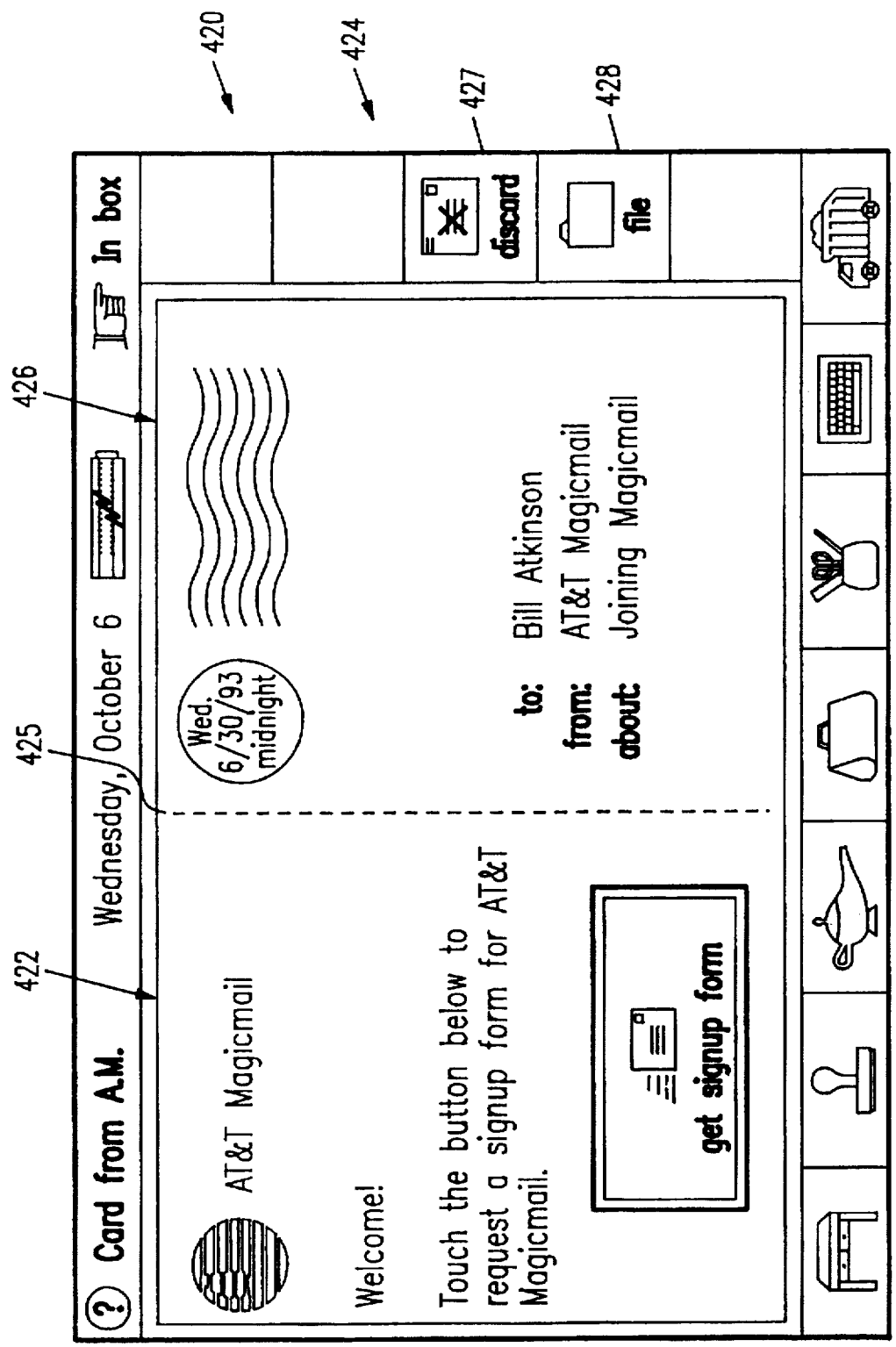
FIG. 8 is a plan view of a postcard screen presentation of a graphical user interface in accordance with the present invention.

Referring to FIG. 8, when postcard 158 is actuated from desk top scene 150, then postcard scene 420 is displayed on display device 106. Postcard scene 420 includes postcard portion 422 and postcard control button portion 424. Postcard portion 422 provides a presentation of a metaphor of a paper postcard. The postcard includes text portion 425, which sets forth the text of the postcard, and postcard routing portion 426, which indicates information about the routing of the postcard. Postcard control button portion 424 includes discard button 427 and file button 428.

When actuated, discard button 427 allows a user to discard the information which is contained in the displayed postcard. When actuated, file button 428 allows a user to store the information which is contained in the displayed postcard.

Figure 9A:
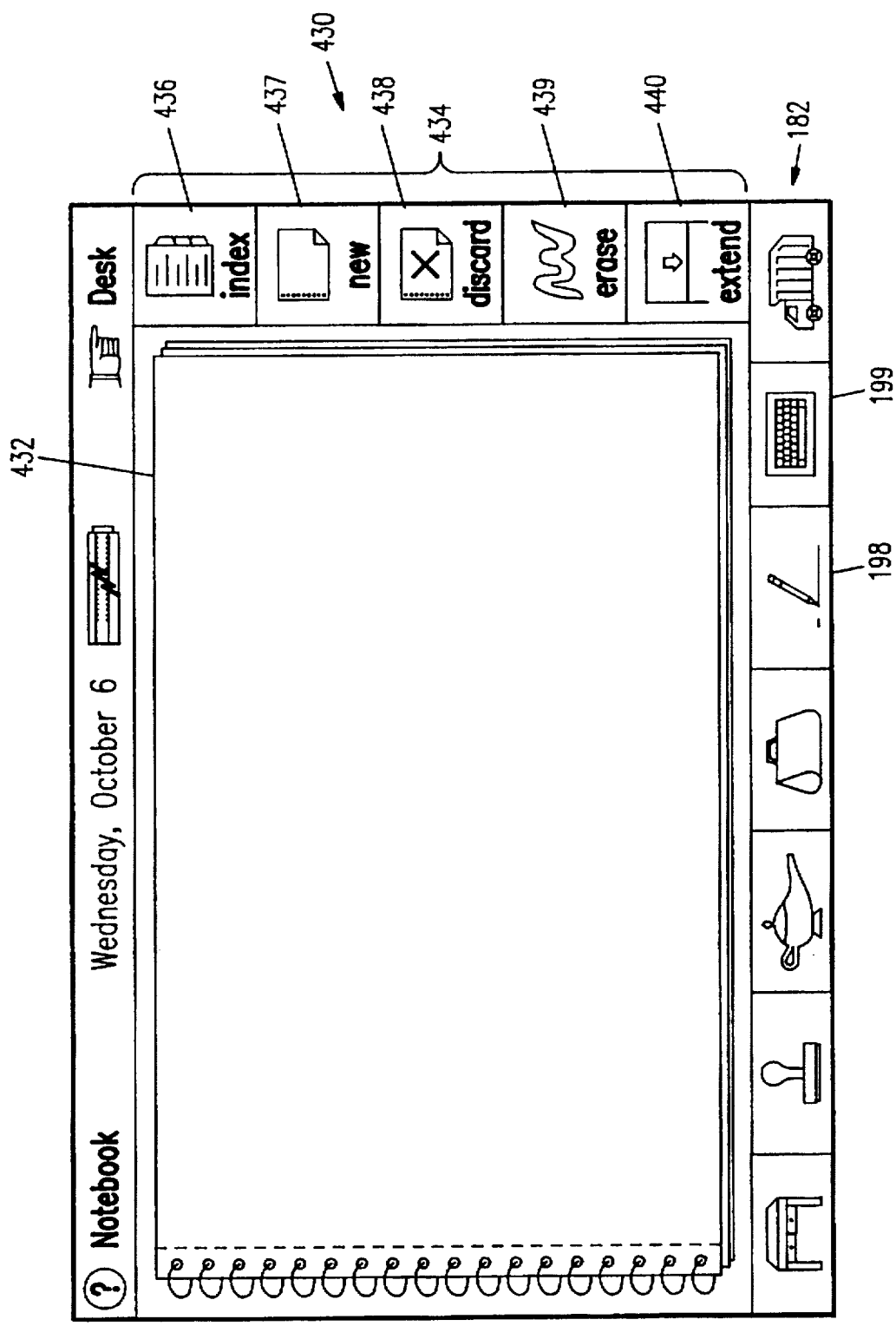
FIGS. 9A and 9B are plan views of notebook screen presentations of a graphical user interface in accordance with the present invention.

Referring to FIG. 9A, when notebook object 160 is actuated from desk top scene 150, then notebook scene 430 is displayed on display device 106. Notebook scene 430 includes notebook portion 432 and notebook control button portion 434. Notebook portion 432 makes use of a notebook metaphor representing a collection of notebook pages; this notebook metaphor functions similar to a paper notebook. Notebook control button portion 434 includes index button 436, new page button 437, discard button 438, erase button 439 and extend button 440.

Information is added to a page of the collection of pages using either the pencil tool, which is accessed by actuating tool button 198 of button strip 182, or the keyboard, which is accessed by actuating keyboard button 199 of button strip 182. When notebook scene 430 is activated, the default tool for tool button 198 is the pencil; accordingly, when the pencil button is actuated, a user may immediately start drawing on the page representation.

When actuated, index button 436 allows a user to create or access an index of all of the notebook pages of notebook portion 432; this index contains both a text index containing names for the pages and a graphics index containing a reduced picture representing the actual page of the notebook. When actuated, new button 437 allows a user to create a new page for the collection of notebook pages. When actuated, discard button 432 allows a user to remove a page from the collection of notebook pages. When actuated, erase button 439 allows a user to erase information which is contained on one of the notebook pages. When actuated, extend button 440 allows a user to expand the size of a page of the collection of pages.

Figure 9B:
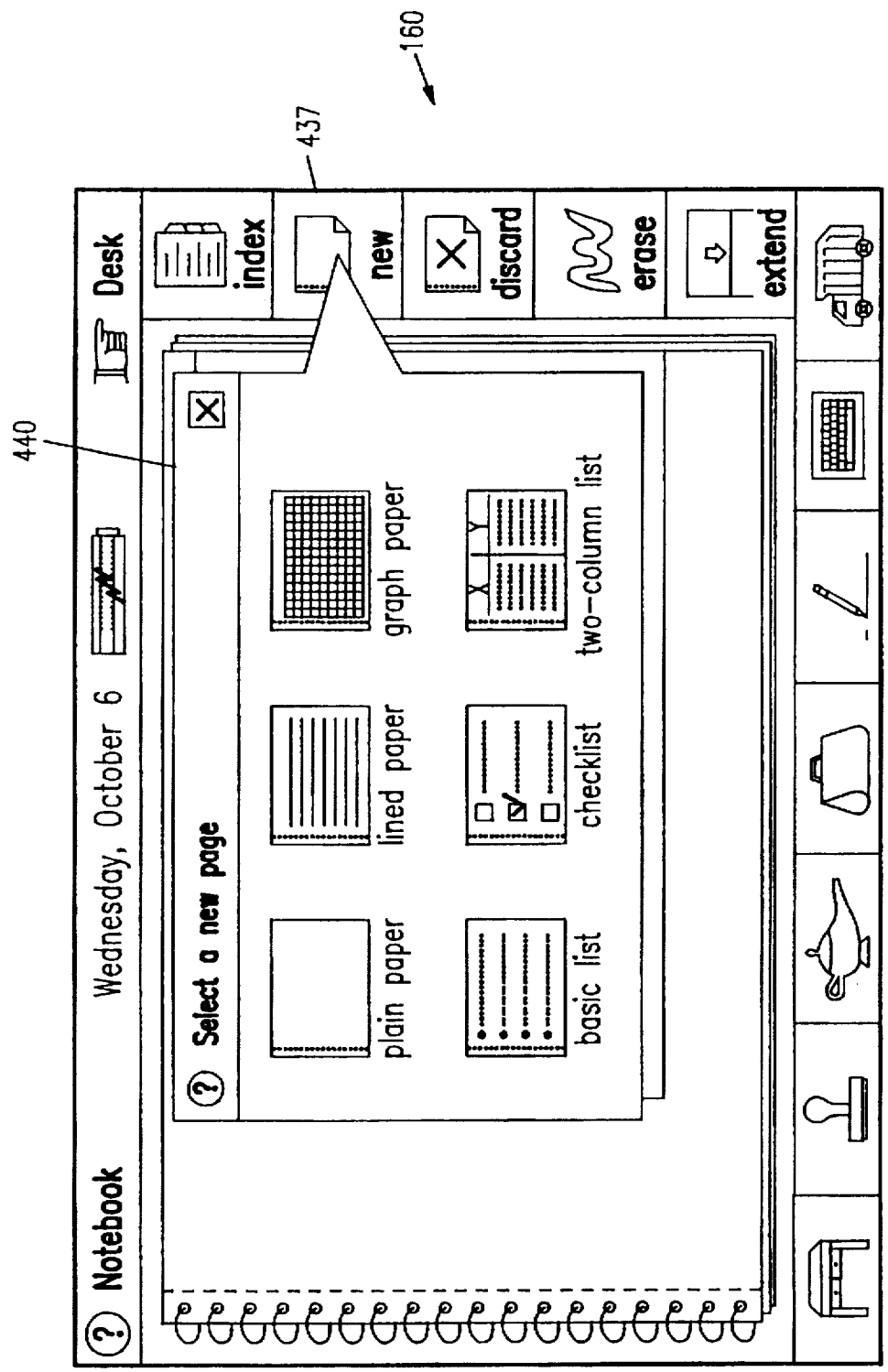

Referring to FIG. 9B, when new button 437 is actuated, page selection window 440 is generated. Page selection window 440 allows a user to choose the format of the information that is to be provided to the notebook page. For example, the page may use a blank background, a lined page background or a graph paper background. Alternately, the page may be formatted as a basic list, a checklist or a two-column list.

Figure 10:
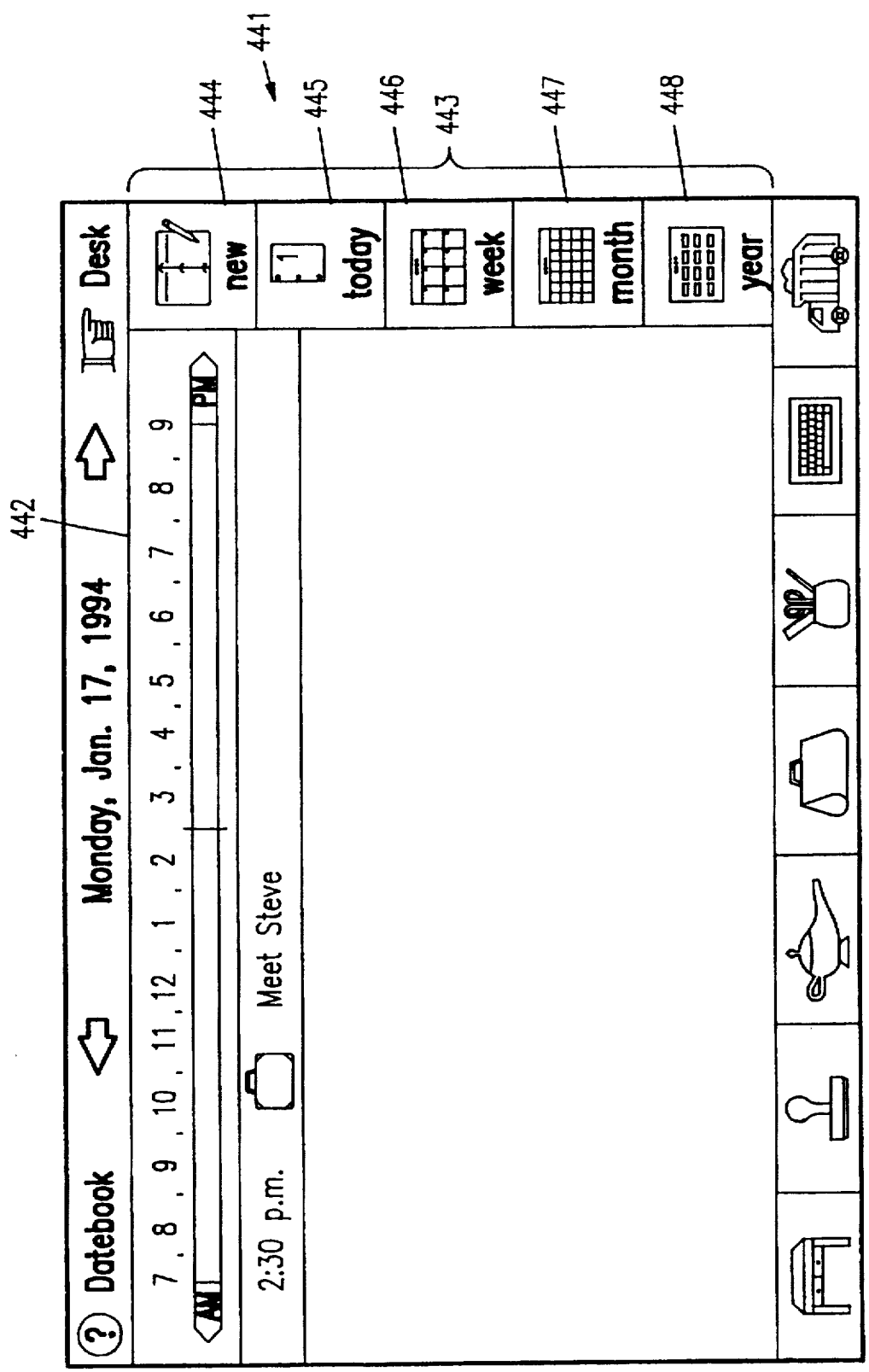
FIG. 10 is a plan view of a datebook screen presentation of a graphical user interface in accordance with the present invention.

Referring to FIG. 10, when datebook object 162 is actuated from desk top scene 150, then datebook scene 441 is presented on display device 106. Datebook scene 441 includes datebook portion 442 and date book control button portion 443. Datebook portion 442 provides a display of a datebook which includes any commitments that are scheduled as well as a slider clock showing the time of the commitments. Datebook control button portion 443 includes new button 444, day button 445, week button 446, month button 447 and year button 448.

New button 444, controls entry of a new entry into datebook portion 442. Day button 445, week button 446, month button 447 and year button 448 control the display in datebook portion 442 to be either a display of a day, week, month or year.

Figure 11A:
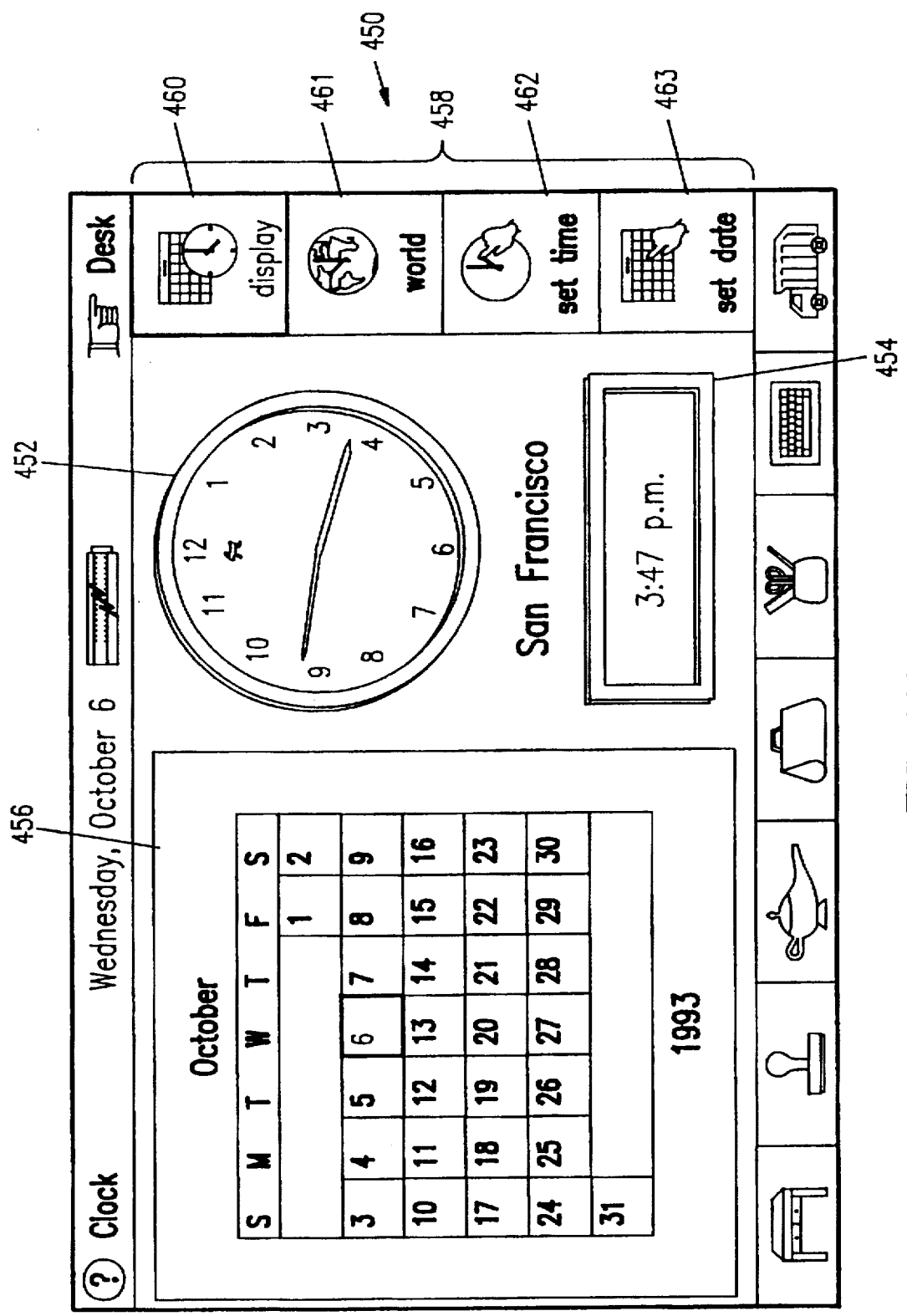
FIGS. 11A and 11B are plan views of clock screen presentations of a graphical user interface in accordance with the present invention.
Figure 11B:
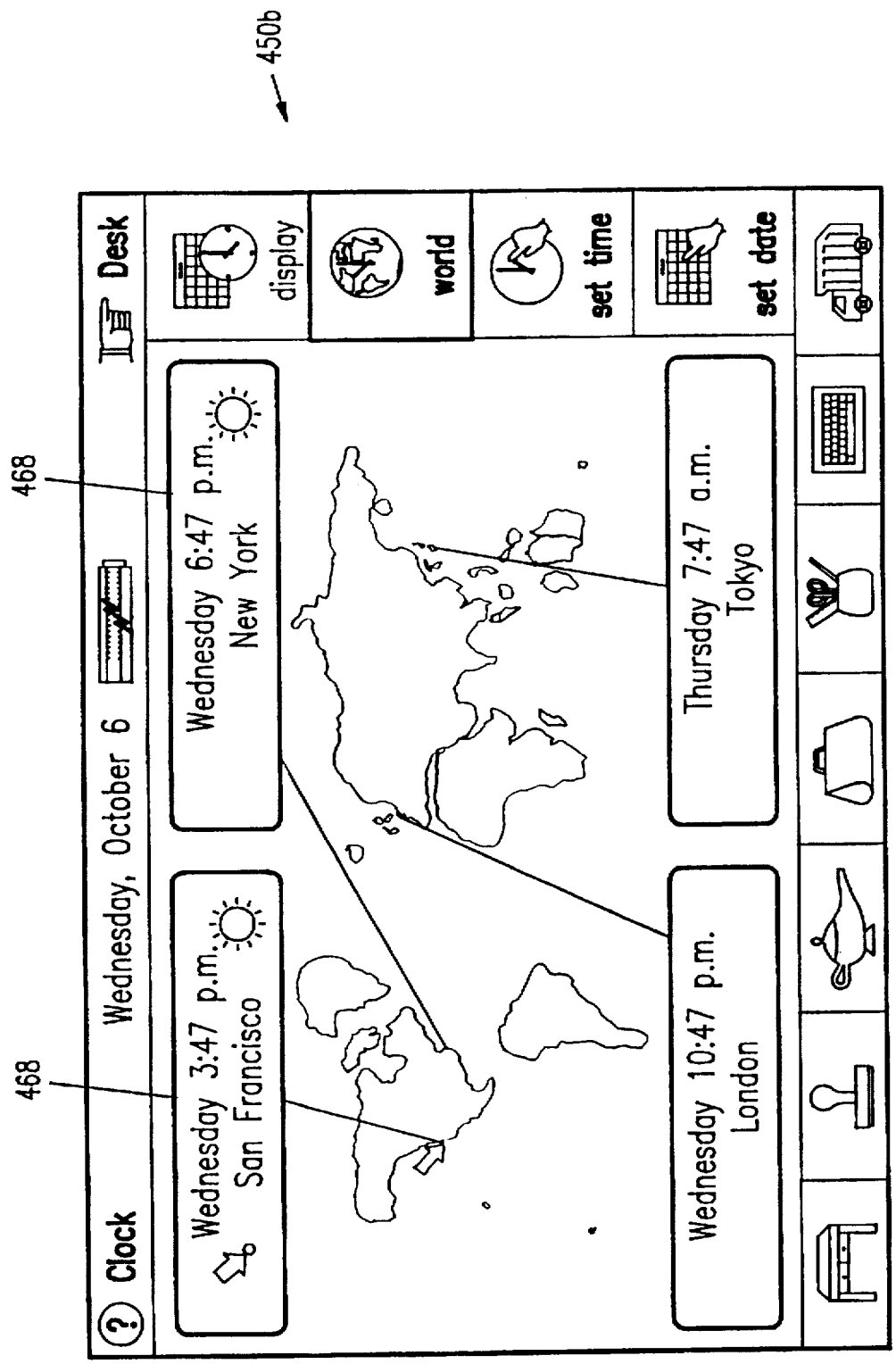

Referring to FIGS. 11A and 11B, when clock object 168 is actuated from desk top scene 150, then clock scene 450 is displayed on display device 106. Clock scene 450 includes analog clock portion 452, digital clock portion 454, calendar portion 456 and clock control button portion 458. Analog clock portion 452 includes a clock metaphor representing a physical analog clock; the time that is displayed by clock object 168 in desk room scene 150 corresponds to the time displayed by analog clock portion 452. Digital clock portion 454 is a digital representation of the time. Calendar portion 456 includes a representation of a monthly calendar with the present date highlighted. Clock control button portion 458 includes display button 460, world button 461, set time button 462 and set date button 463.

By actuating display button 460, a user controls which of analog clock portion 452, digital clock portion 454 and calendar portion 456 are displayed as part of clock scene 450. By actuating world button 461, a user causes a world clock scene to be displayed as part of clock scene 450. When set time button 462 is actuated, a user may set the time of either or both analog clock 452 and digital clock 454. When set date button 463 is actuated, a user may set the date of calendar 456.

Referring to FIG. 11B, world clock scene 450b includes a map of the world as well as four city buttons 468. Each world button 468 can be set with a time from a different city in the world by actuating the respective city button. The city for which the display time is desired is selected from a list of cities. After the city is selected, then the respective city button points to this city and the time for this city is displayed within the city button.

Figure 12:
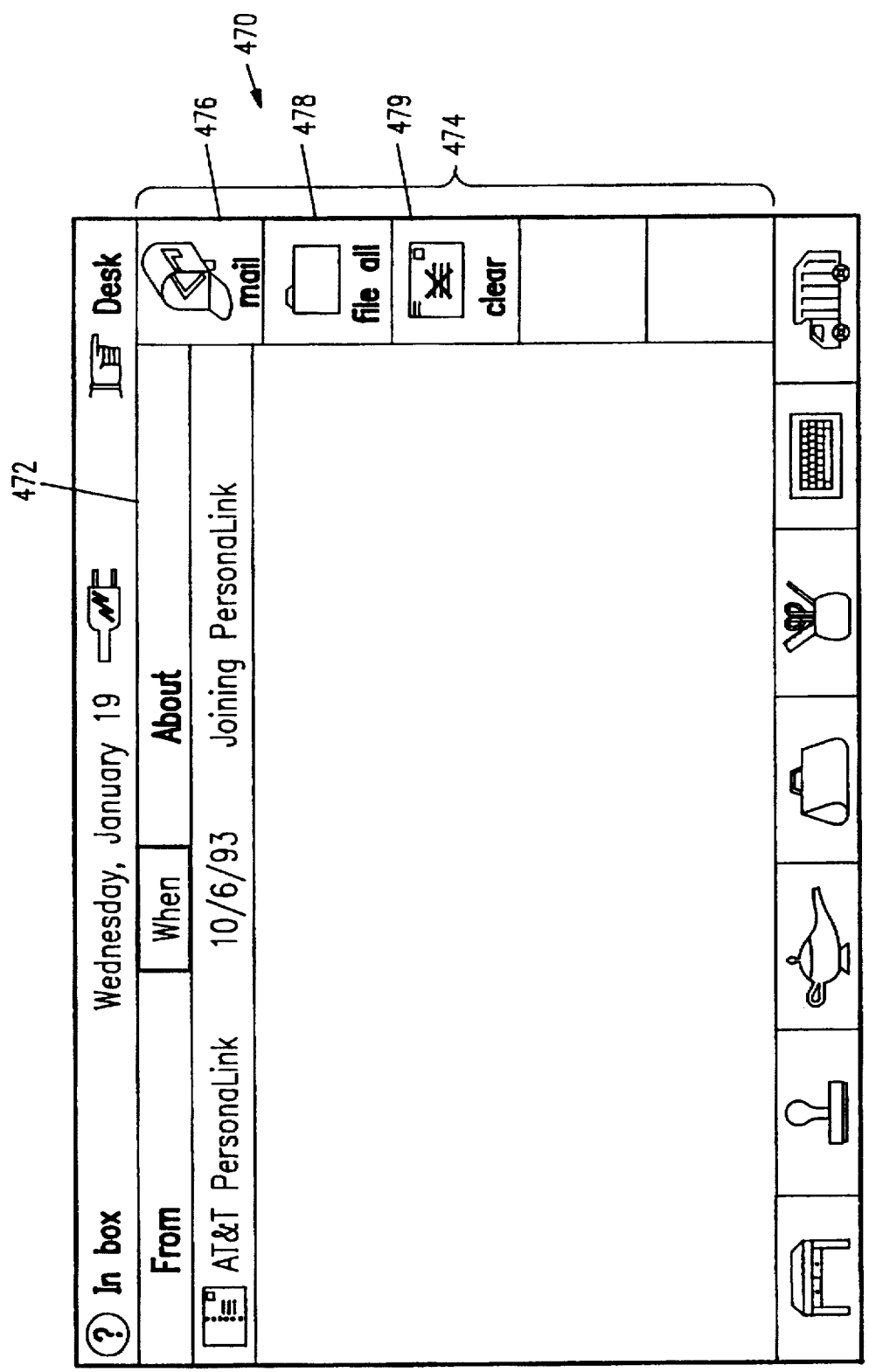
FIG. 12 is a plan view of an in box screen presentation of a graphical user interface in accordance with the present invention.

Referring to FIG. 12, when in box object 170 is actuated from desk top scene 150, then in box scene 470 is presented on display device 106. In box scene 470 includes in box information portion 472 and in box control button portion 474. In box information portion 472 provides a list of any postcard objects that are stored within the in box object corresponding to in box scene 470. By actuating a name from the list, the postcard object corresponding to the name is presented on display device 106. In box control button portion 474 includes mail button 476, file button 478 and clear button 479.

Mail button 476 controls collecting more cards like those in the list of postcard objects that is displayed in in box information portion 472. File button 478 controls filing the postcard objects listed in in box information portion 472 in file cabinet 174. Clear button 479 controls discarding the postcard objects listed in in box information portion 472.

Figure 13:
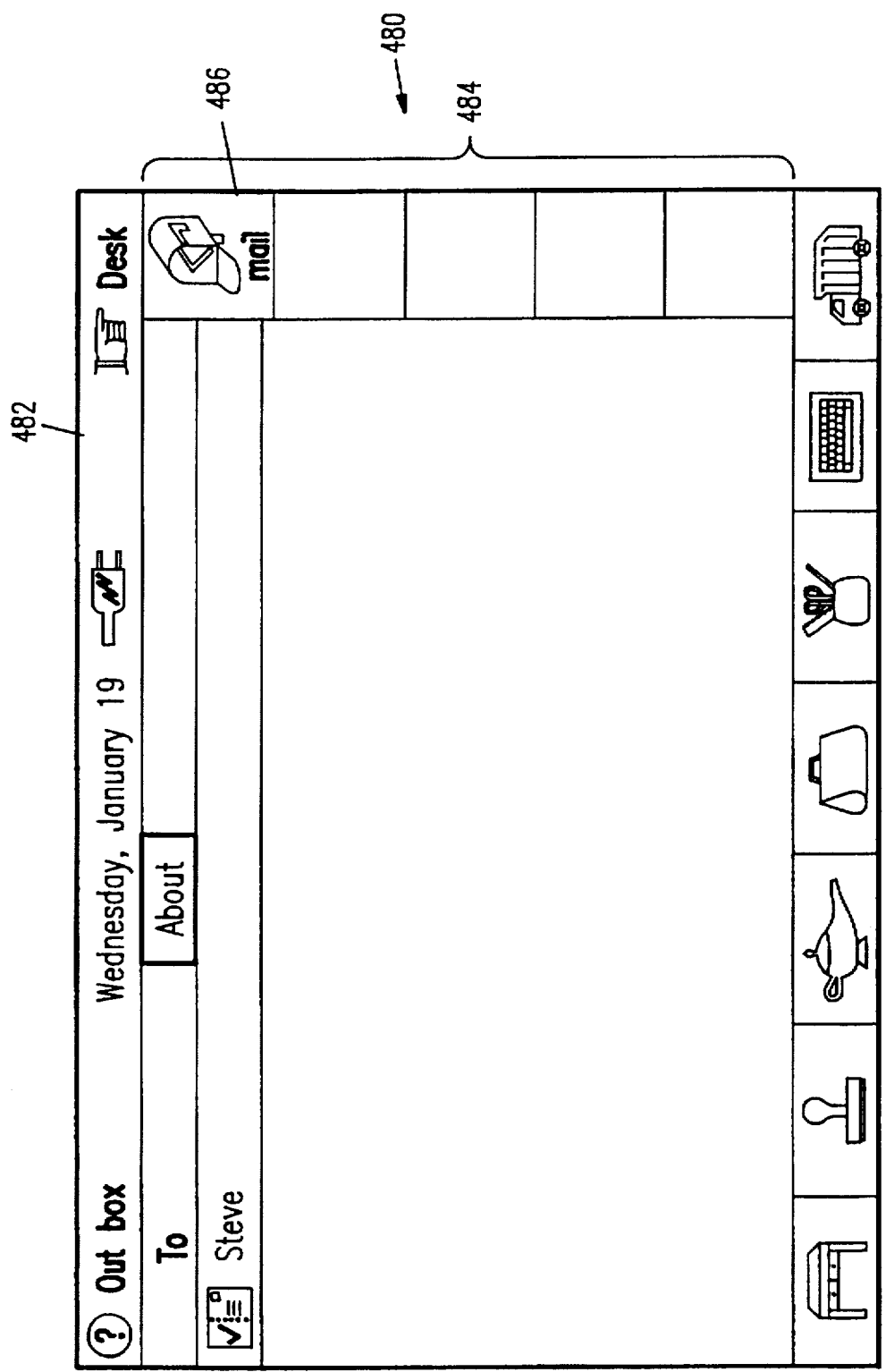
FIG. 13 is a plan view of an outbox screen presentation of a graphical user interface in accordance with the present invention.

Referring to FIG. 13, when out box object 172 is actuated from desk top scene 150, then out box scene 480 is presented on display device 106. Out box scene 480 includes out box information portion 482 and out box control button portion 484. Out box information portion 482 provides a list of any postcard objects that are stored within the out box object corresponding to out box scene 480. By actuating a name from the list, the postcard object corresponding to the name is presented on display device 106. In box control button portion 484 includes mail button 486. Mail button 486 controls sending the list of postcard objects that is displayed in out box information portion 482.

Figure 14:
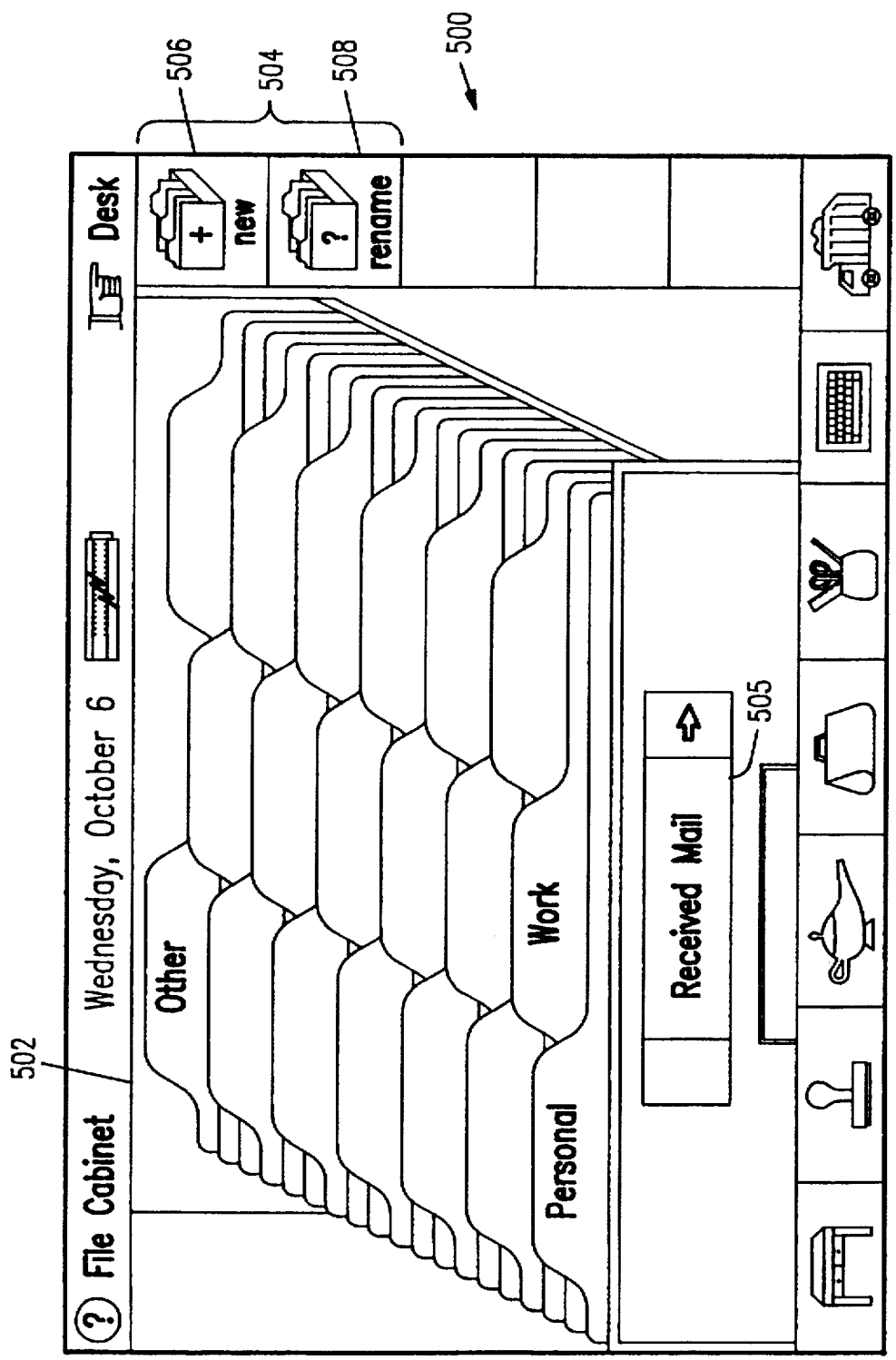
FIG. 14 is a plan view of a file cabinet screen presentation of a graphical user interface in accordance with the present invention.

Referring to FIG. 14, when file cabinet object 164 is actuated from desk scene 150, then file cabinet scene 500 is displayed on display device 106. File cabinet scene 500 includes file drawer portion 502 and file cabinet control button portion 504. File drawer portion 502 includes a metaphor of an open filed drawer containing a plurality of files, which are either named or unnamed; the opened file drawer includes received mail button 505. File cabinet control button portion 504 includes new button 506 and rename button 508.

When new file button 506 is actuated, a user may create a new file folder. When rename button 508 is actuated, a user may rename a particular file which is held within the file drawer.

Figure 15:
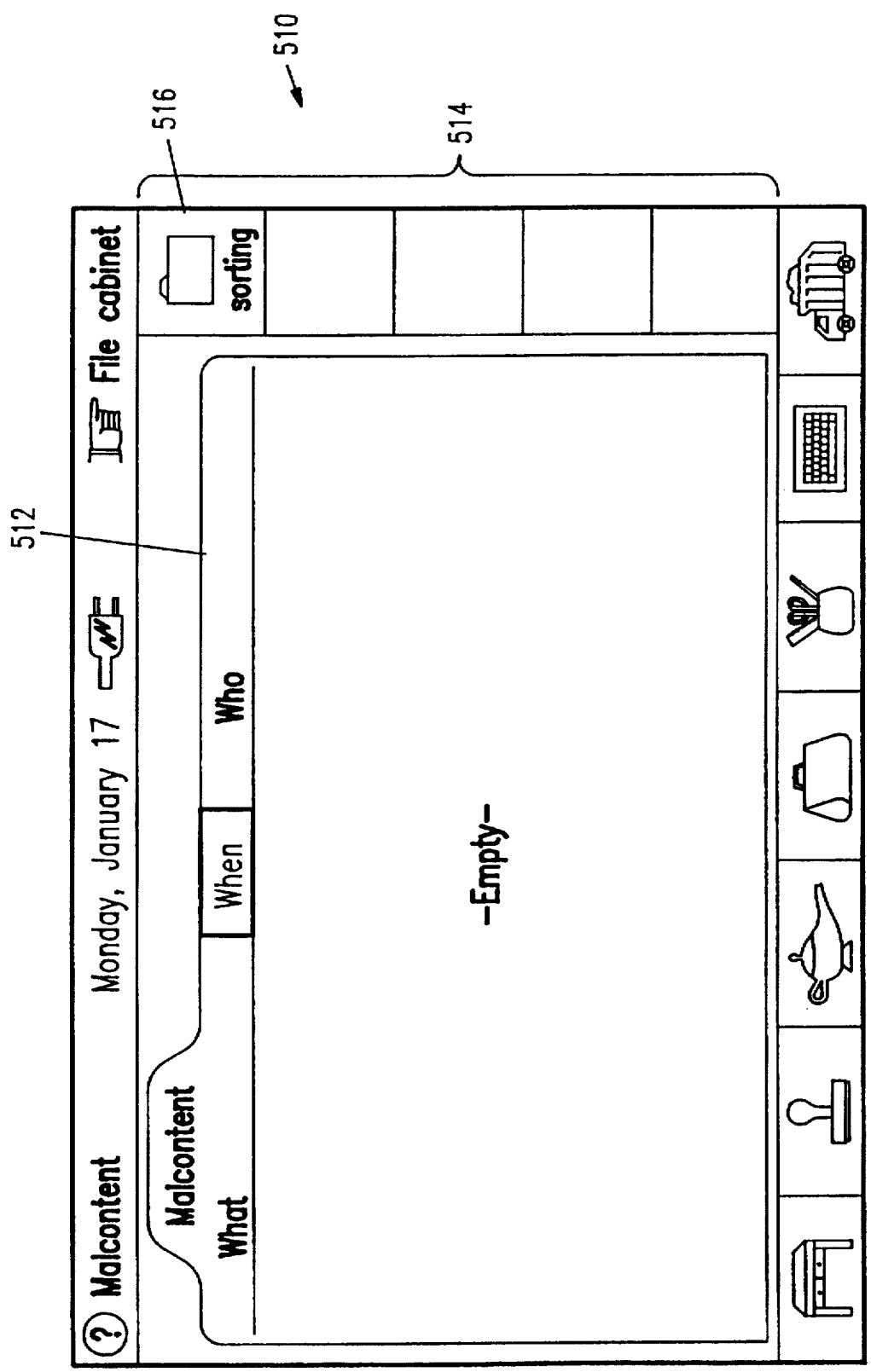
FIG. 15 is a plan view of a file screen presentation of a graphical user interface in accordance with the present invention.

Referring to FIG. 15, when a particular file is actuated in file drawer cabinet scene 500, then file scene 510 is presented on display device 106. File scene 510 includes file portion 512 as well as file control button portion 514. File portion 512 provides a metaphor of an open file. The open file contains information which may be categorized using the information What, When and Who. These categorizers are edited to indicate the contents of file scene 510. File control button portion 512 includes file sorting button 516. File sorting button 516 provides a sorting function to the files that are stored within a file drawer 502.

Figure 16:
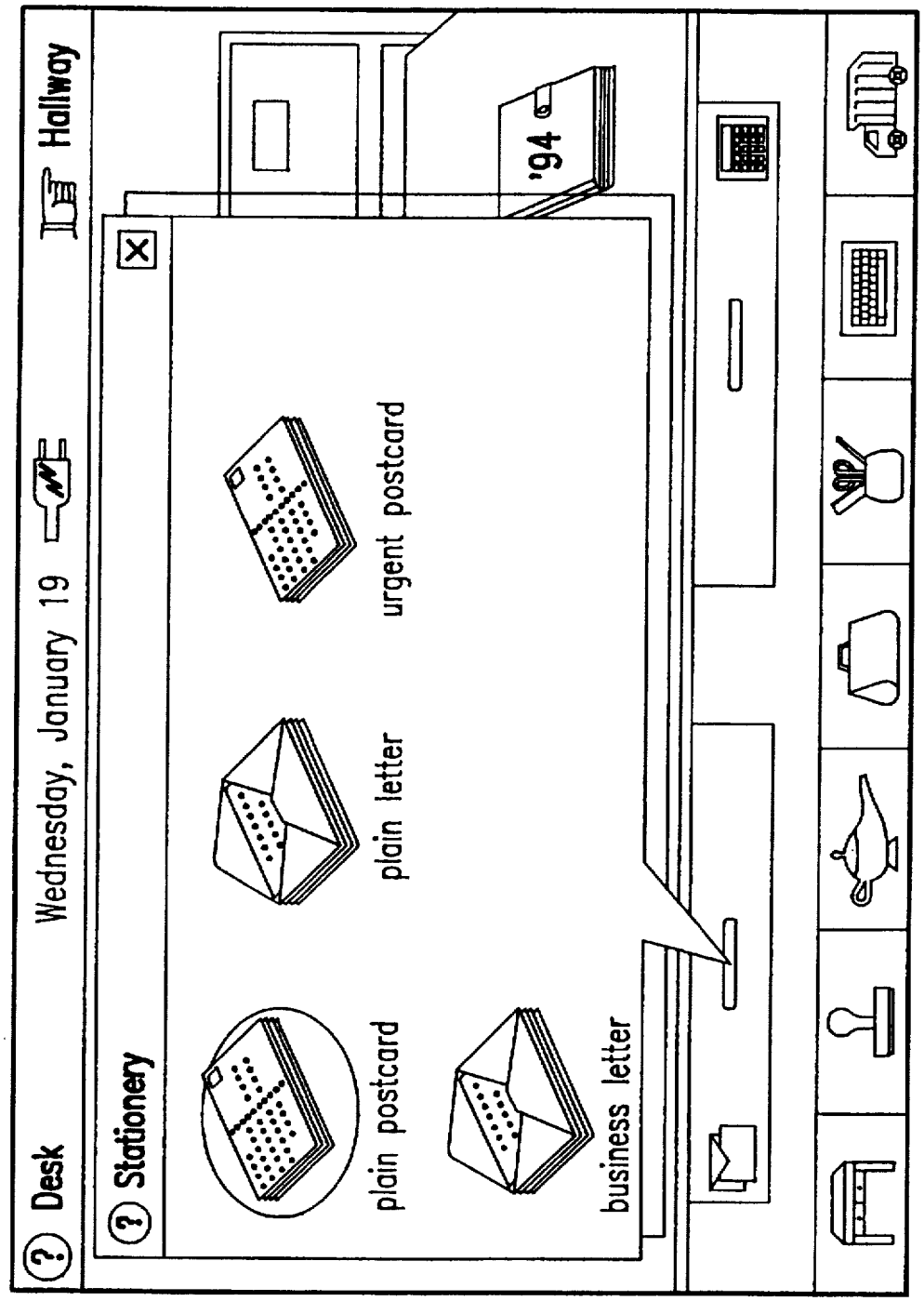
FIG. 16 is a plan view of a screen presentation of a desk top in which a stationery accessory drawer is accessed in a graphical user interface in accordance with the present invention.

Referring to FIG. 16, when stationery drawer 164 is actuated, the drawer is shown as physically open and window 520 pops up which shows the contents of stationery drawer 164. Stationery drawer 164 contains objects representing individual object level objects relating to generating correspondence. For example, stationery drawer 164 may contain objects representing a plain postcard, a plain letter, an urgent postcard, and a business letter. When one of these objects is actuated, the scene corresponding to the actuated object is presented to display device 106.

Figure 17:
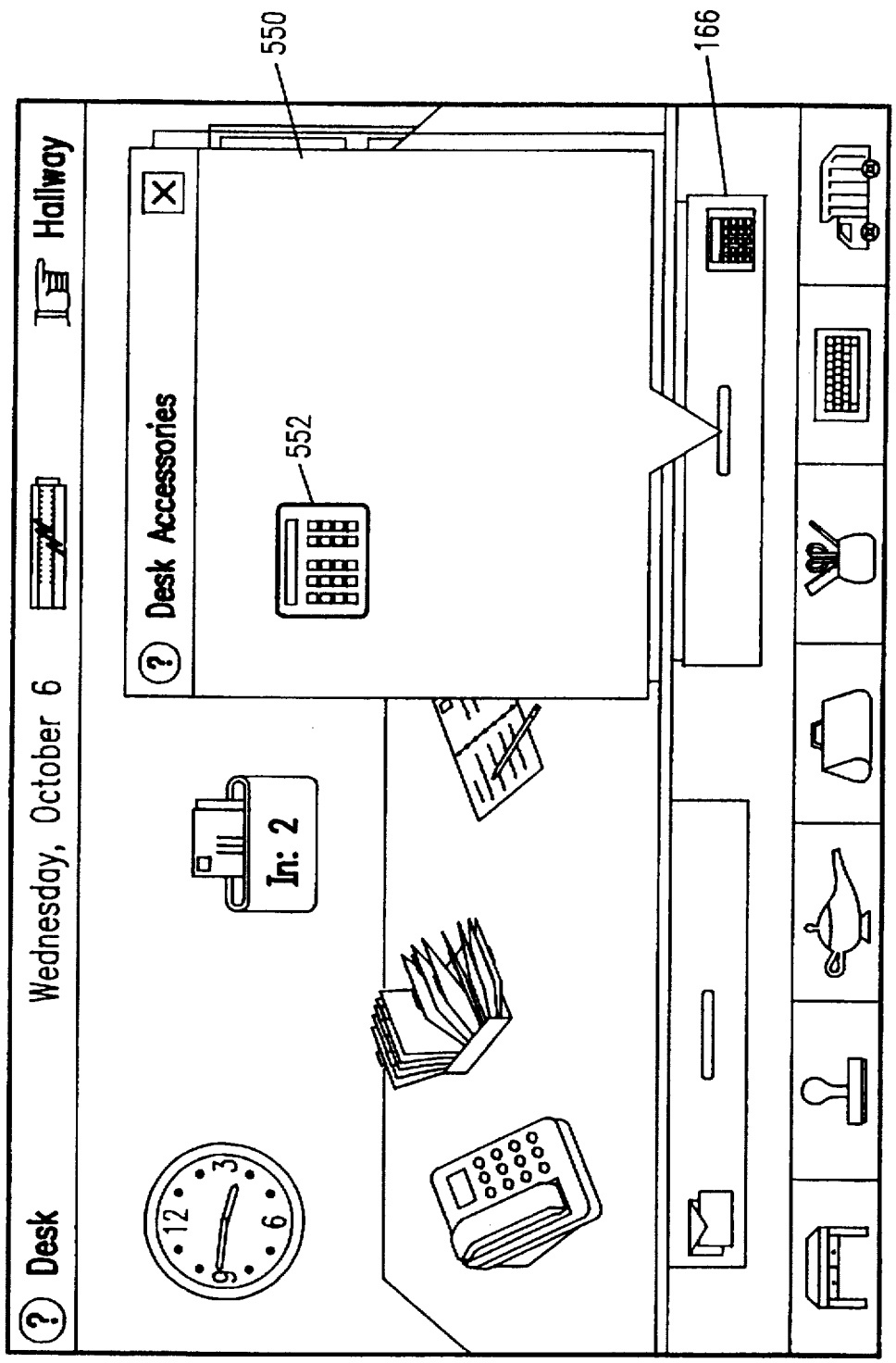
FIG. 17 is a plan view of a screen presentation of a desk top in which a desk accessory drawer is accessed in a graphical user interface in accordance with the present invention.

Referring to FIG. 17, when overflow drawer 166 is actuated, the drawer is shown as physically open and window 550 pops up which shows the contents of overflow drawer 166. For example, overflow drawer 166 may contain calculator 552. Additionally, any of the objects which are located on the top of desk 152 may be moved to be held in overflow drawer 166. If these objects are held within overflow drawer 166, then they too are displayed when overflow drawer 166 is actuated.

Figure 18:
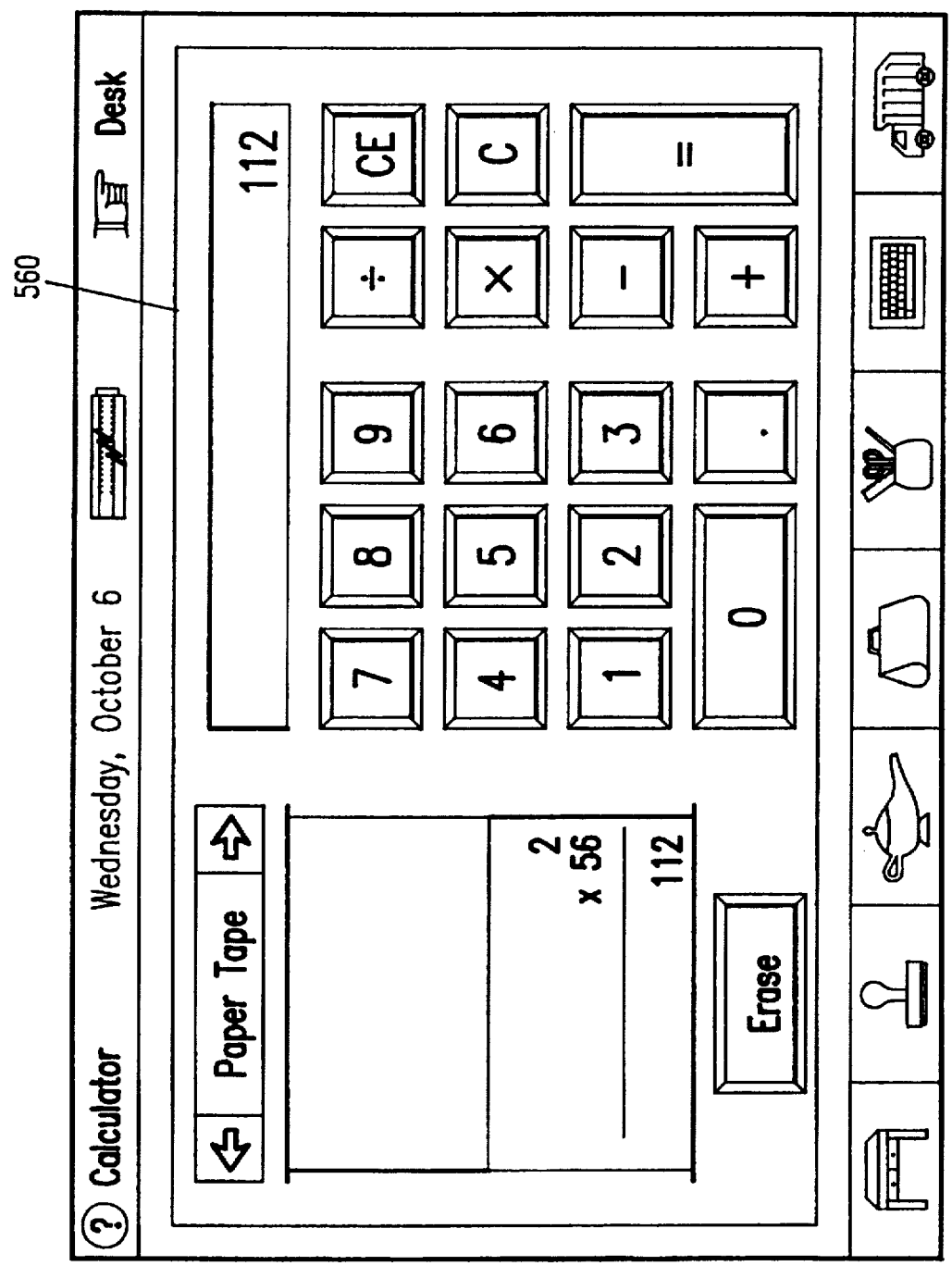
FIG. 18 is a plan view of a calculator screen presentation of a graphical user interface in accordance with the present invention.

Referring to FIG. 18, when calculator 552 is actuated from overflow drawer window 550, then calculator scene 560 is displayed on display device 106. Calculator scene 560 represents a typical calculator. Calculator object 552 functions as a typical calculator when one activates the keypads as displayed in calculator scene 560.

Figure 19A:
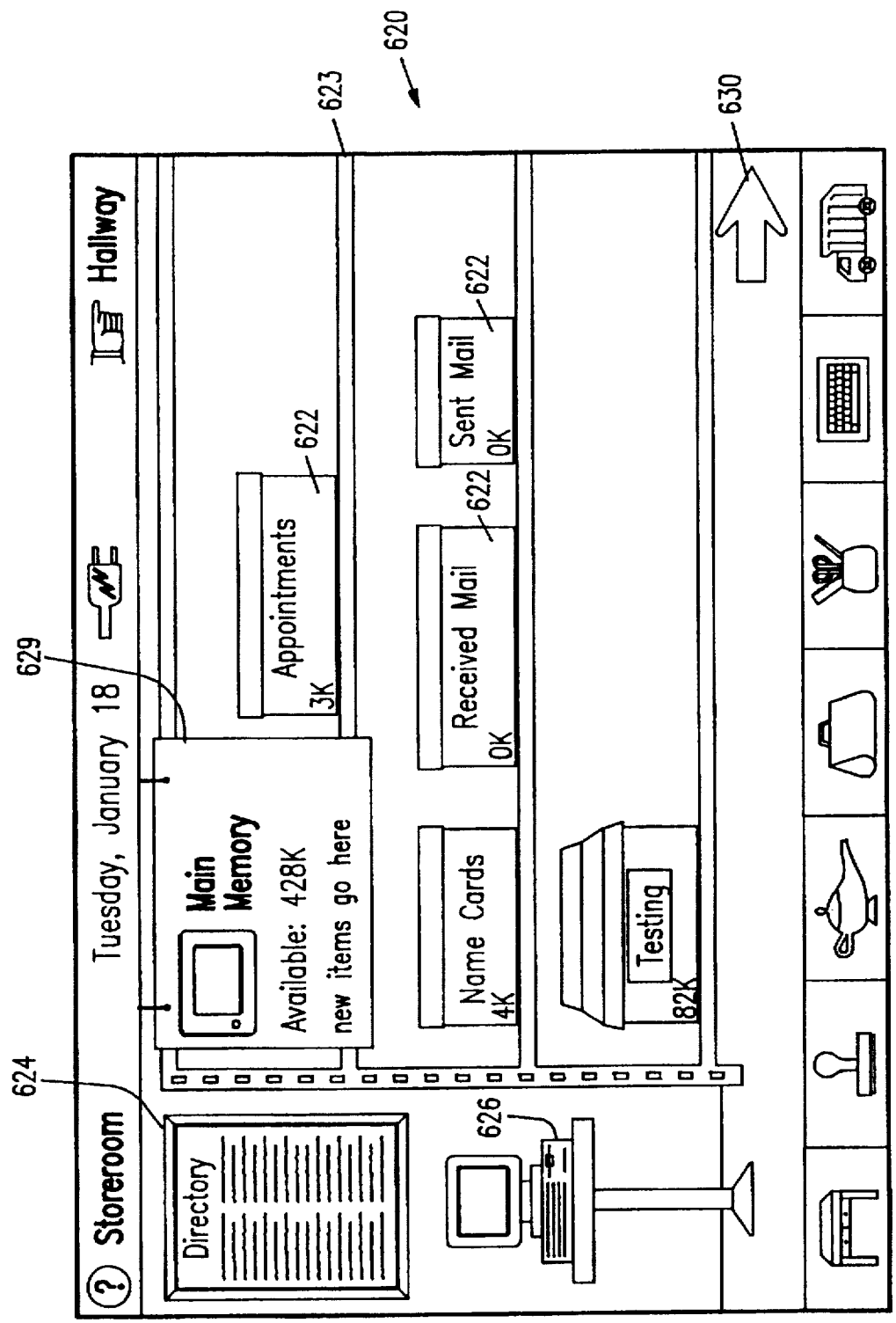
FIGS. 19A and 19B are plan views of a store room screen presentation of a graphical user interface in accordance with the present invention.
Figure 19B:
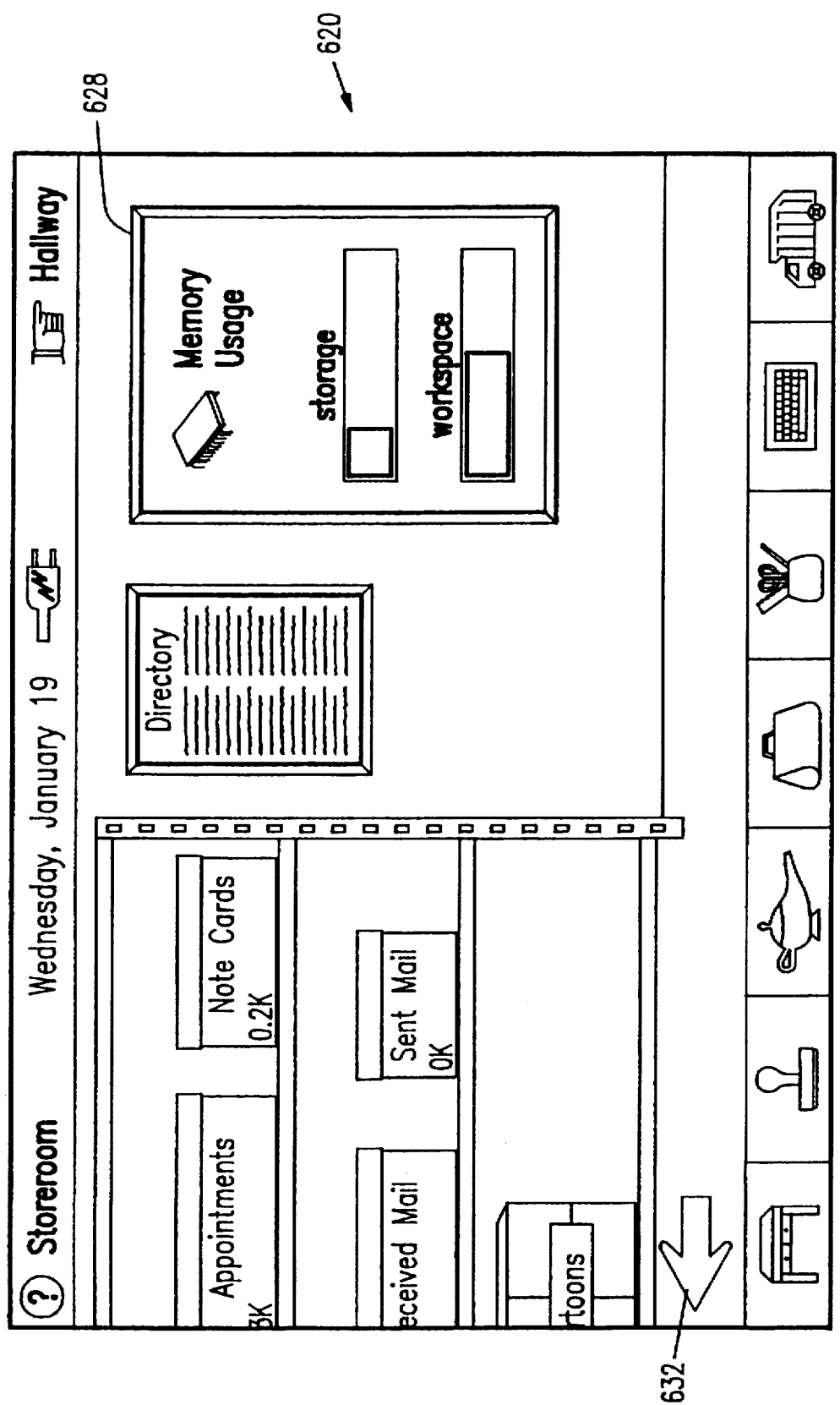

Referring to FIG. 19A, when storeroom entrance 242 is actuated from hallway scene 220, then storeroom scene 620 is displayed on display device 106. Storeroom scene 620 represents the room level storeroom object which allows users to mange software packages, for example controlling how computer system 100 uses memory 104. Storeroom scene 620 includes a plurality of boxes 622 which are held on shelf 623 as well as directory 624, computer 626 and memory usage indicator 628. Computer 626 controls the relation of system 100 to external computers connected by an interconnect cable or through any other communication device 108. Memory usage indicator 628 provides an indication of the amount of storage space available as well as the amount of memory available for use by the work space. Storeroom scene 620 uses arrows 630, 632 to navigate within the storeroom.

Each box 622 in storeroom scene 620 includes a memory consumption indicator in its lower left corner which indicates how much memory the software package consumes when active. The boxes represent information in the various central components of the communicator. When a component is active, i.e., open, then the box which corresponds to this component is displayed as open, see e.g., the testing box and the help books box.

The components can be moved to electronic memory cards by sliding the boxes from one set of shelves to another set of shelf. More specifically, a shelf (not shown) is associated with each memory card inserted in option card slot 109. By moving boxes to this memory card shelf, the information which is stored in the box is then copied to the memory card.

Each set of shelves 623 includes identification plaque 629. Identification plaque 629 includes a title which represents what the set of shelves is representing, e.g., the "Main Memory" set of shelves indicates information that is stored within main memory. Identification plaque 629 also includes text which sets forth how much memory remains in the location represented by the particular set of shelves.

Figure 20:
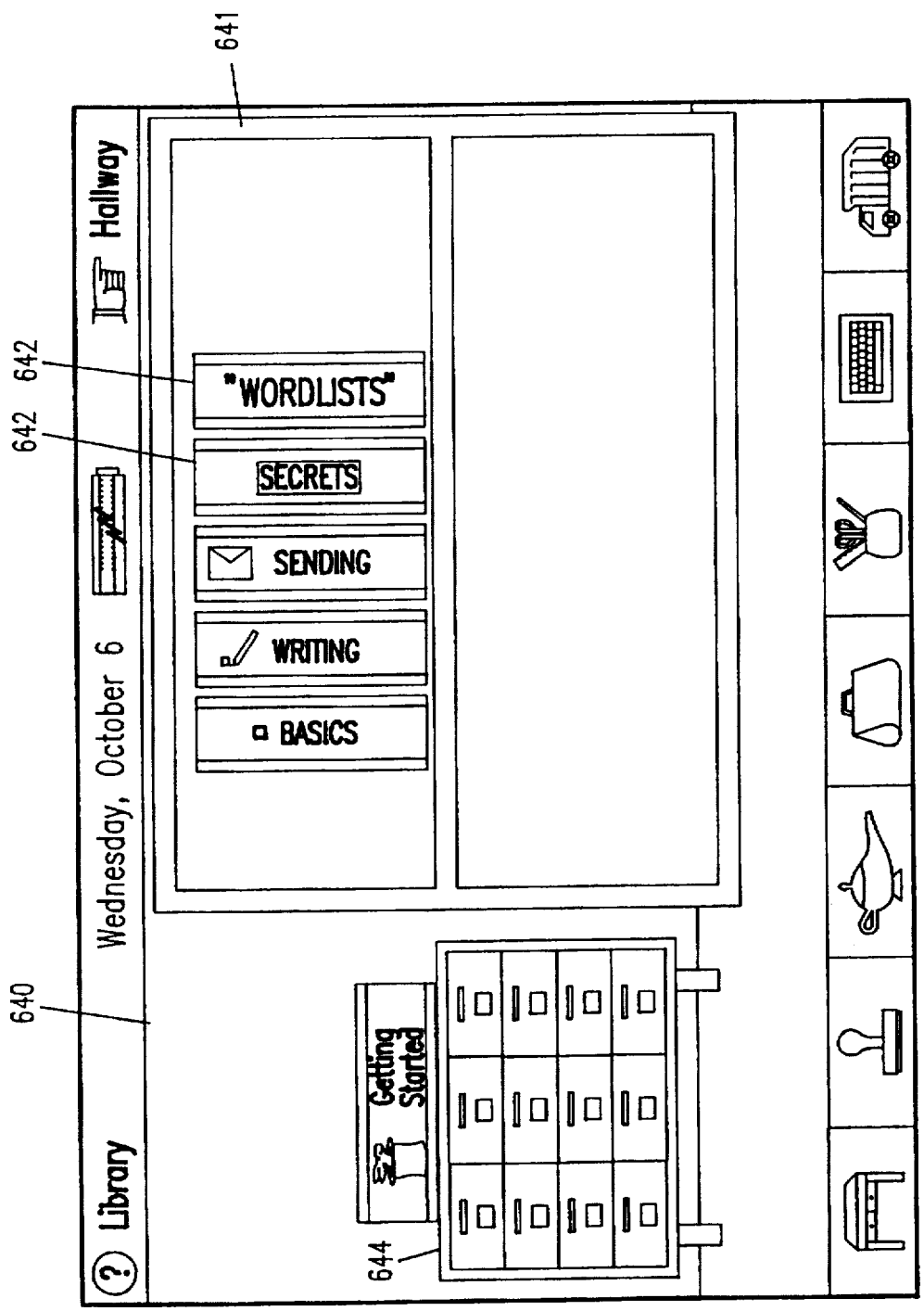
FIG. 20 is a plan view of a library screen presentation of a graphical user interface in accordance with the present invention.

Referring to FIG. 20, when library entrance 240 is actuated from hallway scene 220, then library scene 640 is displayed on display device 106. Library scene 640 represents the room level library object which allows users to access books of information such as information on getting started using communication system 100.

Library scene 640 includes a plurality of books 642 arranged on bookshelf 641 as well as card catalog 644. Each book 642 represents a file of information which may be read by a user by actuating the book. Card catalog 644 provides a text listing of the books contained in library 640.

Figure 21:
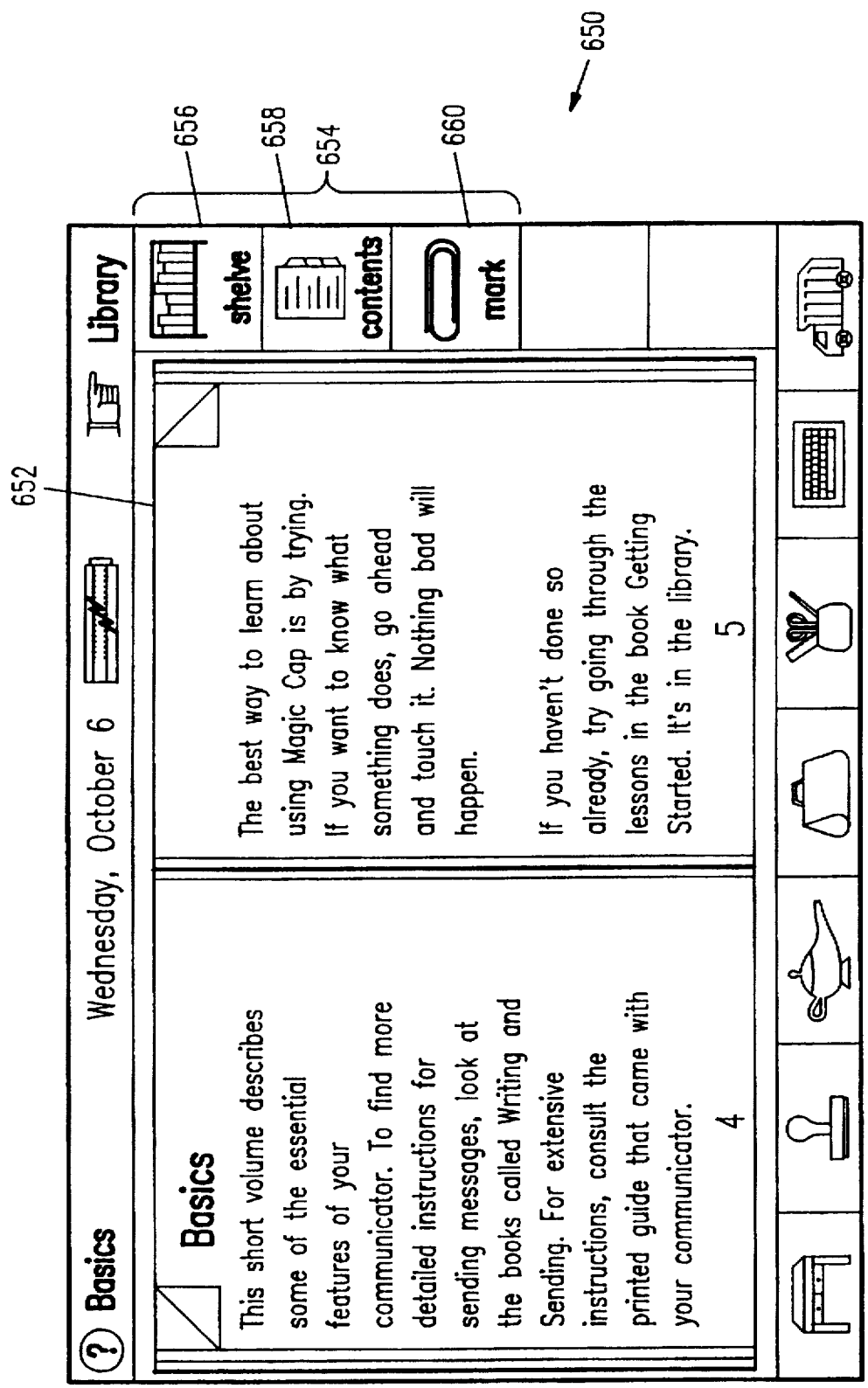
FIG. 21 is a plan view of a book screen presentation of a graphical user interface in accordance with the present invention.

Referring to FIG. 21, when book object 642 is actuated from library scene 640, book scene 650 is displayed on display device 106. Book scene 650 includes book portion 652 as well as book control button portion 654. Book portion 652 displays a physical metaphor of a book which is read by moving through the pages by a user's touching the corners of each page. Book control button portion 654 includes shelve button 656, contents button 658 and mark button 660.

When actuated, shelve button 656 allows a user to return to the shelves of library scene 640 with the book that is activated being returned to the shelf. (As compared to the step back function which returns to library scene 640 with the activated book separated from the books on the shelves.) When actuated, contents button 658 allows a user to see the contents of the current book 652. Mark button 660 allows a user to mark a page of the current book.

Figure 22:
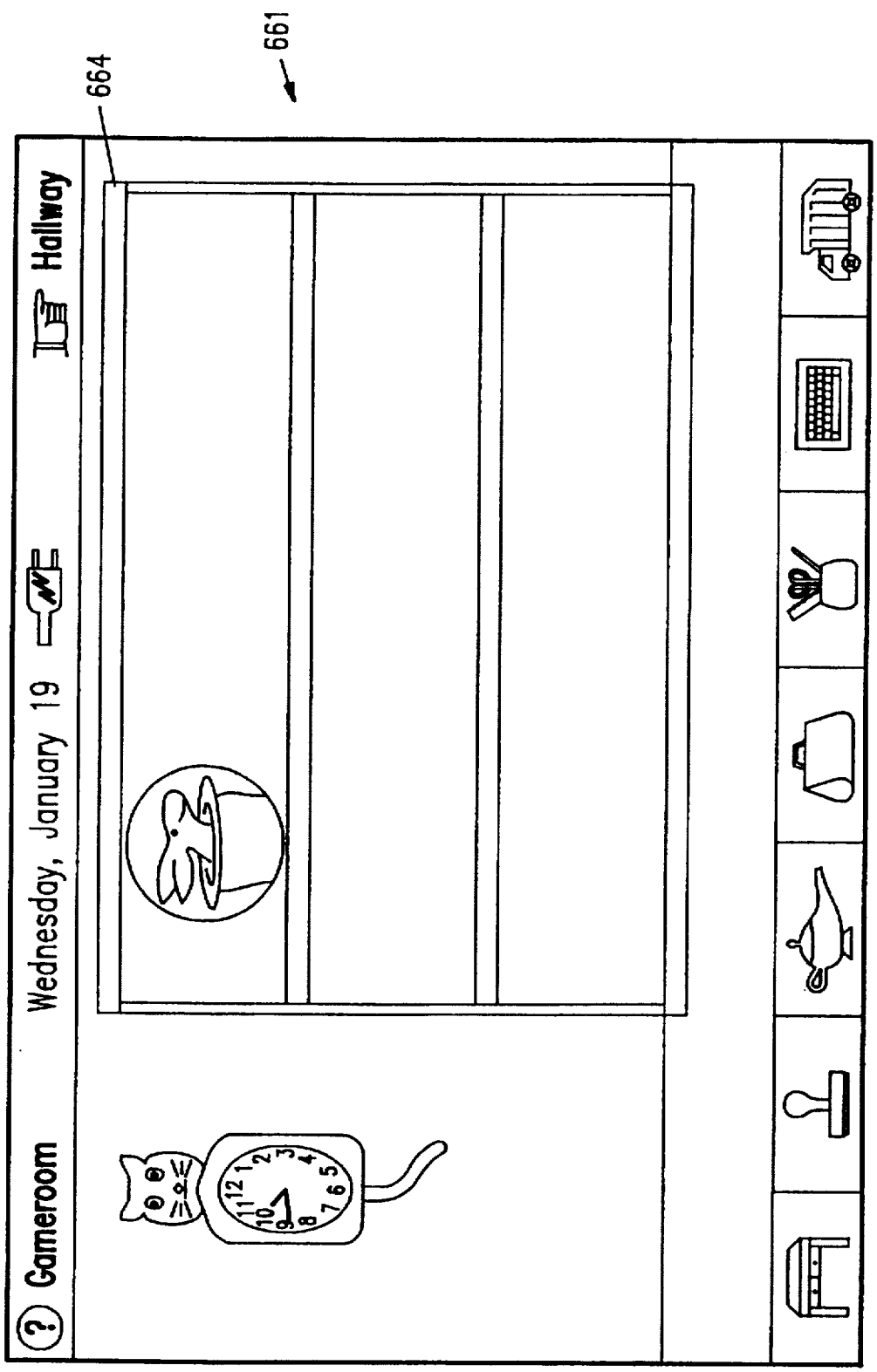
FIG. 22 is a plan view of a gameroom screen presentation of a graphical user interface in accordance with the present invention.

Referring to FIG. 22, when game room entrance 245 is actuated from hallway scene 220, then game room scene 661 is presented on display device 106. Game room scene 661 represents the room level game room object which allows users to access games. Game room scene 661 includes shelves 664 on which game objects are located. By actuating representations of the game objects, the actual game objects are presented on display device 106.

Figure 23:
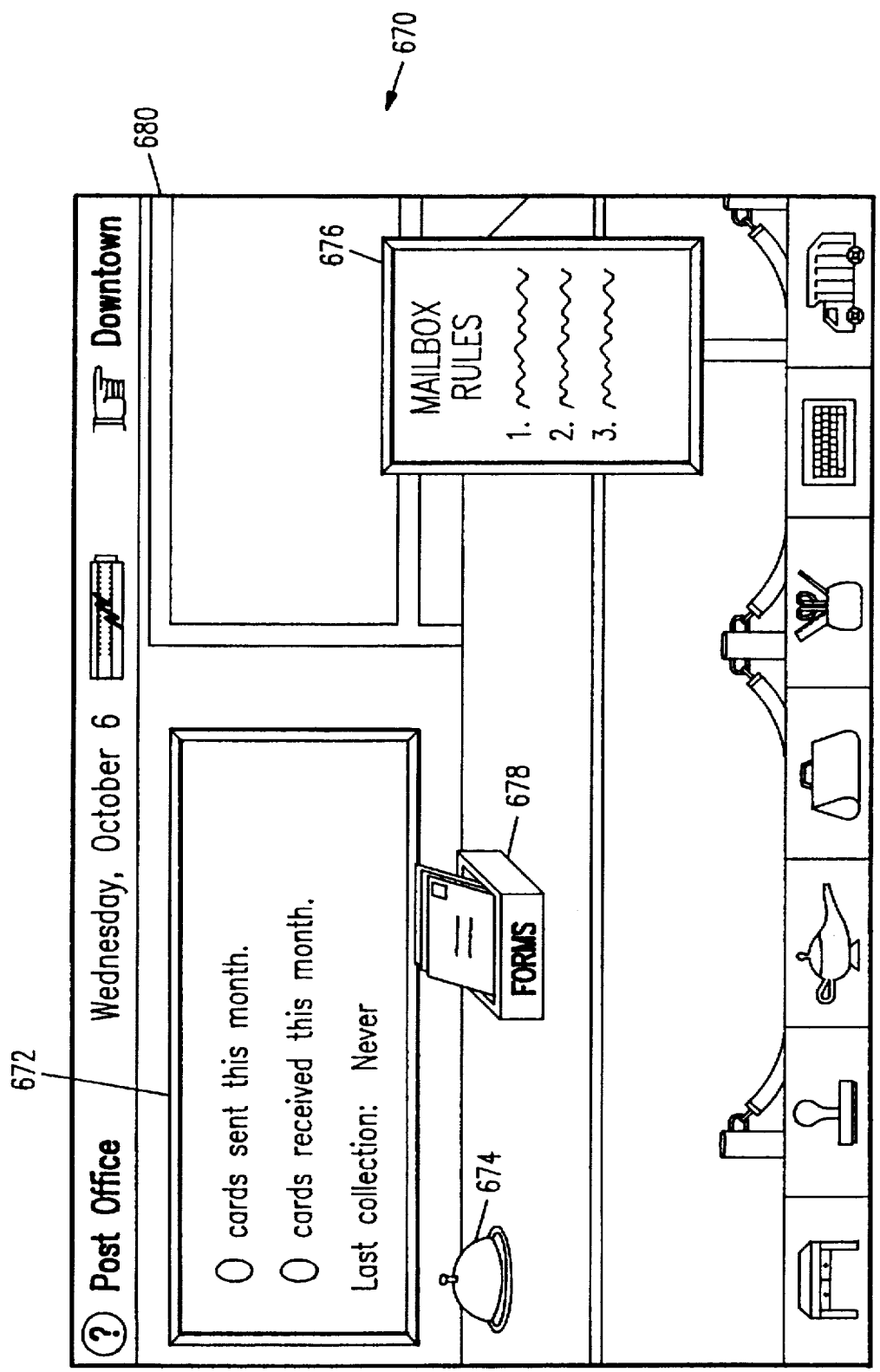
FIG. 23 is a plan view of a post office screen presentation of a graphical user interface in accordance with the present invention.

Referring to FIG. 23, when post office building 312 is actuated from street scene 310 then post office scene 670 is displayed on display device 106. Post office scene 670 represents the town level post office object which allows users to send and receive information via communication device 108. Because post office scene 670 represents a single room building, post office scene 670 is accessed directly from street 310; there is no need to access a hallway before accessing post office scene 670.

Post office scene 670 includes mail indication portion 672, service bell 674, mailbox rules portion 676, forms holder 678 and shelves 680. Mail indication portion 672 indicates a history of how many cards were sent this month, how many cards were received and when the last collection of cards was. Service bell 674 allows a user to call up a service. Mail box rules portion 676 indicates rules for services to follow, e.g., forward any received messages to my secretary. Forms holder 678 provides access to different types of forms that are specific to operations for using an external service. Shelves 680 hold objects that are displayed in post office scene 670.

Figure 24:
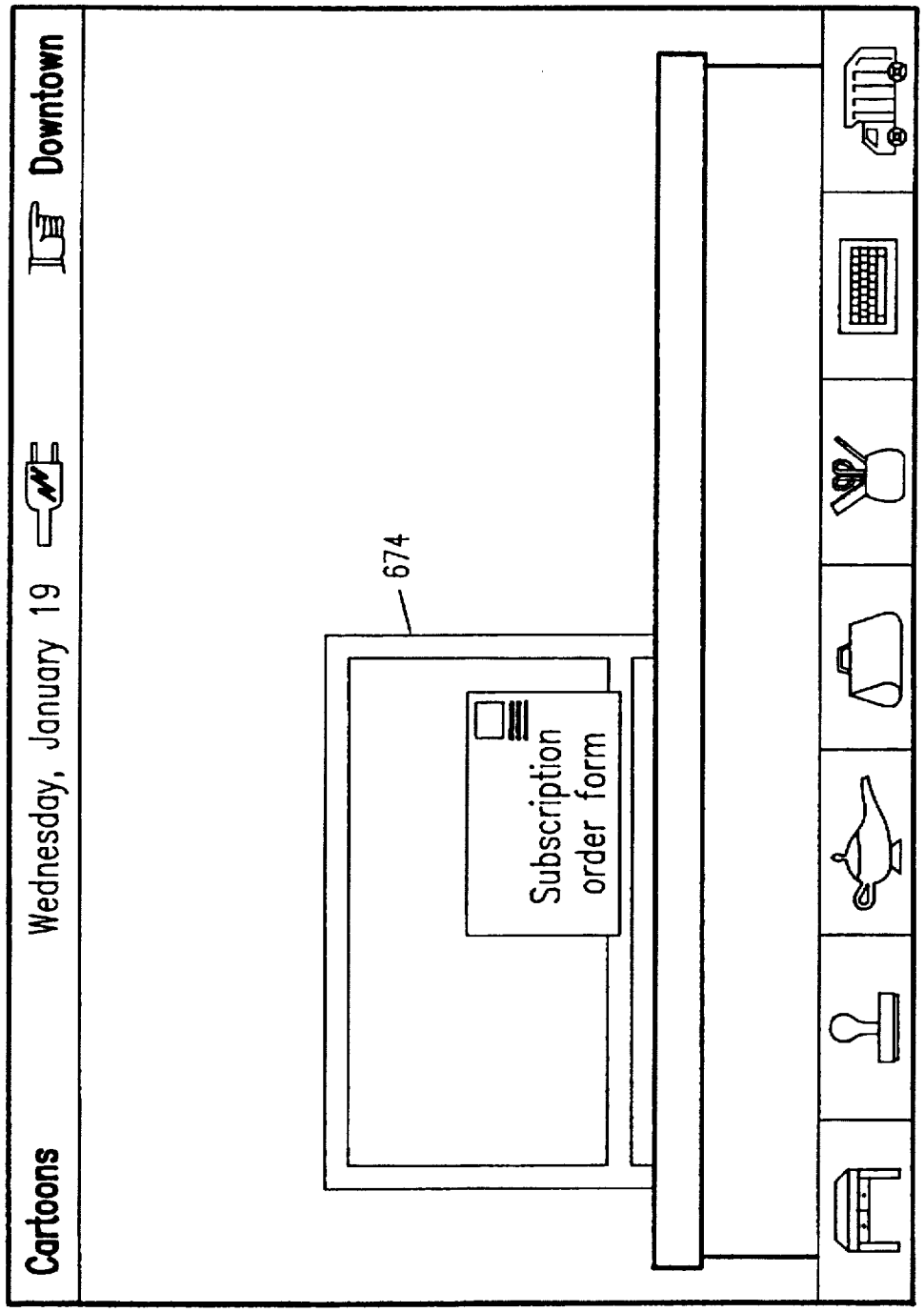
FIG. 24 is a plan view of a cartoon service presentation of a graphical user interface in accordance with the present invention.

Referring to FIG. 24, when cartoon building 313 is actuated from street scene, cartoon office scene 672 is presented on display device 106. Cartoon office scene 672 represents a building level cartoon service object which allows users to access an online cartoon service. Cartoon office scene 672 includes shelves 674 on which cartoons may be placed.

Figure 25A:
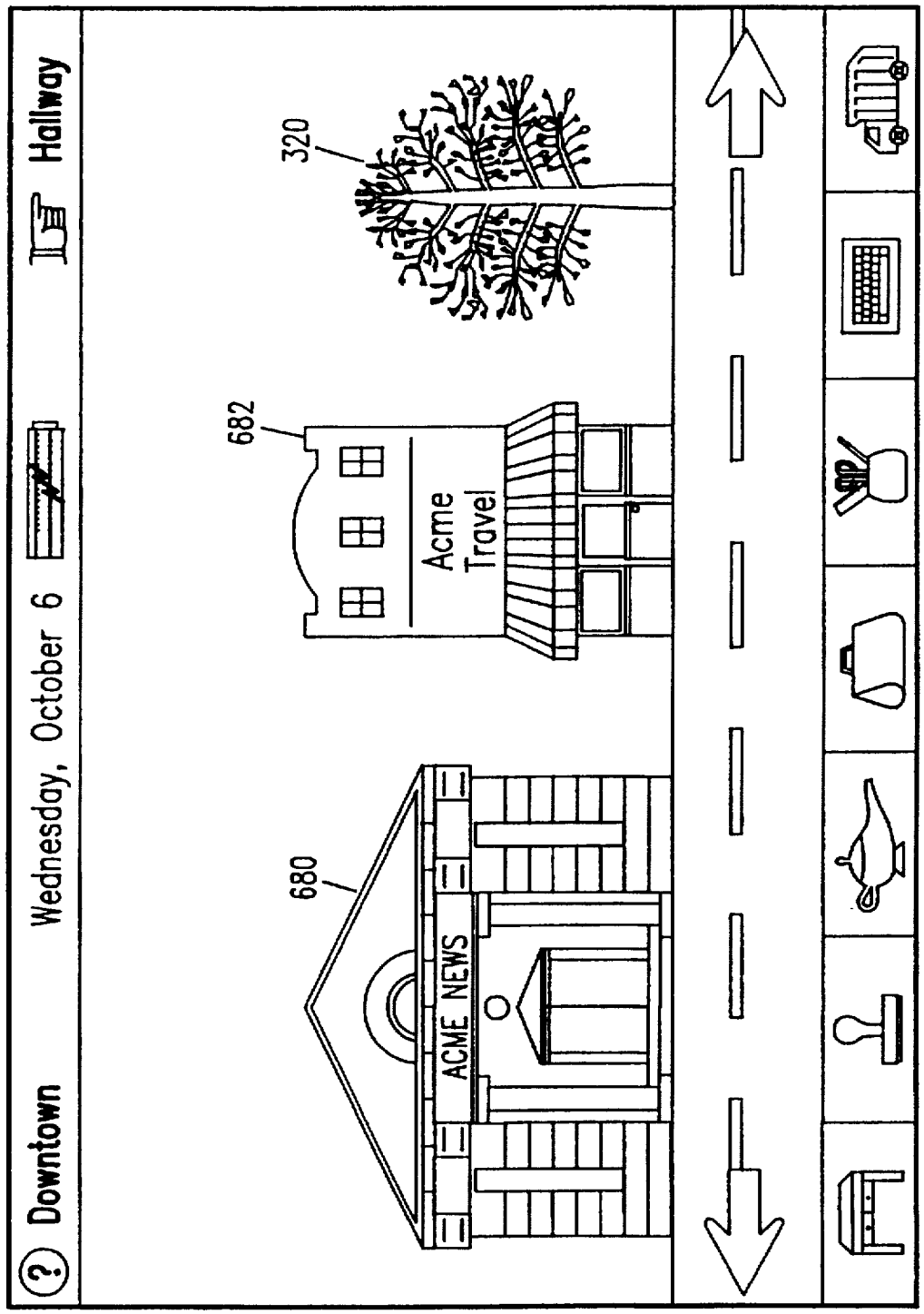
FIGS. 25A and 25B are plan views of a street screen presentation of a graphical user interface in accordance with the present invention.
Figure 25B:
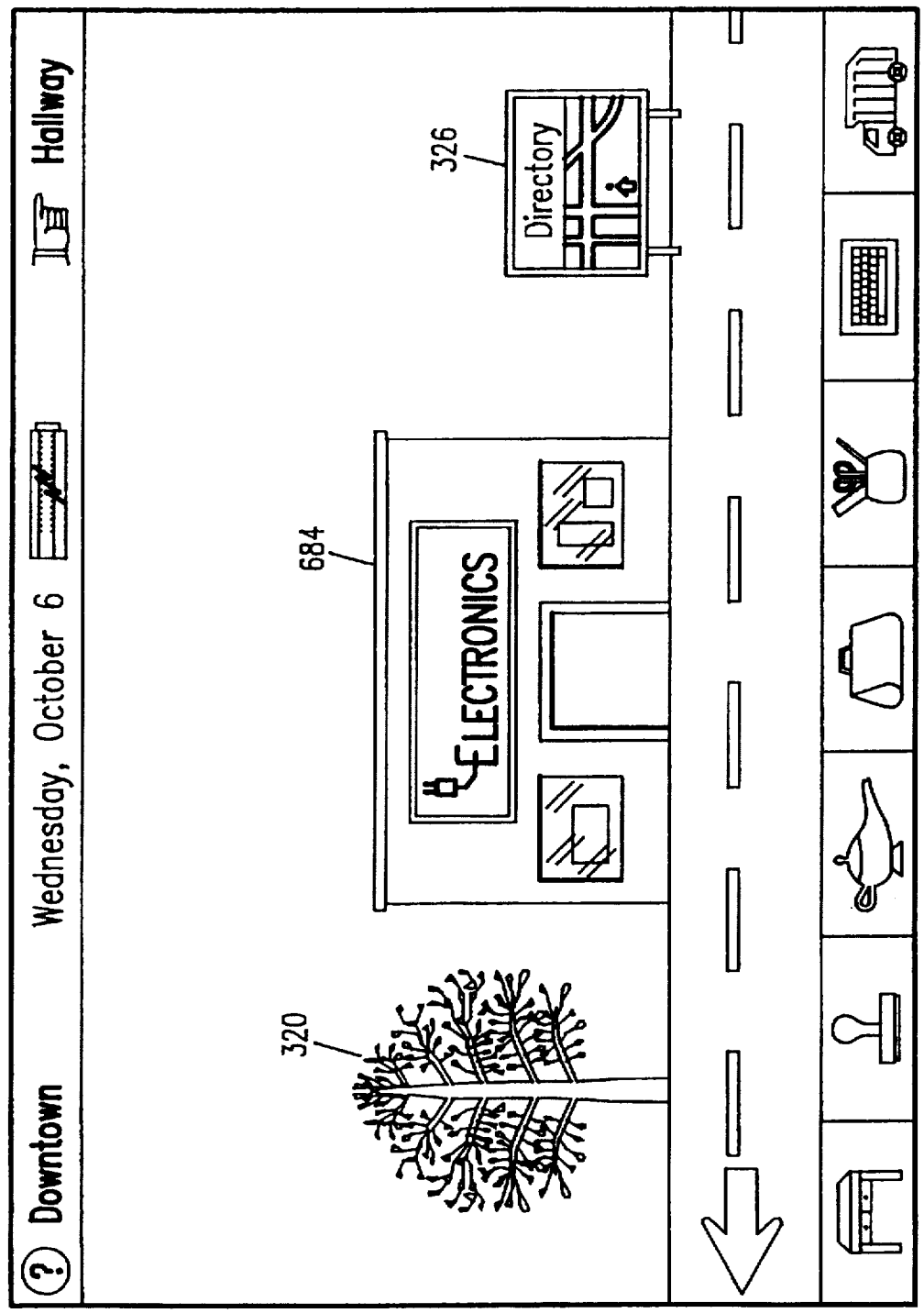

Referring to FIGS. 25A and 25B, because navigation system is extensible, other services may be added to street scene 310. For example, other services that might be accessed by computer system 100 include a news service represented by news building 680, a travel service represented by travel building 682 and a shopping service represented by store building 684. The news building level object and the store building level object will now be discussed; other building level objects such as a travel building level object have similar presentations and functionality.

Figure 26:
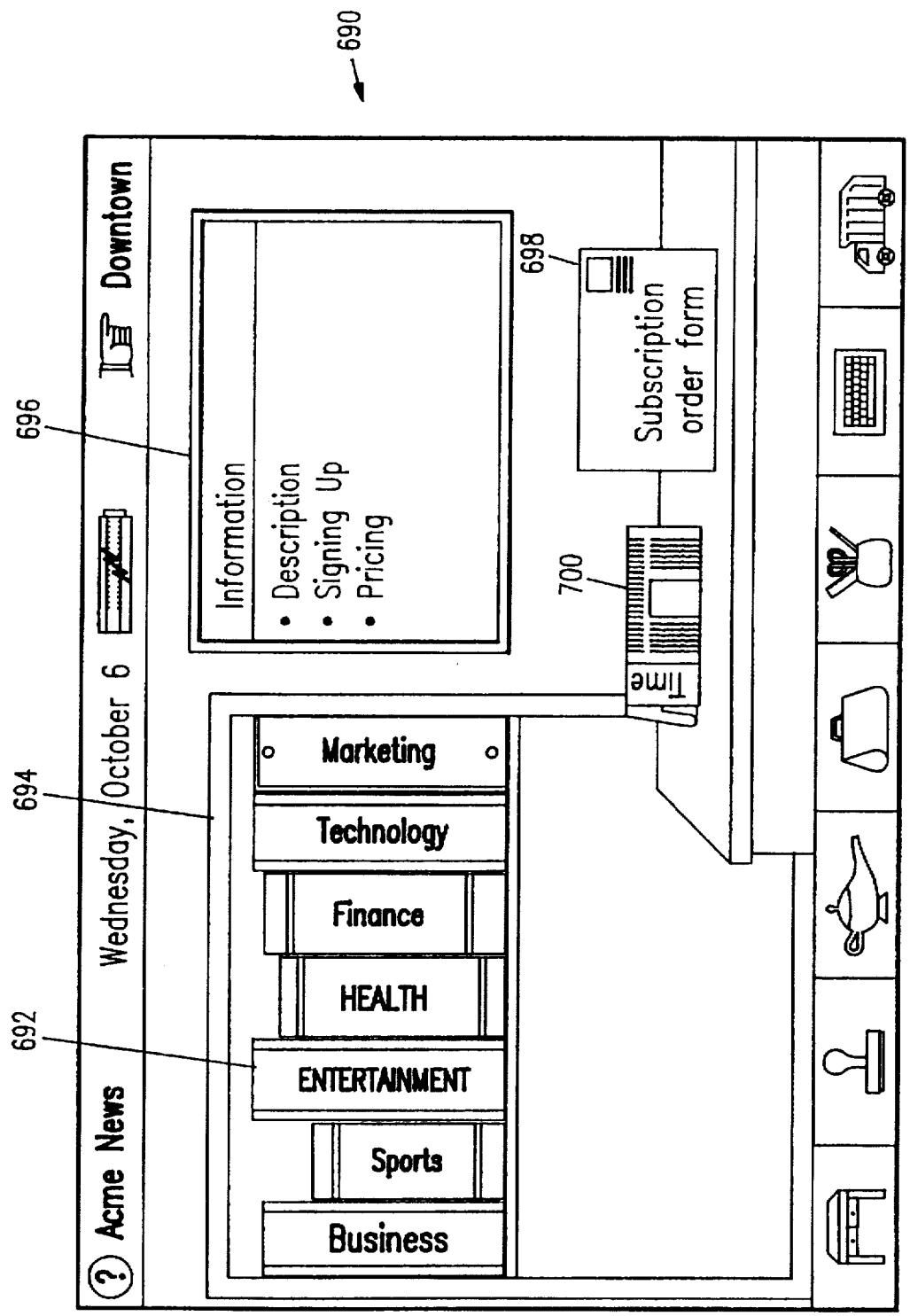
FIG. 26 is a plan view of a news office screen presentation of the FIG. 25 street screen presentation of a graphical user interface in accordance with the present invention.

Referring to FIG. 26, when news office building 682 is actuated from street scene 310 then news office scene 690 is displayed on display device 106. News office scene 690 represents the town level news office object which allows users to access online news information such as information about business or sports. Because news office scene 690 represents a single room building, news office scene 690 is accessed directly from street 310; there is no need to access a hallway before accessing news office room 690.

News office scene 690 includes books 692, which are held on shelves 694, news information portion 696, subscription portion 698 and free sample 700. Each book 692 represents a type of news service that may be accessed by actuating the respective book. News information portion 696 includes information about descriptions of the news services, signing up for a news service and pricing of the news services. Subscription portion 698 allows a user to subscribe to a particular news service. Free sample 700 provides a user with a free sample of the news service.

Figure 27:
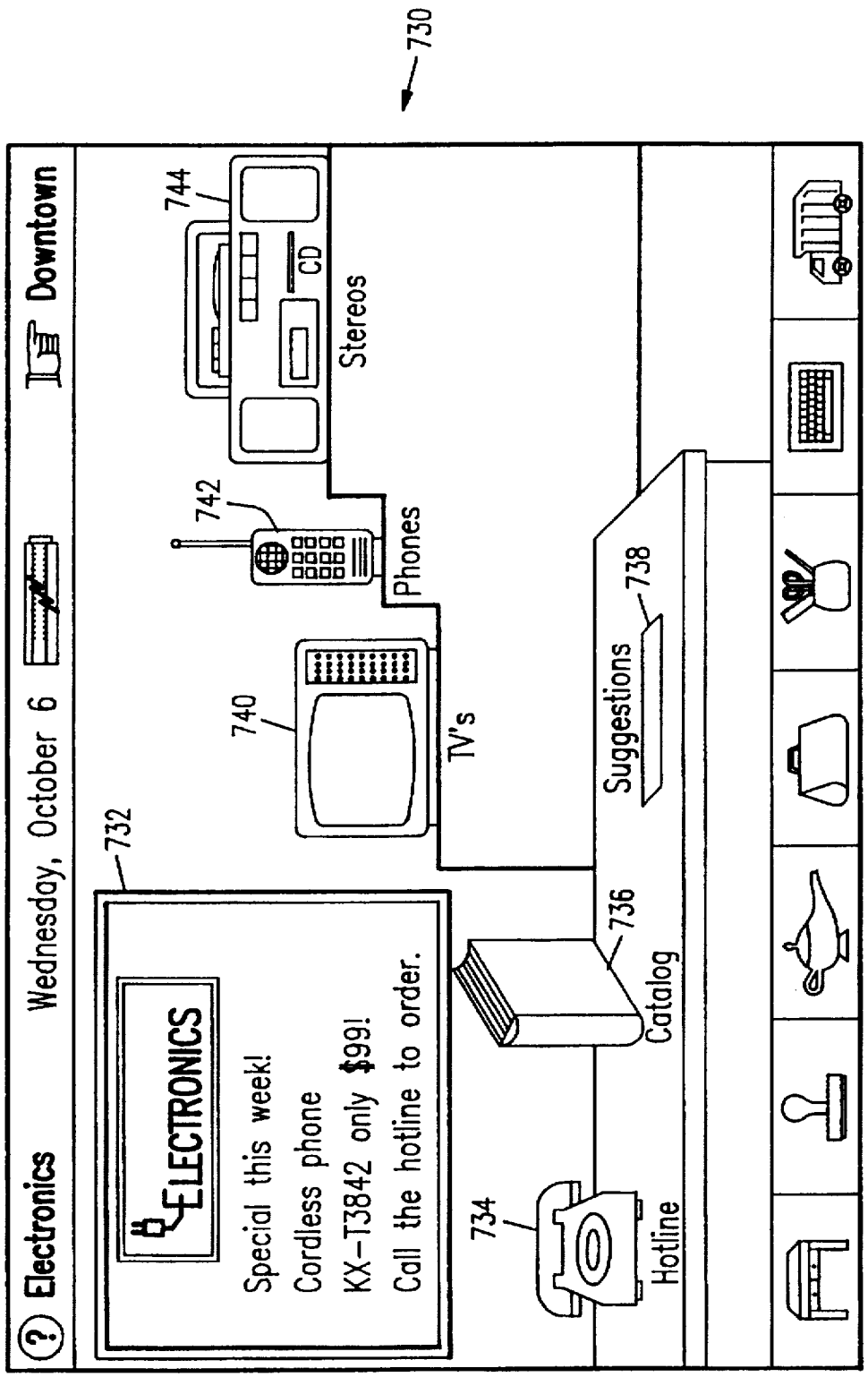
FIG. 27 is a plan view of a store sgreen presentation of the FIG. 25 street screen presentation of a graphical user interface in accordance with the present invention.

Referring to FIG. 27, when electronics store building 686 is actuated from street 310, then electronics store scene 730 is displayed on display device 106. Electronics store scene 730 represents the room level electronics store object which allows access to information regarding different types of electronics. Because electronics store scene 318 is a single room building, electronics store scene 730 is accessed directly from street 310; there is no need to access a hallway before accessing electronics store room 730.

Electronics store scene 730 includes electronics store information portion 732, hotline 734, catalog 736 and suggestion slot 738 as well as representations of television 740, telephone 742 and stereo 744. Electronics store information portion 732 provides information about the electronics store, such as information about weekly specials. Hotline 734 allows a user to order merchandise from electronics store 730. Catalog 736 allows a user to access information about all the merchandise that is carried by electronics store 730. Television 740, telephone 742, and stereo 744 allows a user to access information about the type of merchandise that is represented.

Referring to FIGS. 28A–28F, another means of navigating within commonly used functions of computer system 100 is via button strip 182. When each button of button strip 182 is actuated, a window containing elements related to the button's function is presented.

Figure 28A:
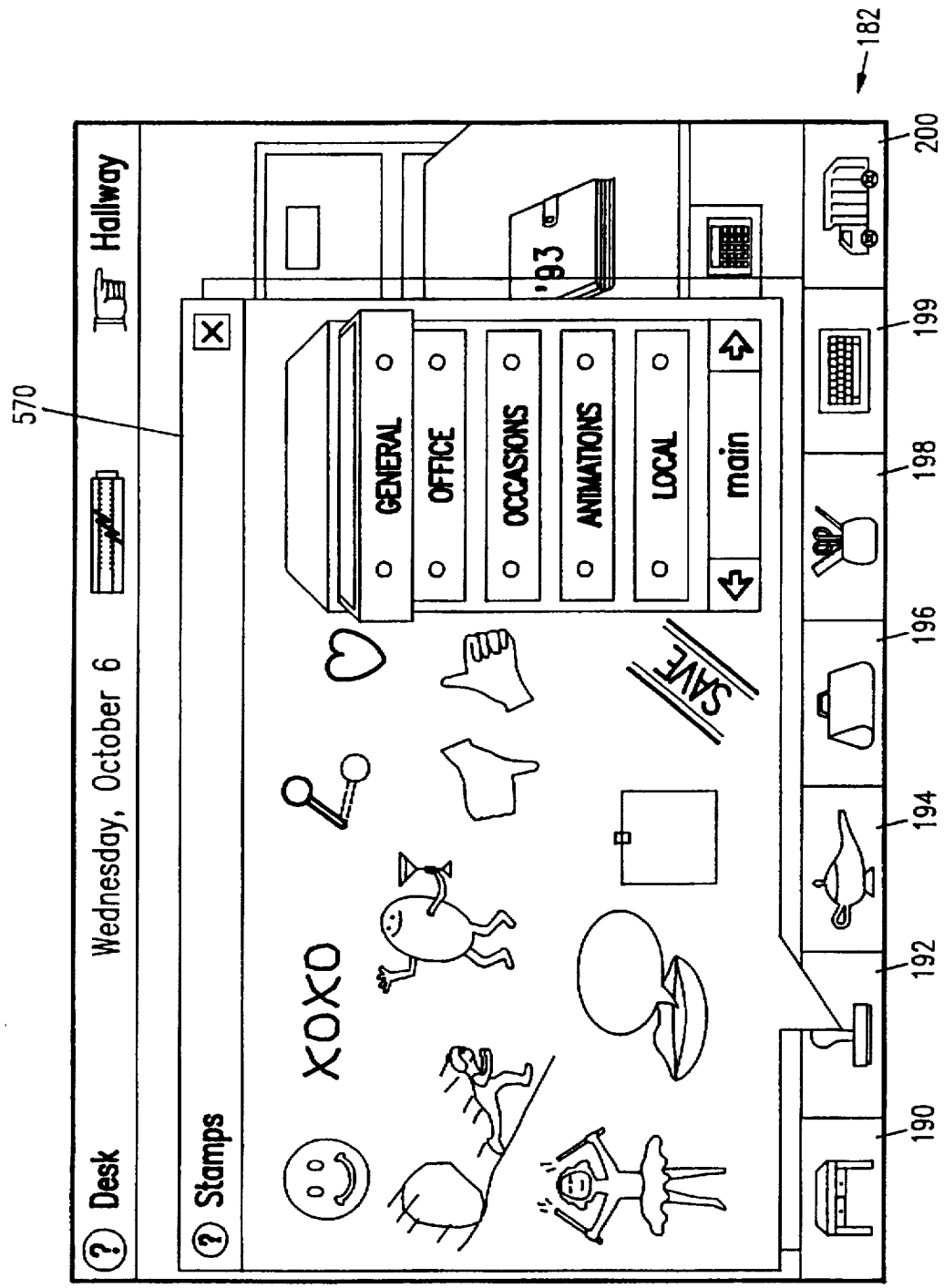
FIGS. 28A–28F are plan views of various button bar presentations of a graphical user interface in accordance with the present invention.

For example, referring to FIG. 28A, when stamper button 192 is actuated, stamp window 570 is presented.

Figure 28B:
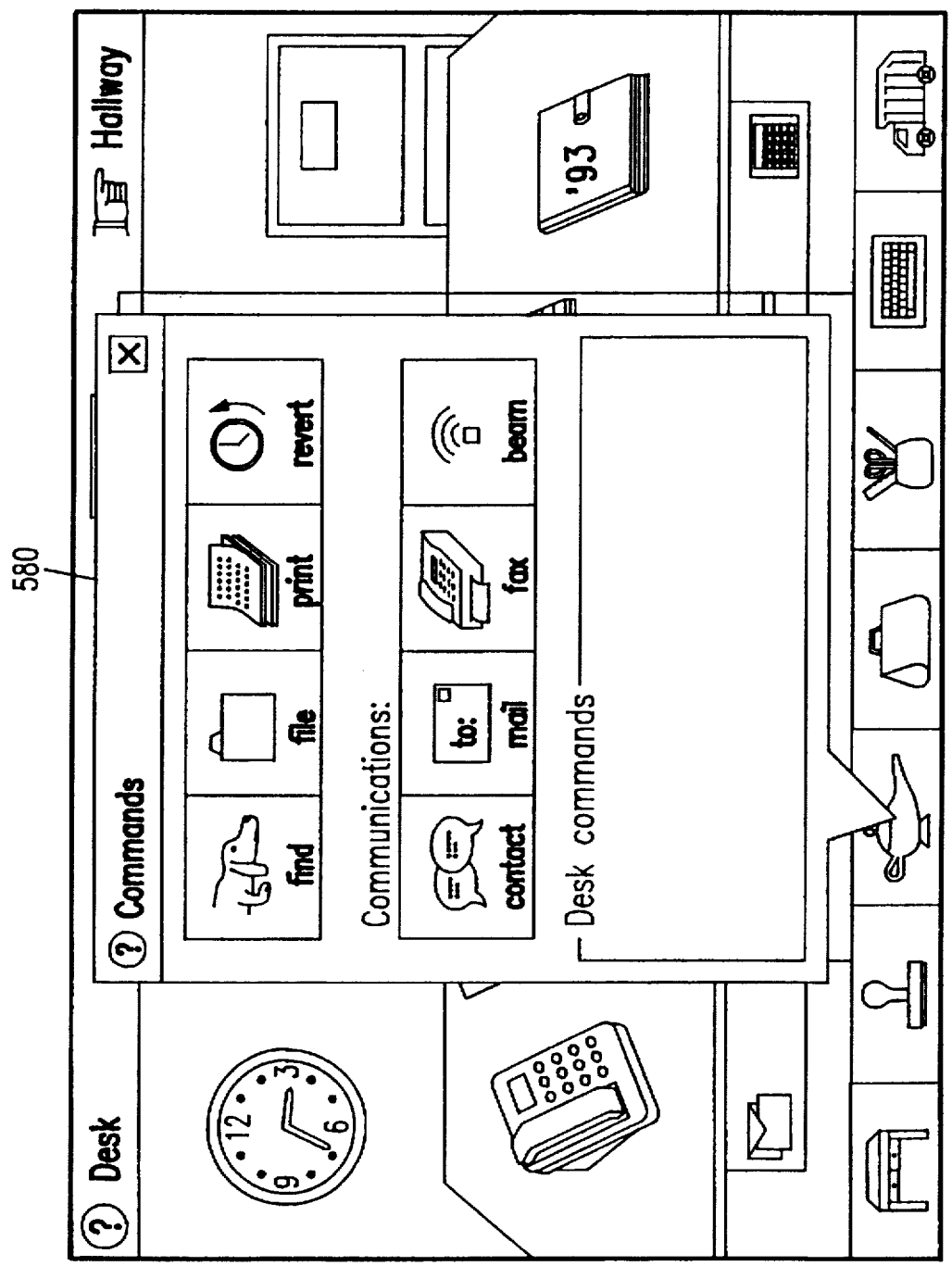

Referring to FIG. 28B, when magic lamp button 194 is actuated, magic lamp window 580 is presented. Magic lamp window 580 includes magic lamp control buttons for frequently used commands such as find, file, print and revert. Additionally, magic lamp window 580 includes magic lamp communication buttons for operations such as contact, mail, fax and beam.

Figure 28C:
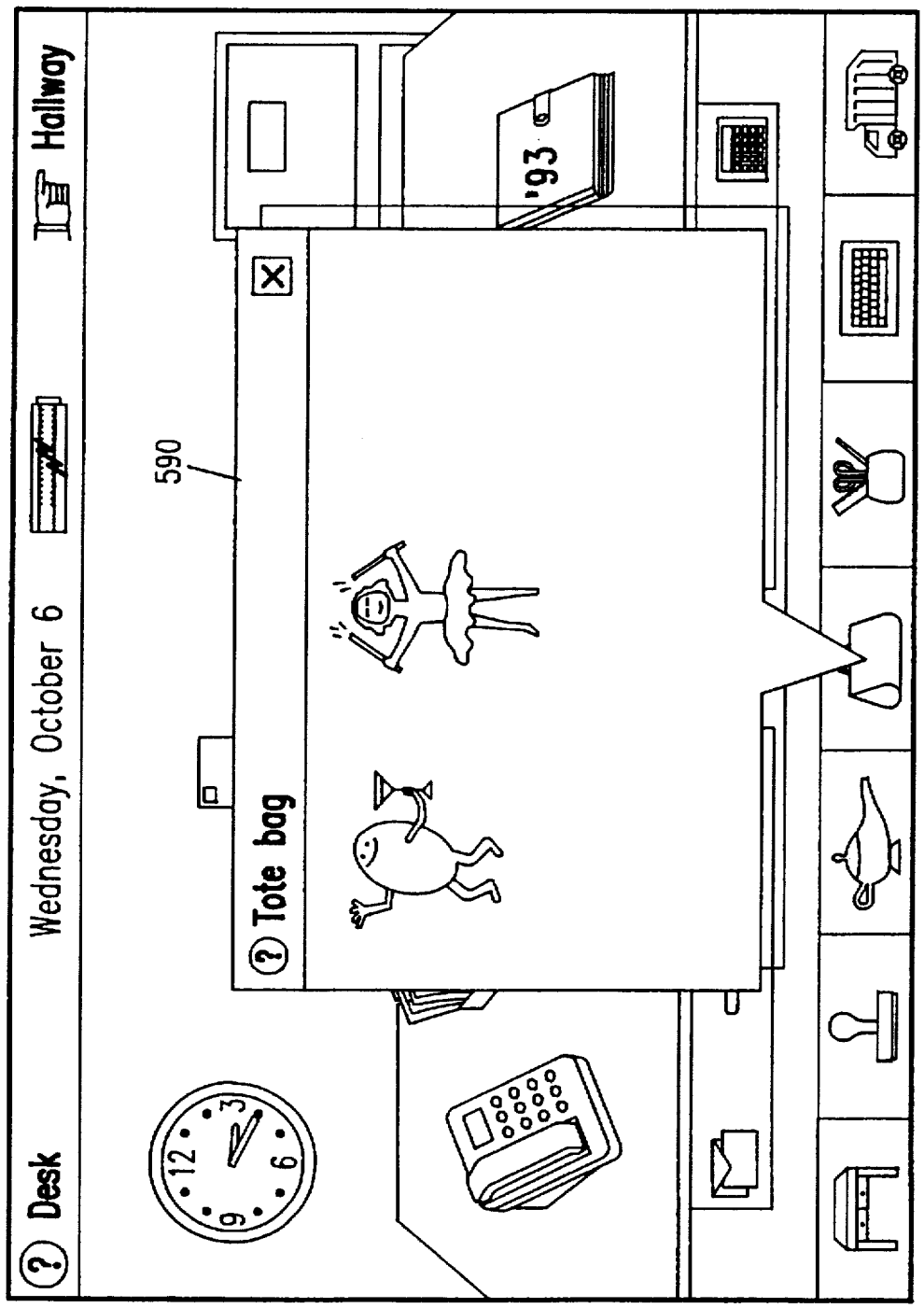

Referring to FIG. 28C, when tote bag button 196 is actuated, tote bag window 590 is presented. Tote bag window 590 includes representations of elements which have been moved from one location into the tote bag for moving the elements to another location. For example, when moving a party representation from stamp window 570 to elsewhere in the computer system, e.g., to names of the address list 482, the representation is first moved into the tote bag. When this representation is moved into the tote bag then it is displayed in tote bag window 590 when tote bag button 196 is actuated.

Figure 28D:
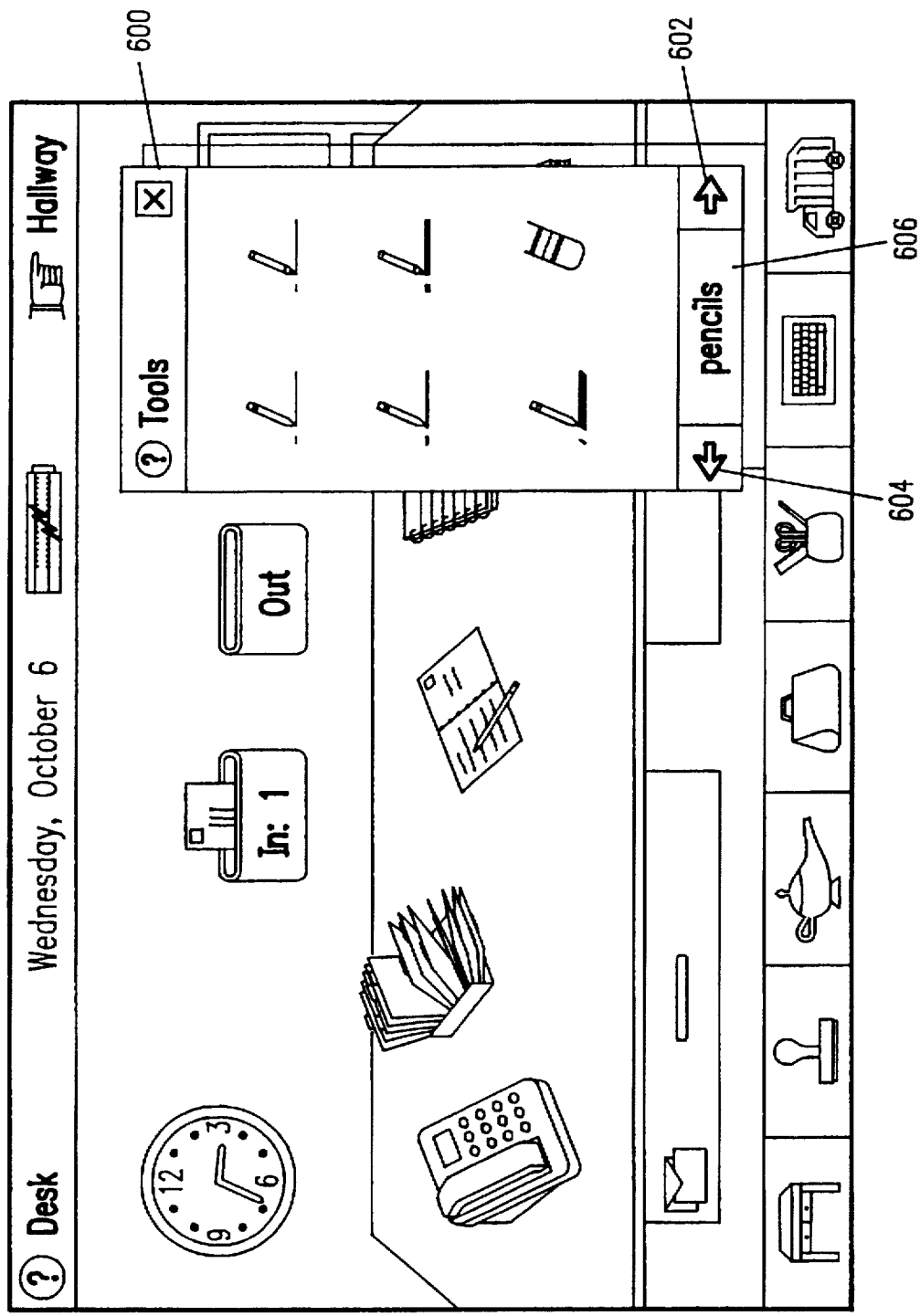

Referring to FIG. 28D, when tools button 198 is actuated, tools window 600 is presented. Tools window 600 includes representations of different tools which may be accessed within the computer system. For example, the tools include pencils which have different line widths. Tools window 600 includes navigation arrows 602, 604 and tools description area 606. By actuating the arrows of tools window 602, 604, other tools appear within tools window 600 and the description of the other tools appears in tools description area 606.

Figure 28E:
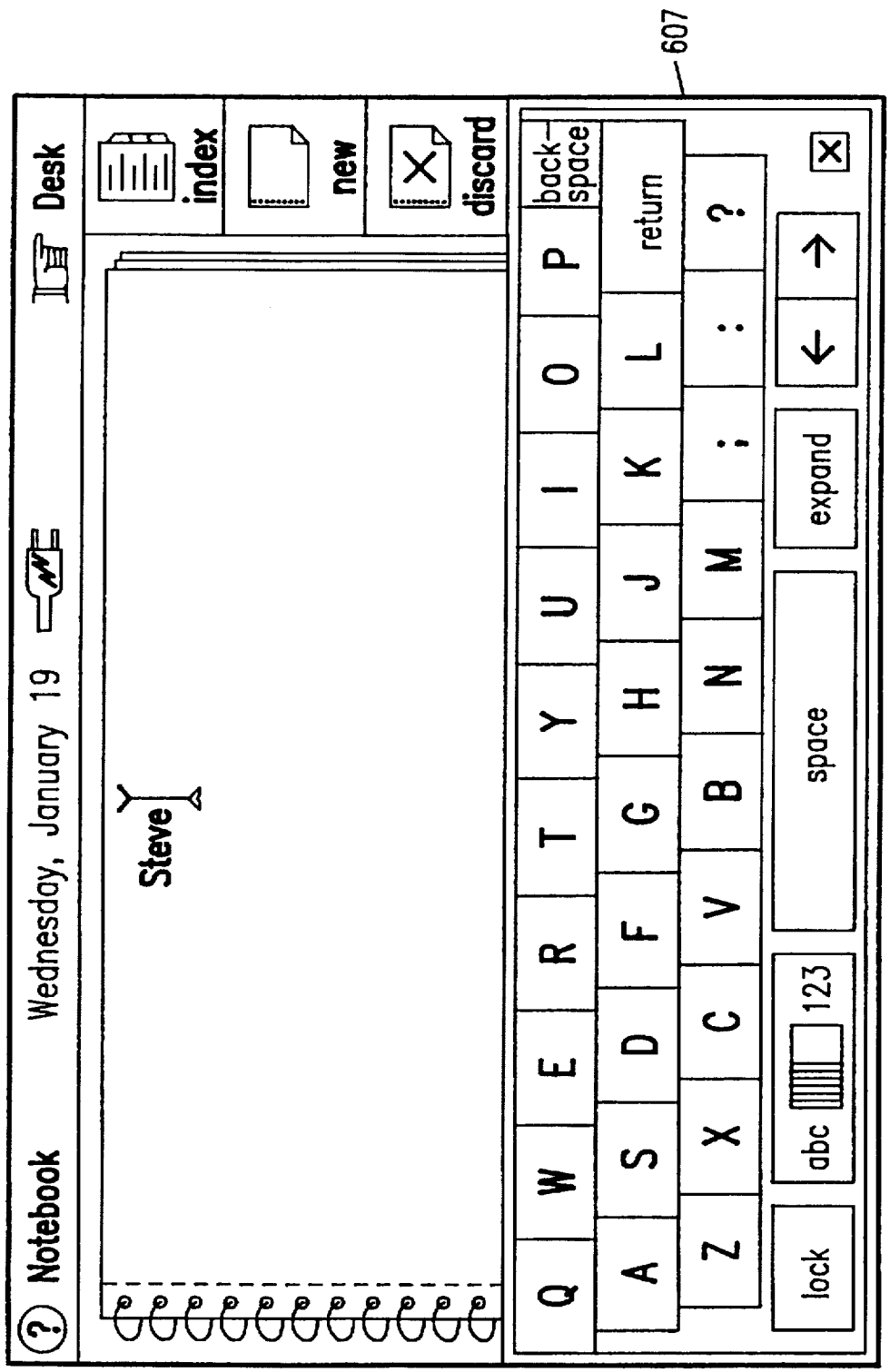

Referring to FIG. 28E, when keyboard button 199 is actuated, keyboard window 607 is presented. Keyboard window 607 includes a QWERTY keyboard representation as well as a switch to switch the keyboard to display numbers instead of letters. Keyboard window 607 allows text to be inserted in an appropriate blank area on the screen when keyboard button 199 is actuated.

Figure 28F:
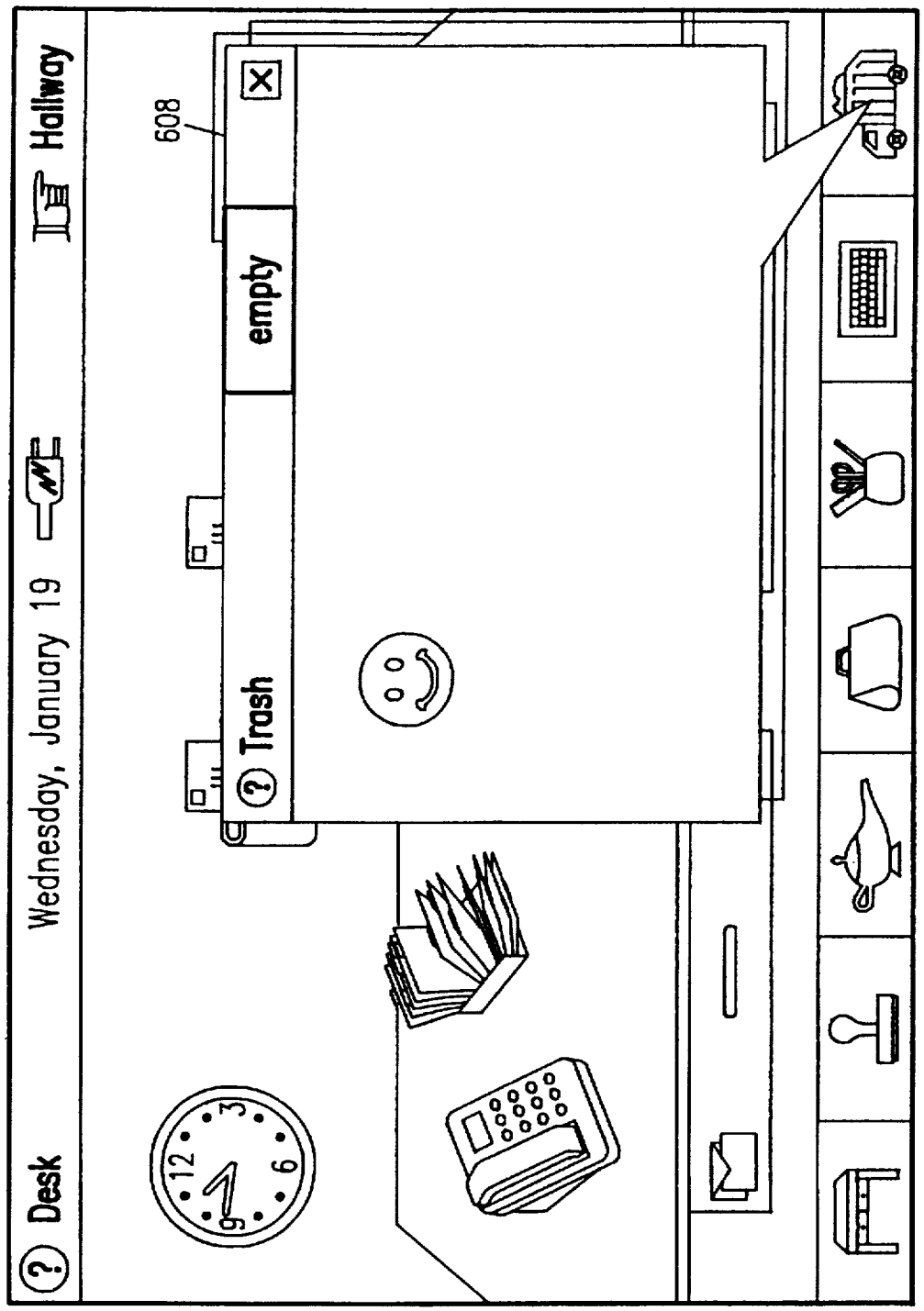
Figure 29:
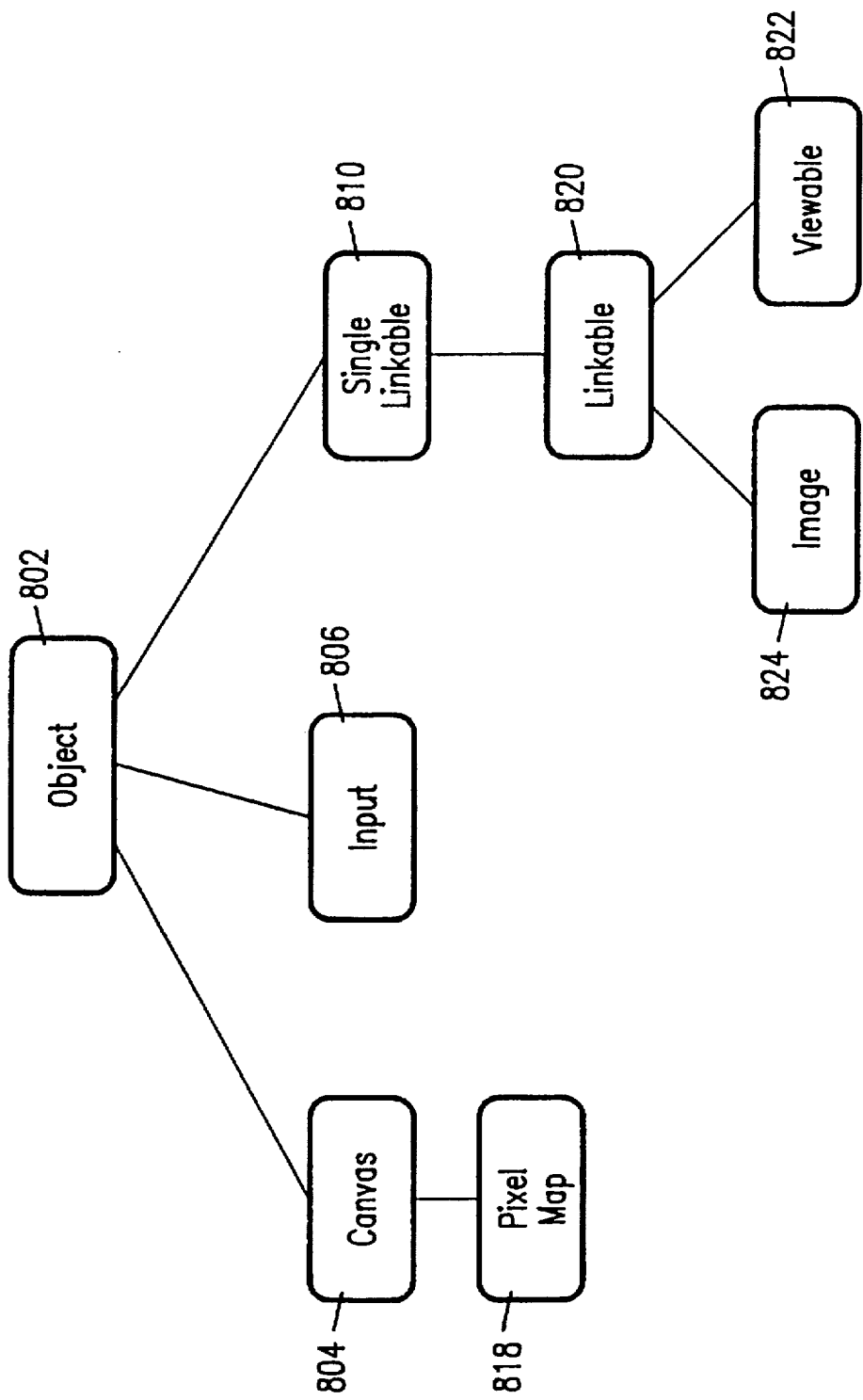
FIG. 29 is a class diagram showing the inheritance relationships among the classes of an object oriented graphical user interface navigation system in accordance with the present invention.

Referring to FIG. 28f, when garbage truck button 200 is actuated, trash window 608 representing a trash object is presented. Trash window 608 includes a trash portion in which the contents of the trash object is presented. Trash window 608 also includes an empty button which, when actuated, deletes the contents of the trash object.

The navigation system set forth with reference to FIGS. 2–28 allows a user to intuitively navigate throughout computer software 112 and to easily access information which is contained within the software or to easily access services which are accessed via software 112. The navigation system also allows a user to intuitively and easily extend the navigation system to include functions that are added to the computer system.

Implementation of the Navigation System

Computer system software 112, and more specifically the navigation system portion of computer system software 112, is implemented using an object oriented framework. An object oriented framework uses object oriented concepts such as class hierarchies, object states and object behavior. These concepts, which are briefly discussed below, are well known in the art. Additionally, an object oriented framework may be written using object oriented programming languages, such as the C++ programming language, which are well-known in the art, or may be written, as is the case with the preferred embodiment, using a non-object programming language such as C and implementing an object oriented framework in that language.

The building block of an object oriented framework is an object. An object is defined by a state and a behavior. The state of an object is set forth by fields of the object. The behavior of an object is set forth by methods of the object. Each object is an instance of a class, which provides a template for the object. A class defines zero or more fields and zero or more methods.

Fields are data structures which contain information defining a portion of the state of an object. Objects which are instances of the same class have the same fields. However, the particular information contained within the fields of the objects can vary from object to object. Each field can contain information that is direct, such as an integer value, or indirect, such as a reference to another object.

A method is a collection of computer instructions which can be executed in CPU 102 by computer system software 112. The instructions of a method are executed, i.e., the method is performed, when software 112 requests that the object for which the method is defined perform the method. A method can be performed by any object that is a member of the class that includes the method. The particular object performing the method is the responder or the responding object. When performing the method, the responder consumes one or more arguments, i.e., input data, and produces zero or one result, i.e., an object returned as output data. The methods for a particular object define the behavior of that object.

Classes of an object oriented framework are organized in a class hierarchy. In a class hierarchy, a class inherits the fields and methods which are defined by the superclasses of that class. Additionally, the fields and methods defined by a class are inherited by any subclasses of the class. I.e., an instance of a subclass includes the fields defined by the superclass and can perform the methods defined by the superclass. Accordingly, when a method of an object is called, the method that is accessed may be defined in the class of which the object is a member or in any one of the superclasses of the class of which the object is a member. When a method of an object is called, computer system 100 selects the method to run by examining the class of the object and, if necessary, any superclasses of the object.

A subclass may override (i.e., supersede) a method definition which is inherited from a superclass to enhance or change the behavior of the subclass. However, a subclass may not supersede the signature of the method. The signature of a method includes the method's identifier, the number and type of arguments, whether a result is returned, and, if so, the type of the result. The subclass supersedes an inherited method definition by redefining the computer instructions which are carried out in performance of the method.

Classes which are capable of having instances are concrete classes. Classes which cannot have instances are abstract classes. Abstract classes may define fields and methods which are inherited by subclasses of the abstract classes. The subclasses of an abstract class may be other abstract classes; however, ultimately, within the class hierarchy, the subclasses are concrete classes.

All classes defined in the disclosed preferred embodiment, except for mix-in classes which are described below, are subclasses of a class, Object. Thus, each class that is described herein and which is not a mix-in class inherits the methods and fields of class Object.

In the preferred embodiment, limited multiple inheritance is implemented using mix-in classes. Mix-in classes, sometimes referred to as mix-ins, are classes which are not subclasses of class Object but which may provide fields or methods for subclasses of class Object. A non-mix-in class can be the immediate subclass (i.e., a direct descendant) of at most one flavor, but can be the immediate subclass of zero or more mix-in classes. A mix-in class can be the immediate subclass of no class or of another mix-in class. Unless otherwise stated, a class is a flavor. No cycles in the class hierarchy are permitted; i.e., no class is permitted to be both a subclass and a superclass of another class.

Referring to FIG. 28, the implementation of navigation system 120 is based on a class hierarchy rooted at class Object 802. Descending from class Object 802 are a plurality of classes including class Canvas 804, class Input 808, and class Single Linkable 810. Descending from class Canvas 804 is class Pixel Map 818. Descending from class Single Linkable 810 is class Linkable 820, from which descends class Viewable 822 and class Image 824.

Class Object 802 is an abstract class which provides the fundamental behavior shared by all objects within computer system 100.

Class Canvas 804 is an abstract class which provides viewable objects with an area to draw into and a coordinate system for drawing. Viewable objects use Canvas objects to direct the drawing of the viewable objects. Class Pixel Map 818 is the subclass of class Canvas 804 which provides pixel maps to form a bit mapped image. Pixel Map objects includepixel data, a bounding rectangle, and other pixel map information such as the number of rows in the pixel map.

Class Input 808 provides input fields which represent start and stop times of an input event and the device that was used for the event. Each input event, such as a user touching display device 106 or typing on a keyboard, is represented by an input object. The input fields are used by other objects to determine now to respond to a user input event.

Classes Single Linkable 810 and Linkable 820 are abstract classes which allow objects to be items in a doubly-linked list. Each linkable object includes a reference to the next and previous objects in the list. The objects in the list are arranged so that the list is linear; i.e., each object in the list is linked to two other objects, a previous object and a next object.

Class Viewable 822 is an abstract class which provides the fundamental behavior for objects that are displayed on display device 106, i.e., that are "viewable". Class Viewable 822 includes methods that are common to all objects that are viewable.

General Operation of the Graphical User Interface

All objects which can be displayed on display device 106 are members of the class Viewable 822 and are therefore viewable objects. The display of the viewable objects on display device 106 and the interaction with these viewable objects provide the graphical user interface of computer system software 112. Computer system software 112 uses some of the viewable objects of the graphical user interface to provide navigation system 120.

Computer system software 112 includes other objects which cannot be displayed on display device 106, e.g., objects defining information structures or providing information processing functionality. These objects are non-viewable objects and are thus not members of class Viewable 822. Non-viewable objects can be represented by other, viewable objects which can be displayed on display device 106.

In order to provide the graphical user interface, the viewable objects are displayed (i.e., drawn) on display device 106. Accordingly, every viewable class defines or inherits a Draw method that sets forth how to draw the objects of that class on display device 106. System 100 calls the Draw method of a viewable object when the viewable object has to be drawn or redrawn on display device 106. For example, when a viewable object is moved and exposes a previously hidden viewable object, system 100 calls the Draw method of the newly exposed viewable object to redraw the object on display device 106.

Drawing a viewable object is a two step process. The first step is indicating that the viewable object, should be redrawn by marking the viewable object as invalid. Marking a viewable object as invalid indicates to system 100 that this object should be redrawn the next time system 100 redraws display device 106. If the viewable object changes its own appearance, it can mark itself as invalid by calling its own redraw method. The second step is the drawing function itself. System 100 calls the draw methods of all the viewable objects marked for redrawing (i.e., all viewable objects which are marked invalid). Whenever system 100 calls a Draw method, it provides a canvas from class Canvas 804 for the viewable object to use when drawing., Canvas class 804 includes a plurality of methods that are used when drawing. These methods include, for example, methods for drawing lines, boxes and paths, for coloring and for copying screen pixels.

Drawing causes the objects to be displayed on display device 106 (i.e., to be drawn on display device 106). The most common canvases that are used for drawing on display device 106 are provided as pixel maps. Pixel maps are implemented using the Pixel Map subclass of Canvas. Whenever a viewable is drawn on display device 106, system 100 calls the viewable object's draw method passing a pixel map as the canvas to use for the drawing. The pixel map provides a complete environment for mapping the viewable object's drawing image onto display device 106. For example, the pixel map provides information about the location in memory 104 of the pixels that are used for the drawing and the number of bits per pixel.

All viewable objects are arranged in a two-level hierarchy that determines the interrelationship of the viewable objects that appear on display device 106. A first level of the hierarchy indicates front to back ordering of the viewable objects; the objects at this hierarchy level are all at the same level of containment. A second level of the hierarchy indicates containment of the viewable objects; i.e., indicates whether a viewable object holds within it another viewable object within its boundary.

The front to back ordering first hierarchy level is used when the viewable objects are drawn on the screen. This level of hierarchy is controlled by classes Single Linkable 810 and Linkable 820, which connect the objects in a linked list. The linked list provides the front to back ordering of the objects that it contains. Each object refers to two other objects; one is the next object in the list and the other is the previous object in the list. The objects are listed in back to front order as they appear on the screen. The first object in each list is the rearmost object and the last object listed is the front most object.

Each viewable object refers to another pair of viewable objects to provide the second hierarchy level. The second pair of viewable objects, called the superview and subview, allow one viewable to contain another. This hierarchy level is also controlled by the fields of class viewable 822. When the user moves a container object (i.e., an object which contains another object), the contained viewable objects are also moved. Contained viewable objects are drawn with their images clipped to the boundaries of their container objects.

The superview field of a viewable object indicates whether the object is contained by another object, while the subview field indicates whether the object is the container of another object. An object can be contained by at most one other object, but an object can contaifi any number of objects. If a viewable contains more than one other viewable object, the container's subview field is the rearmost (i.e., first) subview, which provides access to all of the other subviews by following the next fields.

When drawing viewable objects, system 100 assigns an origin location to the center of the superview of each viewable object. Each viewable object origin location is set forth relative to the origin location of the superview of the viewable object. Every viewable object assigns an x,y coordinate value pair to its origin location. This coordinate value pair is then used as a relative origin to compute a local coordinate system for all other points in the viewable object.

The outermost viewable object is the screen object which always has the coordinate location 240, 160 as its center origin location because display device 106 has a physical size of 480×320 pixels. Every other viewable object assigns a value to its origin location that indicates its position relative to its superview.

When viewable objects are to be drawn, the viewable object's draw method access the image for the viewable object from class Image and stores the bits of the image in memory 104 as a pixel map. The pixel map might represent a whole screen of information or a portion of a screen of information. The stored pixel map is then converted to signals that are presented on screen 106 in a conventional manner.

Class Descriptions
Class Object

Class Object 802 is an abstract class which provides for the fundamental behavior shared by all objects. Class Object 802 does not define any fields. Class object defines a plurality of methods; however, many of the methods of class Object 802 are empty as they are placeholders for features that are implemented when subclasses override these methods.

Class Object defines a plurality of methods for controlling memory use. More specifically, the method Stabilize notifies the object that system 100 won't be making frequent changes to the object. The method Compact asks the object to try to free up memory by removing data that can be recreated, such as caches or indices. The method Get Size determines the size of the object in bytes. The method Set Size changes the byte size of the object. The method Resize changes the size of the object by adding a delta value to the current size of the object. The method Moving moves an object's location in memory to produce larger blocks of contiguous free memory space. The method Append Object adds data of another object onto the end of the object calling the method. The methods Append Byte, Append Word, Append Long, Append String and Append Bytes add data of the indicated type onto the end of the object. The method Init allows a new object to set up its fields. The method Copy makes a copy of the object. The method Destroy deletes the object and all objects referenced by the fields of the object. The method New Reference creates a reference to the object that can be used from any code cluster. The method Is Shared determines whether the object is sharable. The method Get Digest obtains summaries, usually checksums, of two seemingly similar objects. The method Make Digest causes the object to recalculate its digest. The method Delete Duplicate checks to see if there is an exact copy of the object and if so then deletes the duplicate object. The method Find Match attempts to find a duplicate of the object. The method Mark causes objects that are not referenced by any other objects to be marked for future deletion. The method Set Mark marks or unmarks the object as part of a collection process.

Class Object 802 defines a plurality of methods relating to classes and behaviors of the classes. More specifically, the method Install gives each class a chance to initialize any globals, private variables or other state information The method Get Globals retrieves the object that contains the global data for a class. The method Implements determines whether the class to which an object belongs implements the operations defined by the given class.

Class Object 802 defines a plurality of methods relating to identity and object identities. More specifically, the method Is Reference determines whether the object is a reference, rather than a direct object ID. The method Is System Object determines whether the object is in the system cluster.

Class Object 802 also includes the method Matches Instance to perform comparisons. More specifically, Matches Instance determines whether objects are the same size and contain identical bytes.

Class Object 802 defines a plurality of methods for working with object names. The method Get Name retrieves the name of an object. The method Set Name changes the name of the object. The method Get ID string retrieves the ID string of an object. The method Get Search Name determines the name that an object presents to a search tool for searching. The method Named determines whether the object has a name. The method Set Named sets a flag in the header of the object to indicate that the object is named.

Class Object 802 defines a plurality of methods for observing and notifying objects. More specifically, the method Notice determines, for every observed object that has been changed or deleted, whether the object was deleted. The method Observe registers or removes the registration of the object as an observer of another object.

Class Object 802 also includes the method Arrived for when the object is performing sending operations. More specifically, method Arrived allows objects to perform some action when the object arrives from another device.

Class Object 802 defines a plurality of methods relating to the attributes of the object. More specifically, the method Attribute gets the value of the given attribute of the object. The method Set Attribute sets the value of an attribute of the object.

Class Object 802 defines a plurality of methods relating to text values that the object defines. More specifically, the method Get Text Data retrieves the text of the object. The method Set Text Data sets the text of the object when a user drops text onto an object. The method Get String Data retrieves the test of the object as a Pascal-style string.

Class Object 802 defines a plurality of methods relating the object structure. More specifically, the method Each Reference invokes a function repeatedly for every object that is referenced by the object. The. method Get Field Count determines how may fields are defined by the class of the object. The method Get Each Field repeatedly invokes a routine for every field that is defined by the object's class.

Class Canvas and Class Pixel Map

Class Canvas 804 is an abstract class which provides an area on display device 106 into which to draw and a coordinate system for drawing on display device 106. Viewable objects use canvas objects to direct the drawing of the viewable objects. More specifically, whenever a new class of viewable object is created, system 100 passes the viewable object a canvas object when the draw method of the viewable object is called. Class Canvas 804 does not define any fields. Class Canvas 804 does define a plurality of methods relating to drawing.

More specifically, the method Fill Box draws a box filled with a color. The method Fill Line draws a line. The method Fill Path fills a given path in color.

Class Pixel Map 818 is a concrete class which provides a structured area of memory in which bits which affect what is presented on screen 106 are turned on and off. Class Pixel Map 818 defines the fields resolution dimension, depth and origin. Class Pixel Map 818 also defines a plurality of methods relating to drawing images onto a display as is well known in the art.

Classes Single Linkable and Linkable

Classes Single Linkable 810 and Linkable 820 are abstract classes that allow objects to be members of a doubly linked list. Class linkable includes a plurality of fields and a plurality of methods. Every linkable object refers to the next object and the previous object in the list. The first object in the list has the nil object as its previous link and the last object in the list has the nil object for its next reference. The objects in the list are linearly arranged. I.e., each object is linked to no more than two other objects. Although linkable objects are connected to form a list, there is no object that represents this list. All manipulations of the list are performed by working with the linkable objects which form the elements of the list.

Class Linkable 820 defines the fields next and previous. The field next, which is inherited from class Single Linkable 810, is of the type Object and represents the next item in the view list. The field previous, which is defined by class Linkable 820, is of the type Object and represents the previous item in the view list.

Class Linkable 820 defines a plurality of methods directed to adding objects to and removing objects from a list of which the object is a part. More specifically, the method Add To adds a new link to the list in a position immediately following the object; if the new object is already part of a list then the method Add To adds the entire list to which the new object belongs as the new link. The method Remove removes the object from the list and closes up the list to keep the remaining elements in the list intact. The method Add Before adds a new link to the list in the position immediately preceding the object. The method Add After adds a new link to the list in the position immediately following the object. The method Add First adds a new link to the list making the new link the first object in the list. The method Add Last adds a new link to the list making the new link to last object in the list. The method Add Unique Last adds a new link to the list as the last element in the list if the new link is not already present in the object's list.

Class Linkable 820 defines a plurality of methods directed to accessing objects in a list of which the object is a part. More specifically, the method Next obtains the object in the list that is immediately after the object. The method Previous obtains the object in the list that is immediately before the object. The method Set Next makes the next link the element in the list immediately after the object; any objects that were originally in the list after the object are disconnected from the list. The method Set Previous provides a new previous link immediately before the object; any elements that were in the list before the object are disconnected from the list. The method First accesses the first element in the list. The method Last access the last element in the list. The method Count determines the number of elements in the list. The method Get At accesses an object at a given position within the list. The method Each repeatedly invokes a function for every member of the list.

Class Linkable 820 defines the method Copy for copying an object during object management. More specifically, the method Copy creates a new object that is a copy of the given object. The method Copy clears the next and previous fields of the newly created object.

Class Viewable

Class Viewable 822 is an abstract class which provides the fundamental behavior for objects that are displayed on display device 106. Class Viewable 822 defines a plurality of fields and a plurality of methods.

Class Viewable 822 defines the fields next, previous, superview, subview, relative origin, content size, view flags, label style, color, shadow, and sound. Accordingly, each viewable object has an associated next value, previous value, superview value, subview value, relative origin value, content size value, view flags value, label style value, color value, shadow value and sound value.

The field next is inherited from class Single Linkable 810. The field previous is inherited from class Linkable 820. The remaining fields of class Viewable 822 are defined by class viewable 820. The field superview is of the type Viewable and represents the container for the viewable object. The field subview is of the type Viewable and represents the object contained by the viewable object. The field relative Origin is of the type Dot and represents the origin of the object relative to the superview value. The field content Size is of the type Dot and represents the size of the content rectangle, i.e., the size of the object. The field view Flags is of the type Unsigned, and represents a plurality of property settings of the viewable object. The field label Style is of the type Text Style and represents the text style of the label of the viewable object. The field color is of the type Color and represents the color of the content of the viewable object. The field shadow is of the type Shadow and represents the shadow which is drawn with the object. The field sound is of the type Sound and represents the sound associated with the object. The use of these fields by class Viewable 820 is set forth in more detail below.

Field view Flags includes a plurality of view flags-which define properties of the viewable object. More specifically, field view flags includes a move view flag which defines whether a viewable object can be moved, a copy view flag which defines whether a viewable object can be copied, a stretch view flag which defines whether a viewable object can be stretched and a delete view flag which defines whether a viewable object can be deleted. Field view flags also includes a contain view flag which defines whether the viewable object can contain other viewable objects (i.e., can have subviews), a draw center view flag which defines whether the viewable object is drawn at a position relative to its center position, a label view flag which defines whether the label of the viewable object is shown and a border view flag which defines whether a border is drawn around the label. Each view flag is a boolean variable which may have either a true value or a false value.

Each viewable object includes a plurality of parts, such as the frame of the viewable object and the label of the viewable object. These various parts are set forth and identified by constants. For example, each viewable object sets forth constants which refer to parts of the object such as the label, shadow, border, title, content, lines, image and text of the viewable object.

Class Viewable 822 defines a plurality of methods which relate to object management. More specifically, the method Init causes a new object to et up its fields. The method Copy makes a copy of the object and all objects referenced by the fields of the object. The method Destroy Subviews delete all subviews of the object when the object is deleted. The method idle is called when the object is not busy.

Class Viewable 822 defines a plurality of methods directed to drawing and geometry. More specifically, the method Draw draws the object's label, and the label's frame and highlighting; a draw method of the particular subclass overrides the viewable draw method and is used to draw the actual object. The method Adjust Size causes an object to recalculate its content box. The method Get Bounds Box calculates the smallest box that encloses all the pars of the object that are drawn. The method Get Opaque box retrieves the box that describes the opaque area of the object so that objects behind this box do not have to be redrawn. The method Part Color retrieves an object that describes the color for a specified part of the object; the value of field color is retrieved for the specified part and if no part is specified, the value of field color for the responding viewable object is retrieved. The method Set Part Color sets an identified part of the object to a given color; more specifically, the method Set Part Color sets the color field of the identified part to the given color and if no part is specified, the method Set Part Color sets the color field of the responding viewable object to the given color. The method Clip Path retrieves a path that describes the object with objects in front of the object removed. The method Hilited tests whether the object is highlighted. The method Get Content Path obtains a path object that describes the contents of the object. The method Get Content Box obtains the box that describes the object's content. The method Set Content Box sets the object's content box to an indicated box. The method Get Bounds Box obtains the box that describes the object's bounds. The method Content Height obtains the height of the object's content box. The method Set Content Height sets the height of the object's content box to a given value. The method Content Width obtains the width of the object's content box. The method Set Content Width sets the width of the object's content box to a given value. The method Keep On Screen moves the object entirely onto display device 106 if any part of the object is off of display device 106. The method Extent Bottom adds more space to the bottom of the object and other objects near the bottom of the screen.

Class Viewable 822 defines the method Inside Part which provide a value indicating which part of the object contains a given dot location. The method Inside Part calls the method Calc Inside Part to calculate which part of the object contains the given dot.

Class Viewable 822 defines a plurality of methods directed to labeling the object. More specifically, the method Label obtains the object's name as it is displayed in its label. The method Label Loc obtains the location of the object's label. The method Set label Loc sets the location of the object's label to a given value. The method Border Label determines whether the object's label is drawn with a border around it by querying the border view flag. The method Set Border Label sets whether a border is drawn around the label of the object by setting the label view flag. The method Label Box obtains the box that encloses the object's label in the Label box and indicates whether the label should be clipped to the box. The method Can Show Label determines whether the object's label can ever be drawn. The method Show Label obtains a value that indicates whether the object's label should be shown by querying the label view flag. The method Set Show Label turns the label of the object on and off by setting the label view flag. The method Set Use Script Name determines whether the object should use its script's name for its label. The method Set Name sets the objects name to a given string.

Class Viewable 822 defines the method Get Border Box to obtain the box that forms the outer edge of the object's border box.

Class Viewable 822 defines a plurality of methods directed to the viewable object's image. More specifically, the method Image returns the image that is associated with the object. The method Set Image sets the image that is associated with the image. The method Draw Shadowed Image draws the object's image and shadow using the given canvas and clipping path. The method Inside Image tests whether a given dot is in the object's image, its shadow or neither.

Class Viewable 822 defines a plurality of methods directed to the shadow of the viewable object. More specifically, the method Shadow obtains the shadow of the object; i.e., performing the method Shadow returns the value of field shadow of the responding viewable object. The method Set Shadow sets the shadow of the object to a given object; i.e., the method Set Shadow sets the shadow field of the responding viewable object to the given shadow object. The method Shadow Offset obtains the shadow offset of the object. The method Set Shadow Offset sets the object's shadow's offset to a given value.

Class Viewable 822 defines a plurality of methods directed to the orientation of the object. More specifically, the method Orientation obtains a value representing the object's orientation. The method Set Orientation sets the object's orientation to a given value. The method Change Orientation flips or rotates the object according to a given orientation change value.

Class Viewable 822 defines a plurality of methods directed to the sound associated with the object. More specifically, the method Play Sound plays the sound associated with the object. The method Sound obtains the sound object that is associated with the object; i.e., performing the method Sound returns the value of field Sound of the responding viewable object. The method Set Sound associates a given sound object with the viewable object; i.e., the method Set Sound sets field sound of the responding viewable object to the given sound object.

Class Viewable 822 defines a plurality of methods directed to the text associated with the object. More specifically, the method Set Text Data sets the text of an object text when the user drops text onto the object. The method Set Text Style sets the text style of the object to a given value; performing the method Set Text Style sets field label Style if the part on which the method is being performed is identified as the label of the object.

Class Viewable 822 defines a plurality of methods directed to touching the object. More specifically, the method Must Track indicates whether an object can be dragged across display device 106. The method Touch indicates that an object has been touched. The method Touching indicates that an object is being repeatedly touched. The method Tap indicates that a user has tapped an object. The method Press indicates that a user has pressed an object. The method Pressing indicates that a user is repeatedly pressing on an object. The method Pressed indicates that a user has released an object that had been pressed. The method Disabled determines whether an object is disabled (i.e., cannot be touched.). The method Move Touch indicates that a user touched an object while the move tool is active. The method Move Press indicates that a user presses on an object while the move tool is active. The method Copy Touch indicates that a user touched an object while the copy tool is active. The method Copy press indicates that a user pressed on an object while the copy tool is active. The method Tap Center causes an object to act as if the user has tapped it.

Class Viewable 822 defines a plurality of methods directed to moving and copying of the object. More specifically, The method Drag Track tracks a user's action while the user is dragging an object. The method Can Move determines whether the object can be moved by querying the move view flag. The method Set Can Move sets whether the object can move by setting the move view flag. The method Can Copy determines whether an object can be copied by querying the copy view flag. The method Set Can Copy sets whether the object can be copied by setting the copy view flag. The method Auto Copy determines whether the object is auto-copiable (i.e., whether an object makes a copy when a user drags the object even without the copy tool on). The method Set Auto Copy sets whether the object is auto-copiable. The method Can Delete determines whether the object can be thrown away by querying the delete view flag. The method Set Can Delete sets whether the object can be thrown away by setting the delete view flag. The method Can Drag Contents determines whether the object prevents its subviews from moving. The method Set Can Drag Contents sets whether the object prevents its subviews from moving.

Class Viewable 822 defines a plurality of methods relating to stretching an object. More specifically, the method Stretch Touch indicates that a user touched an object while the stretch tool is active. The method Stretch Press indicates that a user pressed on an object while the stretch tool is active. The method Stretch Track tracks the user's action while stretching an object. The method Can Stretch determines whether the object can be stretched by querying the stretch view flag. The method Set Can Stretch sets whether the object can be stretched by setting the stretch view flag. The method Constrain Size ensures that an objects new dimensions from resizing fall within preset limits. The method Centered determines whether an object should de drawn from its center by querying the center view flag. The method Set Centered sets whether the object should be drawn from its center by setting the center view flag.

Class Viewable 822 defines a plurality of methods directed to Tinkering. Cofiled application entitled "Graphical User Interface for Changing Characteristics of Graphical Objects", which is hereby incorporated by reference, discusses the tinker aspects of system software 112 in greater detail.

Class Viewable includes a plurality of methods directed to dropping an object. More specifically, the method Can Accept determines whether a candidate object (i.e. an object over which the present object is dragged) can be a subview of the object. The method Can Contain determines whether the object can contain other objects (i.e., whether the object can have subviews) by querying the contain view flag. The method Set Can Contain sets whether the object can contain other objects by setting the contain view flag. The method Can Accept Coupon determines whether the object can accept a coupon. The method Swallow determines whether the object can accept the dragged object and perform some action with it. The method Can Change Containers determines whether the object can move to a new superview. The method Changed Containers allows an object to perform some action when it changes containers. The method Changed Contents allows both superviews to give the superview objects a change to perform some action when an object moves from one superview to another. The method Get Container Position calculates an unoccupied position in the object for placing a newly-added subview.

Class Viewable 822 defines the method Type Keys directed to typing with viewable objects. The method Type Keys determines whether an object can accept a character that is typed either by the on screen keyboard or by an external keyboard (not shown).

Class Viewable 822 defines a plurality of methods relating to the view list information. More specifically, the method Send To Back makes the object the rearmost subview of its superview. The method Bring Me To Front makes the object the front most subview of its superview. The method Can Bring to Front indicates whether an object should be brought to the front when it's dragged. The method Get Subview obtains the object's rearmost subview. The method Set Subview makes the given viewable object be the rearmost subview of the object. The method Set Superview sets the given viewable object to be the superview of the object. The method On Screen determines whether the object is in the viewlist (i.e., whether the object is the screen or a subview, possibly recursively, of the screen). The method Is Subview Of determines whether the object is a subview of a given viewable. The method Each Subview invokes a function for every viewable that is a subview of the object.

Class Viewable 822 defines a plurality of methods directed to hiding and showing objects. More specifically, the method visible determines whether the object is visible on the screen. The method Set Visible sets the object's visibility status. The method Set Subviews makes all of the object's immediate subviews visible by calling Set Visible for each of the immediate subviews of the object.

Class Viewable 822 defines the method Selected for working with selections. More specifically, the method Selected obtains the object's selection.

Class Viewable 822 defines a plurality of methods directed to searching. More specifically, the method Match Text checks for a given string in the object's label or in text in any object of the object's immediate subviews. The method Match Viewable determines whether a given viewable matches any of the object immediate subviews.

Class Viewable 822 defines a plurality of methods directed to notification. More specifically, the method Opening gives viewable objects which are on display device 106 a chance to perform some action before a window is opened. The method Closing gives viewable objects which are on display device 106 a chance to perform some action before a window is closed.

Class Viewable 822 defines a plurality of methods directed to entity support. More specifically, the method Entity obtains an entity that is associated with an object. The method Set Entity sets the entity that is associated with an object to the given object.

Class Image

Most viewable objects use a bitmap to describe their appearance on display device 106. These bitmaps are instances of class Image 824. In addition to the bitmaps, image objects include other information that is used when drawing the objects with which the objects are associated, such as the size and center point of the image. Every viewable that uses an image has an image field to refer to the image.

Class Image 824 inherits the next and previous fields from class Single Linkable 810 and class Linkable 820, respectively. Class Image 824 also defines a plurality of fields, including image flags, image size, resolution, depth, center point and crc32. Field image flags is of the type unsigned and represents various flags for the image object. Field image size is of the type pixel dot and represents the size of the image in pixels. Field resolution is of the type unsigned short, and represents the resolution of the image. Field depth is of the type unsigned short is of the type unsigned short and represents the number of bits per pixel of the image. Field Center point is of the type pixel Dot and represents the center of the image in pixels. Field crc32 is of the type unsigned and represents the computer checksum of the image.

In addition to the fields defined by class Image 824, each instance of class Image 824 includes a bitmap for the actual image which is contained in a variable-length data structure, which is stored in memory at the end of the object.

Class Image 824 also defines the method Get Thickness. The method Get Thickness provides the width and height of the image in microns.

Descendants of Class Viewable

Figure 30:
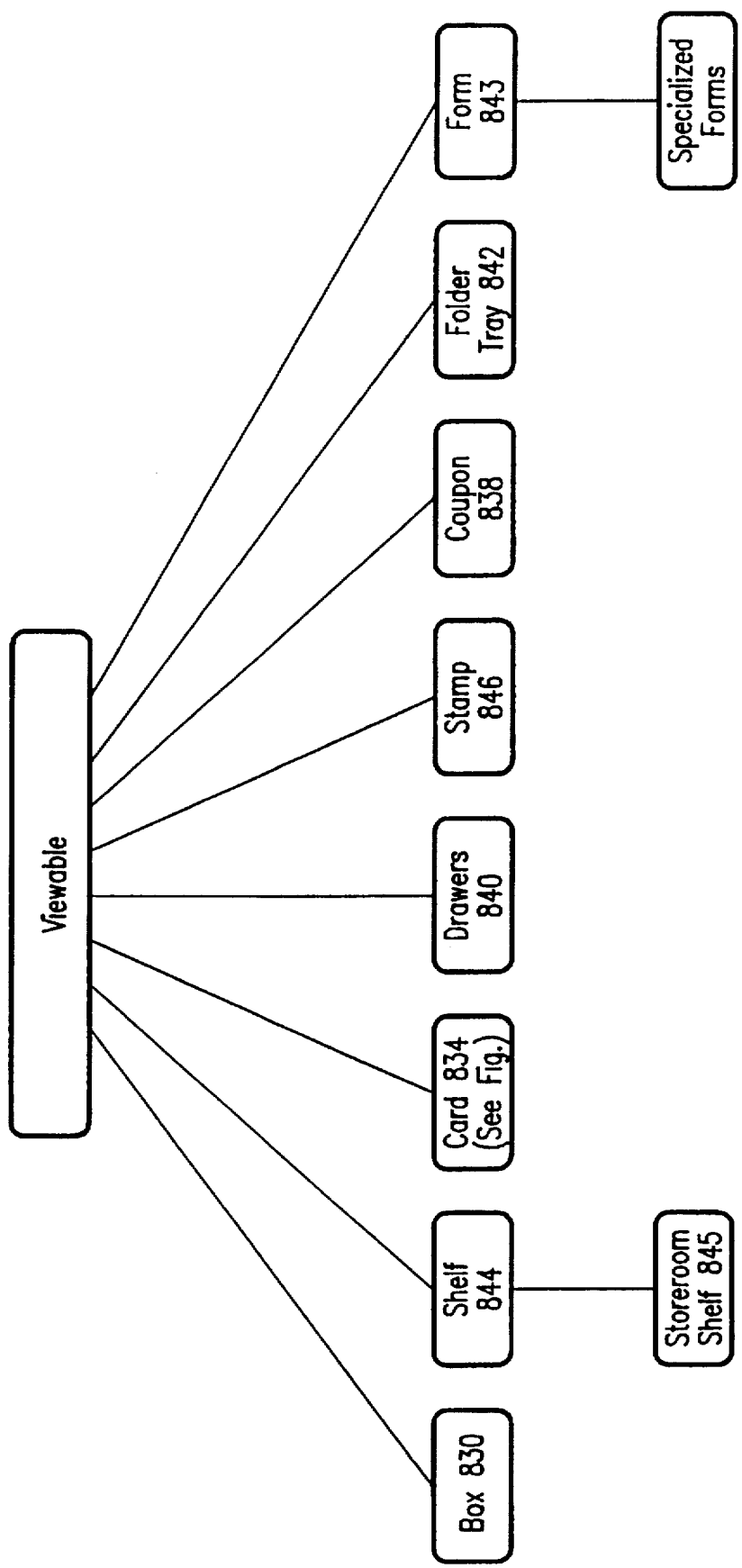
FIG. 30 is a class diagram of a viewable subclass of the FIG. 29 navigation system class diagram.

Referring to FIG. 30, descending from class Viewable 822 are a plurality of viewable subclasses, many of which include further subclasses. The subclasses which directly descend from class Viewable 822 include class Box 830, class Card 834, class Coupon 838, class Drawers 840, class Folder Tray 842, class Form 843, class Shelf 844, and class Stamp 846.

Class Box

Class Box 830 is a concrete class provides viewable objects that are drawn with framed borders. A viewable object that can be framed with a border is usually either an instance of class box or a subclass of class box. Examples of instances of subclasses of Box include windows, stationery and list views, which are discussed in more detail below.

Class Box 830 is created by adding the Has Border mix-in to the class Viewable 822 and thus forming a template for the simplest possible framed viewable object. Boxes function as the superview for objects that are contained within the box. Class Box 830 does not add any additional fields over those provided by class Viewable 822. Class Box 830 defines two methods that are overridden from class Viewable 822.

More specifically, the method Can Accept tests whether an object being dragged can be dropped and can become a subview of the box object. Box Can Accepts allows objects to be dropped when the object being dragged is entirely within the box and the Can Contain attribute is true or when a user is holding down option key 107 and the Can Contain attribute of the box object is true. The method Can Accept Coupon tests whether the box object can accept a coupon. Box Can Accept Coupon accepts all coupons accepted by its superclasses except for sound coupons.

There are a significant number of classes which descend from class Box 830. These subclasses are discussed in more detail below with reference to FIG. 30.

Class Card

Class Card 834 allows objects to be organized as a series of documents, with each document containing viewable objects. A user can move from one document to the next. Each document is represented by a group of viewable objects collected on a card object. All of the card objects combine to provide a stack. Each card functions as a superview for the viewable objects that appear with the card and contains data for any objects specified by the card's form Each card object is associated with a form. The form specifies objects that are shared by more than one card. When a card is drawn on display device 106, the objects in the card's form are also drawn. Although the form objects are shared across cards, each card has its own data for the shared items. Each card is also associated with a stack scene. The stack scene is the superview of the card when the card is drawn.

Class Card 834 defines the fields form, stack and card Flags. The field form is of type Object and represents the form which is drawn with the corresponding card. The field stack is of the type Stack and represents the stack that contains the card. The field card Flags is of the type unsigned and represents various settings for the card. Class Card 834 defines the method Get Form which, when called, returns the value of the card's form field to indicate the form that is used by the card.

Class Coupon

Class Coupon 838 provides a drag and drop interface which allows objects to be directly manipulated by users. Coupons provide a way for intangible attributes and qualities to be seen and applied to objects. A user uses coupons to apply colors, rotate objects, change text styles and do many other tasks. Class Coupon 838 and descendants of class coupon are discussed in more detail in copending application titled "Graphical User Interface for Changing Characteristics of Graphical Objects" which is hereby incorporated by reference.

Class Drawers

Class Drawers 840 allows a single window to alternately show multiple categories of similar objects. For example the chest of drawers that display different stamps within the stamp window. Class Drawers 840 defines a plurality of fields. These fields includes the fields active drawer, text style, content list and name list. The field active drawer indicates which drawer in the chest of drawers is open. The field text style indicates the text style of the text which describes the content of the drawers. The field content list sets forth a list of lists of the different drawer contents. The field name list sets forth the actual labels of the drawers. Class Drawers 840 also defines a plurality of fields directed to how the drawers appear. For example, Class Drawers 840 defines fields which indicate the height of the drawers, the width of the drawers as well as the types of drawer knobs the drawers include.

Class Drawers 840 also includes a plurality of attributes. These attributes include attributes which allow a user to select among the different drawers which indicate which drawer is active.

Class Drawers 840 defines a plurality of methods including the method touch and swallow. The method touch overrides the inherited method touch to allow selection among the drawer by touch. I.e., the method touch divides the actual object into sections that are individually touched. The method swallow allows individual drawers to swallow an object.

Class Folder Tray

Class Folder Tray 842 provides a mechanism for browsing among multiple collections of similar objects by presenting the tray that holds folders from the file cabinet when file cabinet object 174 is actuated from desk scene 150. Class Folder Tray 842 defines a plurality of fields including the fields tray list and tray index. The field tray list is a list of each of the sets of folders which are also set forth as lists. The field tray index indicates which of the folders is currently active. Class Folder Tray 842 also includes a plurality of fields which are directed to drawing the folder tray. For example fields directed to how the folder tabs appear or how the actual folders appear. Class Folder Tray 842 also includes fields directed to cleaning and filing the contents of the folders within the folder tray. For example, Class Folder Tray 842 defines fields which indicate when a file was last purged or when a file was saved.

Class Folder Tray 842 also defines a plurality of methods. For example, Class Folder Tray 842 defines the Create Drawer method for creating a new folder tray to add to the list of folder trays. Class Folder Tray 842 also defines a swallow method to allow a particular file to swallow an object.

Class Form

Class Form 843 provides the ability for a plurality of cards to have the same viewable objects (i.e., shared viewable objects). Each card object is associated with a form. The form specifies objects that are shared by more than one card.

When a card is drawn on the screen, the objects in the card's form are also drawn. Although the form objects are shared across cards, each card has its own data for the shared items.

Class Form 843 defines the fields image and form items. The field image is of the type image and represents an images which is drawn in a corner of the form. The field form items is of the type viewable and represents a list of shared items with per card data. Class Form 843 defines the method Form Items. The method Form Items obtains an object list of the items in the form that store per card data.

Class Shelf

Class Shelf 844 allows objects to be contained in an area with a function that simulates gravity, i.e., when an object is placed in the area of the shelf, the object drops until it rests on the shelf. Class shelf 844 defines a plurality of fields including the field list. The field list is a list of the objects that are contained by the shelf object. Which shelf an object is on is determined by the view list and the position of the object. Class shelf also defines a plurality of fields that are directed to the drawing of the shelf on screen 106. Class Shelf 844 also defines methods directed to placing objects within a shelf such that the placing simulates gravity.

Descending from class Shelf 844 is class Storeroom Shelf 845. Class Storeroom Shelf 845 adds a plaque to the shelves and adds a copying capability for moving objects from one shelf to another shelf. Class Storeroom Shelf defines a plurality of fields directed to the drawing of the plaque including the fields placard size and placard position, available memory and container device. The fields placard size and placard position represent the size and the position of the plaque on the shelf. The field available memory sets forth the amount of unused memory of memory 104. The field container device sets forth the type of device that the shelf represents, e.g., internal memory or a memory card.

Class Storeroom Shelf 845 defines the methods change content, which changes the list shelf content when the shelf object is changed, and swallow, which allows an object to be swallowed by a portion of the shelf object.

Class Stamp

Class Stamp 846 allows a user to decorate cards with small pictures. The pictures are objects of class Stamp 846. Class Stamp 846 is also used in more specialized functions such as buttons and icons, both of which are instances of descendants of class stamp. These specialized functions are discussed in more detail below.

Class Stamp 846 is a concrete class that is a direct descendent of class Viewable 822. Every stamp object includes an image that is used when the stamp object is drawn on display device 106.

In addition to the fields which are inherited from class Viewable 822, class Stamp 846 defines the field image. Image is of the type Image and represents the image which is used to draw the stamp object. Class Stamp 846 also defines a plurality of methods.

More specifically, class Stamp 846 defines the method Tap which overrides the Viewable Tap method to redefine what happens when a user taps an object. The method Stamp Tap highlights the stamp object, calls its inherited Tap method and then removes the highlighting. Class Stamp 846 also defines the method Draw which overrides the Viewable Draw method if coupons in the subclass are to be drawn in some other manner than the standard draw method. The inherited Draw method may be called if the stamp object's image and shadow are to be drawn in the standard manner.

Descendants of Class Box

Figure 31:
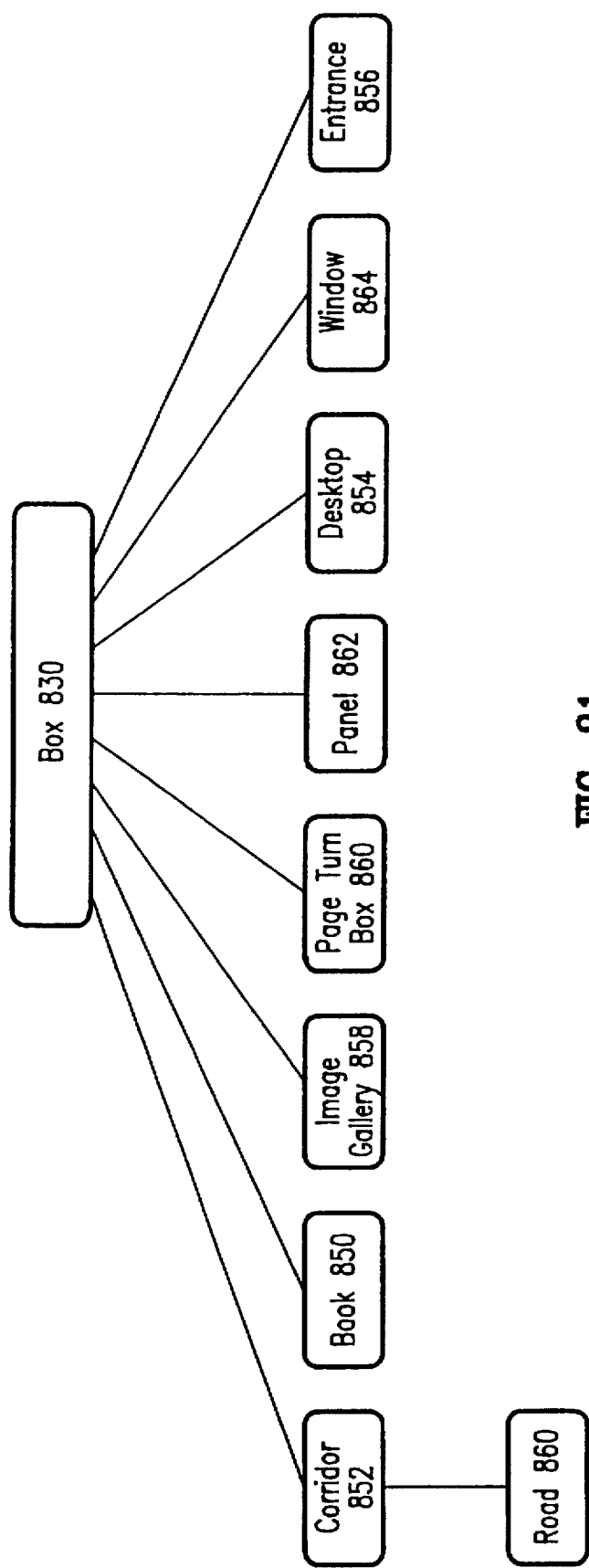
FIG. 31 is a class diagram of a box subclass of the FIG. 30 class viewable class diagram.

Referring to FIG. 31, descending from class Box 830 are a plurality of subclasses, many of which include further subclasses. The subclasses which directly descend from class box 830 include class Book 850, class Corridor 852, class Desktop 854, class Entrance 856, class Image Gallery 858, class Page Turn Box 860, class Panel 862, and class Window 864.

Class Book

Class Book 850 is the class which controls the drawing of the book objects within library 640. Class Book 850 includes a plurality of fields including the field book object. The field book object points to a stack of pages that are accessed when the book object is actuated. Class Book 850 also defines the method touch which causes the stack of pages to be accessed when the book is touched. The stack of pages is accessed via class Book Scene 900 (See FIG. 32).

Class Corridor

Class Corridor 852 is the class which controls the presentation of objects which arrange an arbitrarily extensible collection of entrances. Instances of Class Corridor 852 hold objects in a linear order and allow a user to move among the entrances even if a screen cannot display all of the entrances at once. The entrances are arbitrarily extensible from zero entrances to as many entrances as desired. The entrances are instances of class Entrance 856.

A corridor is a viewable object that can horizontally scroll. A corridor contains a directory at both ends with entrance objects between them. A corridor can grow arbitrarily long, as new entrances are added, or shrink as entrances are removed.

Class Corridor 852 defines a plurality of fields including the entrance list field. The entrance list field is a list of entrances along the corridor. Class Corridor 852 also defines a plurality of fields which relate to the drawing of the corridor. Class Corridor 852 also defines fields that allow entrances to be added to the corridor object. For example Class Corridor 852 defines the field insert interval which controls the space between each entrance. Class Corridor 852 also defines the field insert list. The field insert list is a list of inserted objects which may be inserted between entrance objects to help users situate themselves in a long list of similar looking objects.

Descending from class Corridor 852 is class Road 866. Class Road 866 defines fields and overrides operations to provide an object that has a corridor function but displays a broken line drawn down the center of the object, thus making the object appear to users like a road. More specifically, class Road 866 includes the field stripe color, which contains a number specifying the color of the stripe, the field stripe color hilited, which specifies the color in which the stripe is displayed when the road is highlighted, the field stripe length, which specifies the length of each segment of the stripe, and the field stripe gap, which specifies the distance between stripe segments. Additionally, to draw the object with its stripe, class Road 866 overrides the draw method of its superclass, class Corridor 852.

Class Desktop

Class Desk top 854 controls the presentation of the desk top 152. Class Desk top 152 defines a plurality of fields including fields directed to stacking pieces of stationery when postcard objects 158 are added to desk top 152. Class Desk top 854 defines a plurality of methods which are directed to dropping pieces of stationery when postcard objects 158 are placed on desk top 152. These methods control the dropping so that the placement of postcards 158 simulate the placement of postcards within a three dimensional space (as compared to the dropping methods of class Shelf 844 which simulate placement of objects using a gravitational force).

Class Entrance

Class Entrance 856 is the class that is used to provide objects which, when activated, transfers to a lower navigation level such as a door or a building that serves as an entrance to a particular scene. When the user taps an entrance, software 100 shifts the view to a lower navigation level, that is the view of a scene that represents the room behind the door or building. When the user drops an object on an entrance, the object is transported to the scene that represents the room behind the door. Buildings and doors are both entrances that are presented by changing the image and the frame of the image.

Class Entrance 856 defines a plurality of fields. For example, class Entrance 856 defines the field has destination which indicates that scene that is presented when the entrance is activated. Class entrance 856 also defines fields which are used for drawing the entrance such as entrance size. Class Entrance 856 defines methods which are directed to whether the entrance can be locked such as the field has lock.

Class Image Gallery

Class Image Gallery 858 provides images which may be located between entrances down any corridor. The images help orient a user when navigating among objects having a similar appearance. Class Image Gallery 858 defines a plurality of fields including the field image list, which sets forth a list of images that are presented by instances of class Image Gallery 858. Class Image Gallery 858 also defines fields which are used for drawing the images wet forth by the image list field. Class Image Gallery defines a plurality of methods including the method touch, which causes different images to be presented each time an image object is touched.

Class Page Turn Box

Class Page Turn Box 860 provides a way of moving through a stack of pages which is one of the ways for moving through a document that doesn't fit on display device 106 at one time. Class Page Turn Box 860 defines a plurality of fields including the fields flash corner, page number. The field flash corner indicates whether to flash the corner of a page to draw attention to the page. The field draw page number indicates the present page number. Class Page Turn Box 860 also defines a plurality of methods including draw page number, turn right and turn left. The method draw page number causes the current page number to be drawn within the page of the stack of pages. The methods turn right and turn left cause the stack of pages to move forward and backward, respectively.

Class Panel

Class panel 862 is an abstract class which sets forth a family of classes whose objects are boxes that are fixed in place and are always at the rear of the view hierarchy. The Panel objects often contain icons, controls and other objects for the user to touch. Most objects whose classes are subclasses of class Panel 862 are system objects that are always in place, such as the title bar, control bar and screen.

Class panel 862 does not define any fields. Class panel defines the method Can Accept Coupon. The method Can Accept Coupon is implemented in class Box and not overridden by class Panel; however, Panel Can Accept Coupon may be used to override Box Can Accept Coupon when a subclass of class Panel 862 has different rules regarding accepting coupons.

Class Window

Class Window 864 is the class that is used for drawing and manipulating windows. Class Window 864 defines a plurality of fields directed to drawing, opening and closing windows. Class Window 864 also defines fields directed to what a particular window object contains. Class Window 864 also defines a field directed to whether a particular window includes a balloon spout.

Descendants of Class Panel

Figure 32:
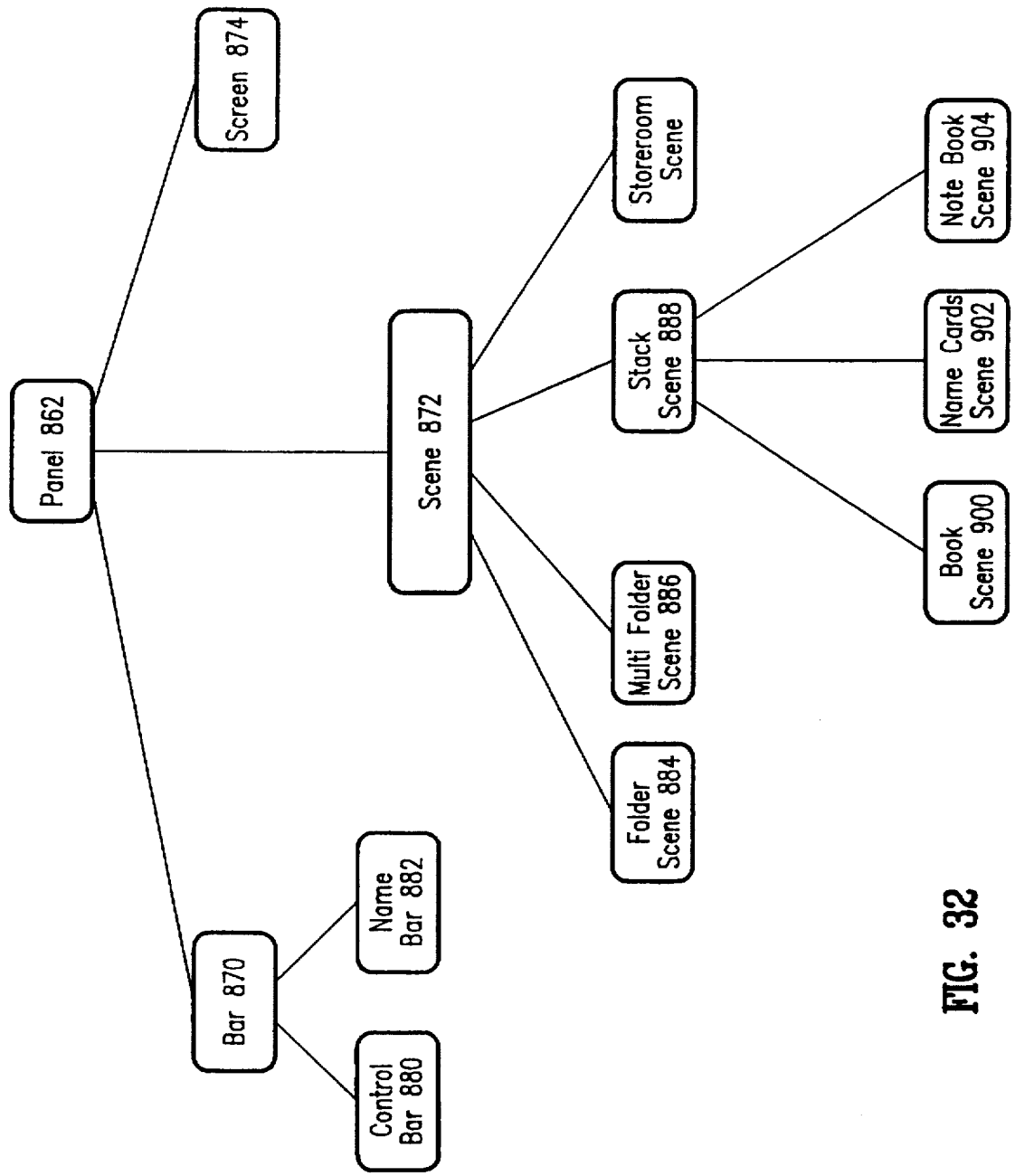
FIG. 32 is a class diagram of the panel subclass of the FIG. 31 box class diagram.

Referring to FIG. 32, descending from class Panel 862 are a plurality of subclasses including class Bar 870, class Scene 872 and class Screen 874.

Class Bar

Class Bar 870 adds a border over a panel object. Class Bar 870 defines the field which indicates the type of border to draw. Class Bar 870 defines methods for drawing the Bar.

Descending from class Bar 870 are class Control Bar 880 and Class Name Bar 882. Both the control bar and the name bar are always subviews of the screen presentation.

Class Name Bar 880 displays the name of the current scene. The name bar is always displayed-at the top of the screen. On its left side, the name bar displays the name of the current scene. On the right side, the name bar displays the name of the step back scene of the navigation hierarchy. If the user taps on the name of the step back scene, the step back scene becomes the current scene.

Class Name Bar 880 defines a plurality of fields including fields directed to drawing the name bar, fields directed to the data and battery usage, which are both presented in the center portion of the name bar and fields directed to where control transfers when the step back name is touched. Class Name Bar 880 defines a plurality of methods including set step back hilight which highlights the step back name when it is touched and the method touch which divides the name bar into different portions which may be separately touched.

Class Control Bar 882 provides a way for providing functionality with every scene as the control bar is always displayed with every screen presentation and thus the functionality which is accessed via the control bar may always be accessed. Class Control Bar 882 defines a plurality of fields including the button list field-, which sets forth the list of the gadgets that are displayed whenever the control bar is displayed. (While the control bar is always displayed, certain gadgets may change based upon which scene is displayed.) Class Control Bar 882 also defines a plurality of methods including touch and swallow which allow portions of the control bar to individually react when touched and to individually swallow objects, respectively.

Class Scene

Class Scene 872 is the class which provides scene objects. A scene object is a viewable object that contains all of the other viewable objects in the space between name bar 882 and control bar 880. Accordingly, a scene object is the ultimate container for the other viewable objects which are displayed with the scene. The name of the scene object appears on the left side of the title bar. The name of the enclosing scene (the step back scene) appears on the right side of the title bar. All four levels of the navigation hierarchy (individual places, rooms, the hallway and the street) are built out of scenes and their subviews.

Every scene can add objects to the command window that is displayed when the user touches the Magic Lamp. If a developers package has a scene, this technique can be used to add package-specific commands to the Lamp's command window.

Class Scene 872 defines the fields Scene Flags, Step Back Scene, Step Back Spot, image, additions and screen. The field Scene Flags is of the type unsigned and represents various scene settings. The field Step Back Scene is of the type scene and represents the scene to which a user steps back from the present scene. The field Step Back Spot os of the type viewable and represents the location to zoom to on step back. The field image is of the type image and represents the image for the scene's snapshots. The field additions is of the type Scene Additions and represents scene-specific items which may be used to enhance the functionality of the control bar when a particular scene is displayed. The field screen is of the type buffer and represents cache bits to draw the scene object.

Class Scene 872 defines a plurality of methods. More specifically, the method Go to moves from a current scene to a new scene. The method Set Hilited highlights or removes highlighting from an object.

Class Scene 872 includes a plurality of specialized subclasses which provide more specialized scene behavior. For example, descending from class Scene 872 are class Folder Scene 884, class Multi Folder scene 886 class stack scene 888, and class Storeroom Scene 890. Each of these scene subclasses provide specialized behavior in accordance with the behavior of a particular scene.

For example, class storeroom scene 890 adds the ability to display or not display subviews that are hidden. These subviews might be system software which should not be accessed by a general user.

Also for example, class Stack Scene 888 adds the ability to stack objects and to control stacks of objects. Cards in stacks are displayed by drawing them inside objects in class Stack Scene 888. Like scenes, stack scenes are viewable objects that act as superviews for cards and forms. Every stack is associated with exactly one stack scene. When using stack scene and a stack of cards, Magic Cap draws arrows that go to the surrounding cards and the "card x of y" display at the top of the screen. When a card is displayed, it's drawn as a subview of the stack scene. Class stack scene 888 also tracks which card is being displayed and the stack to which the card belongs.

Descending from class Stack Scene are class Book Scene 900, class Name Cards Scene 902 and class Note Book Scene 904. Each of these classes provide specialized behavior in accordance with the particular stack of objects.

Class Screen

Class Screen 874 is the class which provides a software representation of the presentation that is provided to display device 106. Class screen 874 defines a screen flags field which represents the different aspects of functionality of display device 106. Class Screen 874 also defines a plurality of methods directed to the type of display device used by system 100 and how to draw information on the display device.

Descendants of Class Stamp

Figure 33:
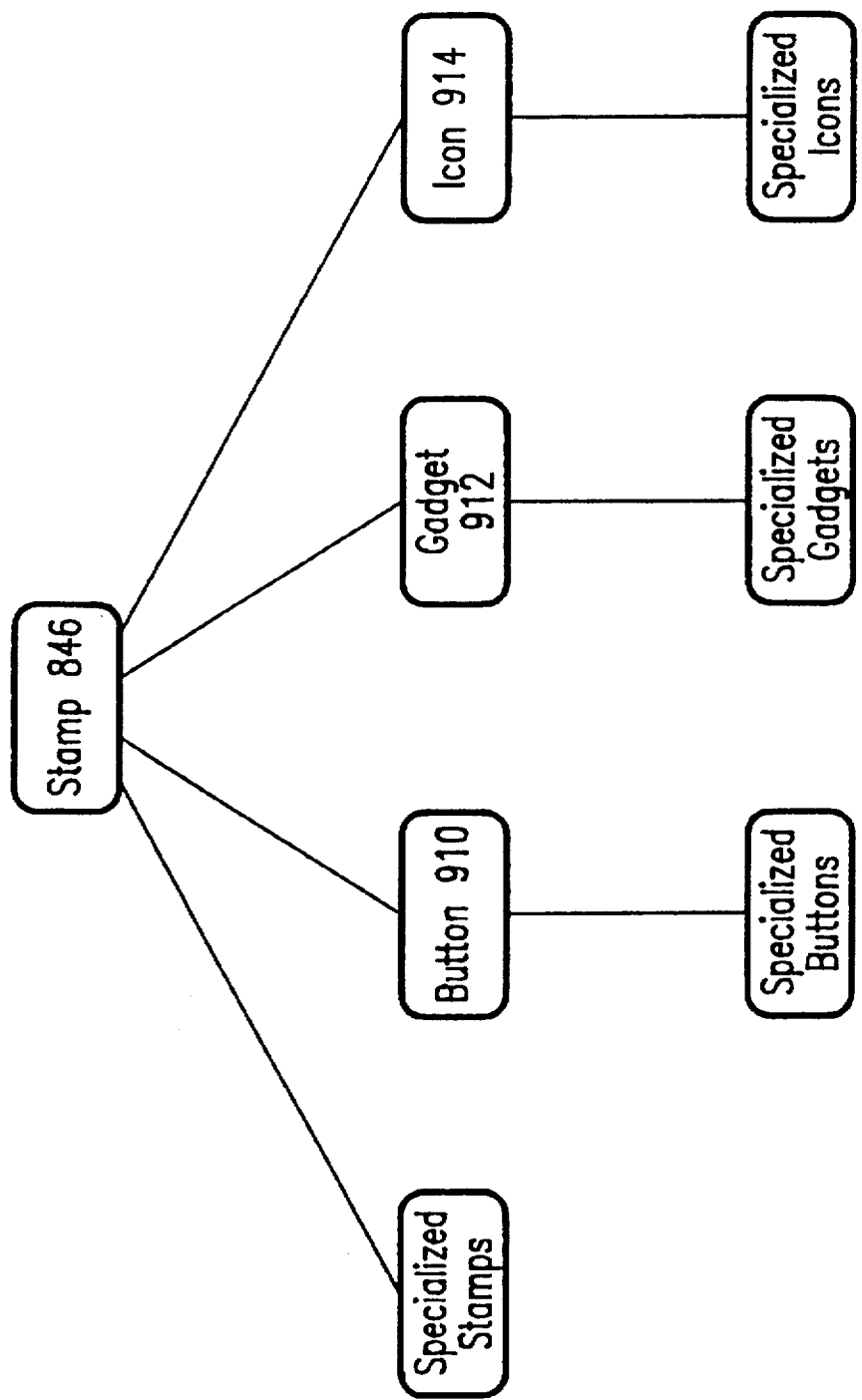
FIG. 33 is a class diagram of the stamp subclass of the FIG. 30 viewable class diagram.

Referring to FIG. 33, class Stamp 846 includes a plurality of specialized stamp subclasses 908. Also descending from class Stamp 846 are the subclasses class Button 910, class Gadget 912 and class Icon 914.

Class Button

Class Button 910 defines viewable objects that users touch to perform some action. Button objects have images that define their appearance on display device 106. Buttons can be set to trigger the action when a user first touches the button object or when a user touches and releases the button object.

Class Gadget

Class Gadget 912 provides gadget objects that appear as images that represent larger objects, such as windows. When a user touches a gadget object, the associated larger object appears on display device 106. The larger object is usually a window that contains other objects for the user to touch, such as icons or buttons. When a user touches a gadget object connected to a window that is already open, the window corresponding to the gadget object closes. Only one gadget window is open at a time; an open gadget window is closed before opening a new gadget window. Each gadget has a target, which is the viewable object that appears when the user taps the gadget.

There are various specialized subclasses of class Gadget 912. These subclasses correspond to the many gadgets that are present in system 100. For example, there are specialized gadget classes for the gadgets that are present on control bar 182 as well as index and directory gadget classes which provide the index objects and directory objects 250 to display device 106.

Class Gadget 912 defines the fields target and gadget flags. The field target is of the type object and represents the viewable object which is shown or hidden when a user taps the gadget. The field gadget flags is of the type unsigned and represents various gadget settings. Class Gadget 912 also defines a plurality of methods.

More specifically, the method Target obtains the target of the gadget object by accessing and returning the value of the target field of a gadget. The method Gadget Press overrides the inherited press when a gadget flag is set to indicate that pressing will move contained objects out of the gadget object. The inherited Press method may be called either before or after the custom press behavior is instituted.

The method Tap overrides the inherited Tap method. The gadget Tap method performs a plurality of actions when a user taps a gadget object. More specifically, when a user taps a gadget object: the method Tap plays the sound of the gadget object; if the gadget flag indicates that the gadget object is the trash, and key 107 is activated, then the trash is emptied; if the gadget has no target then a "not implemented" message is displayed; if the gadget object's target is already on the screen then the target is hidden; if the gadget's target object is not on display device 106 and the gadget object has a script, then the touch message is sent to the script; and show the target.

Class Icon

Class Icon 914 provides icons to display device 106. An icon is a graphic image that is used to represent a place in the software. When a user taps on an icon, the icon "zooms up" into a scene that contains an expanded view of the information represent by the icon. For example, the representations of the individual objects that are present in room level 132 are icon objects and function accordingly. While icon 914 is the name of a class in system 100 and the behavior of icon objects is similar to that of an icon in a traditional system, the behavior is not identical to icons in a traditional system as can be seen in the discussion of the user aspects of the navigation system.

Class Icon 914 defines a plurality of fields including the field native position, which indicates the default location for an icon, and destination, which indicates the scene to which system 100 should transfer when the icon is touched.

Other Embodiments

Other embodiments are within the following claims.

For example, while the preferred embodiment is set forth with four navigation levels, navigation systems are contemplated that may include any number of navigation levels. More specifically, a navigation system can be designed in which the town level is down level from a state level which is down level from a country level, etc. Thus the navigation system might include five or six or more levels. Alternatively, a navigation system can be designed to only include two or three levels.

Also for example, while the preferred embodiment is set forth with reference to an object oriented programming environment, the use of the object oriented implementation is not necessary to the invention. The invention could also be implemented using functions which are set forth in modules of either code or hardware.

Additionally, while the class hierarchy for the navigation system has been discussed, it is noted that the classes which provide the functionality of the particular first level objects have not been discussed. These objects, their implementation and their functionality are all well known in the art. Using the disclosed navigation system to access these functions or other first level functions is within the scope of the following claims.

What is claimed is:

1. A method for navigating within a graphical user interface of a computer system having a central processing unit coupled to a display device, the method comprising the steps of:

providing a hallway navigation level and a room navigation level;

displaying on the display device, when the hallway navigation level is accessed, the hallway level navigation scene using a physical metaphor of a hallway of a building, the physical metaphor of the hallway including a metaphor for an entrance, the entrance providing access to the room navigation level;

displaying on the display device, when the room navigation level is accessed, a room level navigation scene using a physical metaphor of a room, the room including physical metaphors corresponding to the plurality of function level functions, the room providing a superview for the plurality of function level functions;

accessing a lower navigation level from the hallway navigation level by actuating the entrance; and accessing the room navigation level from a function navigation level by stepping back from the function navigation level.

2. The method of claim 1 further comprising:

accessing the hallway navigation level from the room navigation level by stepping back from the room navigation level.

3. The method of claim 1 further comprising:

providing a function navigation level, the function navigation level including a plurality of functions;

displaying on the display device, when the function navigation level is accessed, a function level navigation scene, the function level navigation scene including a functional metaphor representing one of the plurality of functions; and accessing a function level function from the room navigation level by actuating a corresponding physical metaphor of the first level function.

4. The method of claim 1 wherein:

the stepping back is provided by accessing a step back function, the step back function being presented on the display device external to a displayed navigation scene.

5. The method of claim 1 wherein:

the room navigation level is extensible by adding metaphors of additional entrances to the hallway level navigation scene.

6. The method of claim 1 wherein:

the hallway is lengthened to include the additional entrances.

7. The method of claim 6 wherein:

when the hallway is lengthened so that the hallway is not entirely visible on the display device, the hallway that is not visible is accessed by actuating an arrow indicating a direction of movement down the hallway.

8. An information handling apparatus comprising:

a central processing unit;

a display device coupled to the central processing unit;

means for displaying a graphical user interface on the display device;

means for providing the graphical user interface with a hallway navigation level and a room navigation level;

means for displaying on the display device, when the hallway navigation level is accessed, the hallway level navigation scene using a physical metaphor of a hallway of a building, the physical metaphor of the hallway including a metaphor for an entrance, the entrance providing access to the room navigation level;

means for displaying on the display device, when the room navigation level is accessed, a room level navigation scene using a physical metaphor of a room, the room including physical metaphors corresponding to the plurality of function level functions, the room providing a superview for the plurality of function level functions;

means for accessing a lower navigation level from the hallway navigation level by actuating the entrance; and means for accessing the room navigation level from a function navigation level by stepping back from the function navigation level.

9. The information handling apparatus of claim 8 further comprising:

means for accessing the hallway navigation level from the room navigation level by stepping back from the room navigation level.

10. The information handling apparatus of claim 9 further comprising:

means for providing a function navigation level, the function navigation level including a plurality of functions;

means for displaying on the display device, when the function navigation level is accessed, a function level navigation scene, the function level navigation scene including a functional metaphor representing one of the plurality of functions; and means for accessing a function level function from the room navigation level by actuating a corresponding physical metaphor of the first level function.

11. The information handling apparatus of claim 9 wherein:

the stepping back is provided by accessing a step back function, the step back function being presented on the display device external to a displayed navigation scene.

12. The information handling apparatus of claim 9 wherein:

the room navigation level is extensible by adding metaphors of additional entrances to the hallway level navigation scene.

13. The information handling apparatus of claim 12 wherein:

the hallway is lengthened to include the additional entrances.

14. The information handling apparatus of claim 13 wherein:

when the hallway is lengthened so that the hallway is not entirely visible on the display device, the hallway that is not visible is accessed by actuating an arrow indicating a direction of movement down the hallway.

* * * * *